(12) United States Patent
Ross et al.

(10) Patent No.: US 10,904,234 B2
(45) Date of Patent: Jan. 26, 2021

(54) SYSTEMS AND METHODS OF DEVICE BASED CUSTOMER AUTHENTICATION AND AUTHORIZATION

(71) Applicant: Privakey, Inc., Philadelphia, PA (US)

(72) Inventors: Brian G. Ross, Haddon Heights, NJ (US); Benjamin P. Hollin, Philadelphia, PA (US); Charles J. Durkin, West Chester, PA (US); Nicholas Vaccaro, Vaccaro, PA (US); Joseph A. Fischetti, Ridley Park, PA (US); Michael Evans, Philadelphia, PA (US)

(73) Assignee: Privakey, Inc., Philadelphia, PA (US)

( * ) Notice: Subject to any disclaimer, the term of this patent is extended or adjusted under 35 U.S.C. 154(b) by 13 days.

(21) Appl. No.: 16/505,353

(22) Filed: Jul. 8, 2019

(65) Prior Publication Data

US 2019/0334884 A1 Oct. 31, 2019

Related U.S. Application Data

(63) Continuation-in-part of application No. 15/726,755, filed on Oct. 6, 2017, now Pat. No. 10,348,715, which
(Continued)

(51) Int. Cl.
*H04L 29/06* (2006.01)
*H04W 12/06* (2009.01)
(Continued)

(52) U.S. Cl.
CPC .............. *H04L 63/08* (2013.01); *G06F 21/31* (2013.01); *G06F 21/41* (2013.01);
(Continued)

(58) Field of Classification Search
CPC ................ H04L 63/0815; H04L 63/08; H04L 63/0823; H04L 63/0442; H04W 12/06; G06F 21/41; G06F 21/31
See application file for complete search history.

(56) References Cited

U.S. PATENT DOCUMENTS 6,005,939 A 12/1999 Fortenberry et al.
6,725,269 B1 4/2004 Megiddo
(Continued)

OTHER PUBLICATIONS

M. M. R. Chowdhury and J. Noll, "Distributed Identity for Secure Service Interaction," 2007 Third International Conference on Wireless and Mobile Communications (ICWMC'07), Guadeloupe, 2007, pp. 56-56, (Year: 2007).*
(Continued)

*Primary Examiner* — Kari L Schmidt
(74) *Attorney, Agent, or Firm* — Duane Morris LLP

(57) ABSTRACT

A system for authorizing respective initiation of a plurality of remote services by or for mobile device users. The system comprises a processor, and storage devices, at an authorization service (AS). A storage device stores public key portions of authentication tokens for mobile device users and remote service identifiers. Stored program code executable by the AS processor receives only public key portions of authentication tokens created on mobile devices. For actions to initiate a remote service, the program code is for receiving a remote service identifier and challenge information from a remote service server, transmitting at least a portion of the challenge information to a user's mobile device, receiving messages from the user's mobile device, validating at least one of the received messages using the stored public key portion of the authentication token for the user, and if validated, initiating the remote service.

20 Claims, 38 Drawing Sheets

Related U.S. Application Data is a continuation of application No. 14/858,087, filed on Sep. 18, 2015, now Pat. No. 9,813,400.

(60) Provisional application No. 62/076,637, filed on Nov. 7, 2014.

(51) Int. Cl.
  *G06F 21/41* (2013.01)
  *G06F 21/31* (2013.01)
  *H04L 29/08* (2006.01)

(52) U.S. Cl.
  CPC ...... *H04L 63/0442* (2013.01); *H04L 63/0815* (2013.01); *H04L 63/0823* (2013.01); *H04W 12/06* (2013.01); *H04L 67/02* (2013.01)

(56) References Cited

U.S. PATENT DOCUMENTS

| | | | |
|---|---|---|---|
| 6,772,336 | B1 | 8/2004 | Dixon, Jr. |
| 7,194,764 | B2 | 3/2007 | Martherus |
| 7,299,364 | B2 | 11/2007 | Noble et al. |
| 7,577,834 | B1 | 8/2009 | Traversat et al. |
| 8,108,920 | B2 | 1/2012 | Spelman et al. |
| 8,296,562 | B2 | 10/2012 | Williams et al. |
| 8,499,153 | B2 | 7/2013 | Ritola et al. |
| 8,880,889 | B1* | 11/2014 | Ward .................. H04B 1/3827 713/176 |
| 8,973,099 | B2 | 3/2015 | Reeves, Jr. et al. |
| 9,208,304 | B2 | 12/2015 | Hong et al. |
| 9,374,369 | B2 | 6/2016 | Mahaffey et al. |
| 9,503,452 | B1 | 11/2016 | Kumar et al. |
| 9,519,901 | B1 | 12/2016 | Dorogusker |
| 9,742,763 | B2* | 8/2017 | Neuman ............ H04L 63/0876 |
| 9,805,370 | B1 | 10/2017 | Quigley et al. |
| 10,129,231 | B2 | 11/2018 | Anderson |
| 10,182,040 | B2 | 1/2019 | Hu et al. |
| 2002/0144108 | A1 | 10/2002 | Benantar |
| 2003/0163733 | A1 | 8/2003 | Barriga-Caceres |
| 2003/0221126 | A1 | 11/2003 | Berman |
| 2003/0236975 | A1 | 12/2003 | Birk |
| 2004/0171399 | A1 | 9/2004 | Uchida et al. |
| 2005/0074123 | A1 | 4/2005 | Cromer et al. |
| 2005/0074126 | A1 | 4/2005 | Stanko |
| 2005/0120214 | A1* | 6/2005 | Yeates .................... H04L 63/08 713/171 |
| 2005/0228986 | A1 | 10/2005 | Fukasawa et al. |
| 2005/0289153 | A1 | 12/2005 | Pabla et al. |
| 2006/0053296 | A1 | 3/2006 | Busboom et al. |
| 2006/0174104 | A1 | 8/2006 | Crichton et al. |
| 2007/0214272 | A1 | 9/2007 | Isaacson |
| 2008/0046983 | A1 | 2/2008 | Lester et al. |
| 2008/0134295 | A1 | 6/2008 | Bailey et al. |
| 2008/0209338 | A1 | 8/2008 | Li |
| 2008/0229384 | A1 | 9/2008 | Hodgkinson et al. |
| 2008/0256617 | A1 | 10/2008 | Cartwell |
| 2009/0113543 | A1 | 4/2009 | Adams et al. |
| 2009/0132813 | A1* | 5/2009 | Schibuk .............. G06Q 20/322 713/158 |
| 2009/0205035 | A1 | 8/2009 | Sermersheim et al. |
| 2011/0067095 | A1 | 3/2011 | Leicher et al. |
| 2011/0119747 | A1 | 5/2011 | Lambiase |
| 2012/0159603 | A1 | 6/2012 | Queck |
| 2013/0019299 | A1 | 1/2013 | Vepsalainen |
| 2013/0081116 | A1* | 3/2013 | Carpenter ........... H04L 63/0853 726/5 |
| 2013/0086657 | A1 | 4/2013 | Srinivasan et al. |
| 2013/0268999 | A1 | 10/2013 | Kiang et al. |
| 2013/0312079 | A1 | 11/2013 | McCallum |
| 2013/0318354 | A1 | 11/2013 | Entschew et al. |
| 2014/0040991 | A1 | 2/2014 | Potonniee et al. |
| 2014/0082715 | A1 | 3/2014 | Grajek et al. |
| 2014/0189808 | A1* | 7/2014 | Mahaffey ............ H04L 63/0853 726/4 |
| 2014/0201531 | A1* | 7/2014 | Toy ....................... H04L 9/3234 713/171 |
| 2014/0215589 | A1 | 7/2014 | Dietrich et al. |
| 2014/0257999 | A1 | 9/2014 | Garcia-Martinez |
| 2014/0281506 | A1 | 9/2014 | Redberg et al. |
| 2014/0358777 | A1 | 12/2014 | Gueh |
| 2015/0089621 | A1 | 3/2015 | Khalid et al. |
| 2015/0106908 | A1 | 4/2015 | Carpenter et al. |
| 2015/0127546 | A1 | 5/2015 | Saxena et al. |
| 2015/0288522 | A1 | 10/2015 | McCoy et al. |
| 2016/0117673 | A1 | 4/2016 | Landrok et al. |
| 2016/0119323 | A1 | 4/2016 | Krishna |
| 2017/0140141 | A1 | 5/2017 | Yan et al. |
| 2017/0346851 | A1 | 11/2017 | Drake |
| 2018/0152439 | A1 | 5/2018 | Hande |
| 2019/0007392 | A1* | 1/2019 | Rubiyath ................. G06F 21/41 |
| 2019/0034920 | A1 | 1/2019 | Nolan et al. |
| 2020/0106764 | A1* | 4/2020 | Hockey ................. H04L 9/3213 |
| 2020/0162431 | A1* | 5/2020 | Goldschlag ............. H04L 67/20 |

OTHER PUBLICATIONS

Farb, Michael, et al. "Safeslinger: easy-to-use and secure public-key exchange." Proceedings of the 19th annual international conference on Mobile computing & networking. 2013, pp. 417-428. (Year: 2013).*

Waugh, R., "No wonder hackers have it easy: Most of us now have 26 different online accounts—but only five passwords," Jul. 16, 2012, 2pgs. http://www.dailymail.co.uk/sciencetech/article-2174274/No-wonder-hackers-easy.

Perlroth, N., and Gelles, D., "Russian Hackers Amass Over a Billion Internet Passwords," Aug. 5, 2014, 5pgs. http://www.nytimes.com/2014/08/06/technology/russian.

McAfee, Inc., "Net Losses: Estimating the Global Cost of Cybercrime: Economic Impact of Cybercrime II," Center for Strategic and International Studies, Jun. 2014, 24 pgs. http://www.mcafee.com/us/resources/reports/rp-economic.

Maor, E., "How to Bypass Two-Factor Authentication (2FA) and What the Future Holds," Sep. 30, 2014, 5pgs. http://securityintelligence.com/how-to-bypass-two-factor-authentication-2fa.

Bonneau, J. et al., "The Quest to Replace Passwords: A Framework for Comparative Evaluation of Web Authentication Schemes," 2012 IEEE Symposium on Security and Privacy, San Francisco, CA, 2012, pp. 553-567.

Ahn, G.J., et al., "Managing Privacy Preferences for Federated Identity Management," Proceedings of the 2005 Workshop on Digital Identity Management, ACM, 2005, pp. 28-36.

Altmann, J., et al., "UNIQuE: A User-Centric Framework for Network Identity Management," 2006 IEEE/IFIP Network Operations and Management Symposium NOMS 2006, Vancouver, BC, 2006, pp. 495-506.

Thomas, I., et al., "An Identity Provider to Manage Reliable Digital Identities for SOA and the Web," Proceedings of the 9th Symposium on Identity and Trust on the Internet, ACM, 2010, pp. 26-36, 2010.

Leiba, B., "OAuth Web Authorization Protocol," In IEEE Internet Computing, vol. 16, No. 1, pp. 74-77, Jan.-Feb. 2012, 2012.

* cited by examiner

FIG. 5G

SYSTEMS AND METHODS OF DEVICE BASED CUSTOMER AUTHENTICATION AND AUTHORIZATION

CROSS-REFERENCE TO RELATED APPLICATIONS

This application is a continuation in part of U.S. patent application Ser. No. 15/726,755, filed on Oct. 6, 2017, which is a continuation of U.S. patent application Ser. No. 14/858,087, filed on Sep. 18, 2015, now U.S. Pat. No. 9,813,400, issued on Nov. 7, 2017, which claims priority to U.S. Provisional Patent Application Ser. No. 62/076,637, filed on Nov. 7, 2014, the entirety of which are herein incorporated by reference.

FIELD

The present disclosure is directed generally to remote services provided by challenge origins and more particularly to systems and methods of authorizing the respective initiation of a respective one or more remote services provided by each of a plurality of challenge origins by or for each of a plurality of mobile device users.

DESCRIPTION OF THE RELATED ART

Ubiquitous, single factor, username and password schemes for Internet-centric (e.g. web-based) authentication are notably vulnerable to security breaches via illicit knowledge token (password) interception in network communications sent over encrypted (e.g. HTTPS), or unencrypted (e.g. HTTP), communications protocols (e.g. via multi-session attacks, timing attacks, side channel attacks, dictionary attacks, etc.), duplicitous password recovery (e.g. via phishing attacks), or programmatic hacking of network-accessible password databases, by cybercriminals.

For example, according to a recent study, the average Internet user had over twenty-five (25) Internet-accessible user accounts, but only five (5) distinct passwords used across all such accounts. See Waugh, Rob, "No wonder hackers have it easy: Most of us now have 26 different online accounts—but only five passwords," Jul. 16, 2012, accessible at <http://www.dailymail.co.uk/sciencetech/article-2174274/No-wonder-hackers-easy-Most-26-different-online-accounts--passwords.html#ixzz3hxCnv6YG>. Additionally, in 2014, 1.2 billion passwords were stolen from network-accessible password databases by a single multi-Internet site attack by cybercriminals. See Perlroth, N. and Gelles, D., "Russian Hackers Amass Over a Billion Internet Passwords," Aug. 5, 2014, accessible at: <http://www.nytimes.com/2014/08/06/technology/russian-gang-said-to-amass-more-than-a-billion-stolen-internet-credentials.html?hp&action=click&pgtype=Homepage&version=LedeSum&module=first-column-region&region=top-news&WT.nav=top-news&_r=0>. This combination of password re-use, and compromised user data, creates significant security vulnerability for consumers and commercial interests that rely on conventional single factor, username and password schemes for Internet-centric authentication. Moreover, the annual global cost to such consumers and commercial interests from cybercrime is estimated to be between $375 billion and $500 billion. See "Net Losses: Estimating the Global Cost of Cybercrime, McAfee, Inc., 2014, accessible at: <http://www.mcafee.com/us/resources/reports/rp-economic-impact-cybercrime2.pdf>.

Multi-factor authentication is a widely accepted protocol to protect Internet-accessible user accounts from being compromised by cyber-criminals. However, existing Internet-centric, multi-factor, authentication schemes have had limited adoption due to cost, enrollment and issuance complexity, and lack of user convenience. Thus, outside of mandated environments, multi-factor, Internet-centric, authentication schemes have realized little adoption.

Using temporary one-time passwords in Internet-centric authentication schemes, whether hardware or software based, also suffer from complicated identity registration schemes and a host of technical adoption challenges. A number of such schemes also have security vulnerabilities that allow cyber criminals to intercept short messaging service (SMS), or application-based (e.g. web application, native application, mobile application), one-time passwords.

For example, conventional Internet-centric authentication schemes using hardware-based tokens, require the creation, sending, receipt, and use of a hardware token in its entirety and that is typically bound to a single Internet service provider or relying party. Such conventional, hardware-based, Internet-centric, authentication schemes also commonly require a third-party to configure such hardware tokens, in a time-intensive, administrator-controlled, process, prior to sending each token to an Internet user. If an Internet user wanted to use a hardware-based, Internet-centric, multi-factor, authentication scheme to access twenty (20) services over the Internet, or if the respective relying party of each of such twenty (20) services required the use of a hardware-based, Internet-centric, multi-factor, authentication scheme to access their respective service over the Internet, an Internet user would be required to order, receive, distinguish, and use, as many as twenty (20) hardware tokens. Moreover, such conventional, hardware-based, Internet-centric, authentication schemes, are subject to security vulnerabilities outside of the Internet environment including, for example, mail interception, and physical theft, of such hardware tokens.

Additionally, for example, conventional Internet-centric authentication schemes using software-based one-time password protocols, require a distinct software-based (e.g. virtual) token to access Internet-based services of each relying party, and typically require a time-intensive, complicated, binding process to associate each software-based token with each respective relying party. Moreover, SMS, and software based, one-time passwords have been proven to be vulnerable to social engineering and HTML injection attacks by cyber-criminals See Maor, Etay, "How to Bypass Two-Factor Authentication (2FA) and What the Future Holds," Sep. 30, 2014, accessible at: <http://securityintelligence.com/how-to-bypass-two-factor-authentication-2fa-and-what-the-future-holds/#VcDT4JNVhBc>.

What is needed are cost-effective, secure, computer-implemented systems and methods to resolve these technical challenges and vulnerabilities unique to, and specifically arising in, Internet-centric authentication of Internet users accessing relying party services over the Internet.

SUMMARY

In various embodiments of the present disclosure, computer-implemented methods and systems for Internet-centric authentication of a user to an Internet service provider service, are provided. In some embodiments, a system for authorizing respective access by each of a plurality of Internet users to a respective one or more Internet services provided by each of a plurality of Internet service providers includes a processor at a single identity provider, a first non-transient computer readable storage medium of the single identity provider where the first non-transient computer readable storage medium is configured to store data, and a second non-transient machine-readable storage medium of the single identity provider where the second non-transient computer readable storage medium is encoded with program code executable by the processor. The stored data includes, for each of a plurality of Internet users, a respective public key portion of a respective authentication token that is specific to an electronic mail address, or anonymous identifier, of the Internet user, a user credential of the Internet user, a device identifier for each of one or more devices, and an identity provider application residing on a mobile device of the one or more devices and that is usable by the Internet user to access a respective one or more Internet services provided by each of a plurality of Internet service providers. The stored data includes, for each of the plurality of Internet service providers, a respective identifier that is visually perceptible when displayed on a page of the identity provider application and when displayed on a web page belonging to the Internet service provider. The stored data also includes, for each of a respective one or more Internet services provided by each of the plurality of Internet service providers, a respective identifier, and a respective one or more call-back Internet addresses. The program code executable by the processor is for requiring the respective identity provider application residing on each of the respective mobile devices to create the respective authentication token and to store a respective private key portion of the respective authentication token on the respective mobile device, and receiving, via a respective application programming interface (API) call from a respective computer server of each of the plurality of Internet service providers, a respective identifier for a respective requested one of the respective one or more Internet services provided by the respective Internet service provider where each respective identifier is received in response to a respective Internet user selection of a respective link on the respective web page belonging to the respective Internet service provider and displayed on a respective web browser to request access to the respective requested one Internet service. The program code executable by the processor is also for automatically generating, and transmitting to the respective web browser, a respective web page that displays the respective visually perceptible identifier of the respective Internet service provider and a respective Internet address of the respective web page belonging to the respective Internet service provider, and requiring the respective identity provider application residing on each of the respective mobile devices to display a respective page to input the respective user credential of the respective Internet user, wherein each input user credential is usable to decrypt the respective stored private key portion of the respective authentication token. The program code executable by the processor is also for receiving, via a respective API call from the respective identity provider application residing on each of the respective mobile devices, a respective approved authentication challenge message, validating each of a plurality of the received respective approved authentication challenge messages using the respective stored public key portion of the respective authentication token, and in response to validating the plurality of received approved authentication challenge messages, authorizing access by the respective Internet user to the respective requested one Internet service by re-directing the respective web browser to a respective one of the respective one or more call-back Internet addresses for the respective requested one Internet service.

In some embodiments of the present disclosure, a system for authorizing respective access by each of a plurality of Internet users to a respective one or more Internet services provided by each of a plurality of Internet service providers includes a processor at a single identity provider, a first non-transient computer readable storage medium of the single identity provider, where the first non-transient computer readable storage medium is configured to store data, and a second non-transient machine-readable storage medium of the single identity provider, where the second non-transient computer readable storage medium is encoded with program code executable by the processor. The stored data includes, for each of a plurality of Internet users, a respective public key portion of a respective authentication token that is specific to an identifier of the Internet user, a user credential of the Internet user, a device identifier for each of one or more devices, an identity provider application residing on a mobile device of the one or more devices and that is usable by the Internet user to access a respective one or more Internet services provided by each of a plurality of Internet service providers, and a pseudorandom activation code. The stored data also includes, for each of a respective one or more Internet services provided by each of the plurality of Internet service providers, a respective identifier, and a respective one or more call-back Internet addresses. The program code executable by the processor is for requiring the respective identity provider application residing on each of the respective mobile devices to create the respective authentication token and to store a respective private key portion of the respective created authentication token on the respective mobile device, generating respective pseudorandom activation codes to activate the respective created authentication tokens, where each generated pseudorandom activation code is usable to activate a respective one of the created authentication tokens, and generating respective pages to activate the respective created authentication tokens, where each generated page displays a respective active link associated with the respective generated pseudorandom activation code. The program code executable by the processor is also for transmitting, in a first out-of-band interaction with a respective application, other than the identity provider application and residing on each of the respective mobile devices, the respective generated page, activating, in a second out-of-band interaction with a respective web browser on each of the respective mobile devices, the respective one of the created authentication tokens, in response to a respective Internet user selection of the respective active link displayed by the respective application other than the identity provider application and residing on the respective mobile device, and authorizing respective access by two or more of the plurality of Internet users to a respective requested one of the respective one or more Internet services provided by each of two or more of the plurality of Internet service providers using the respective activated authentication token, the respective identifier for the respective requested one of the respective one or more Internet services provided by each of the two or more of the plurality of Internet service providers, and the respective one or more call-back Internet addresses for the respective requested one of the respective one or more Internet services provided by each of the two or more of the plurality of Internet service providers.

In some embodiments of the present disclosure, a non-transient computer readable storage medium encoded with program code is provided, where the program code is configured such that, when executed by a processor of a device, the processor performs a method of authorizing access by an Internet user to a respective one or more Internet services provided by each of a plurality of Internet service providers, and where the method includes an identity provider application residing on the device creating an authentication token comprising a public key portion and a private key portion, encrypting the private key portion using the user credential of the Internet user, storing the encrypted private key portion in a memory of the device, and transmitting, via an application programming interface (API) call to a computer server of a single identity provider, the public key portion of the created authentication token. The created authentication token is specific to an electronic mail address, or anonymous identifier, of an Internet user, a user credential of the Internet user, a device identifier for each of one or more devices including the device, and the identity provider application. The method also includes a web browser of the device displaying one or more of a plurality of web pages, where each web page belongs to a respective Internet service provider, and where each respective web page includes a respective link usable to request access by the Internet user to a respective one of the respective one or more Internet services provided by the respective Internet service provider. The method also includes the web browser receiving a respective selection of the respective link on each of the displayed one or more web pages and, in response to receiving each respective selection of the respective link on the displayed one or more web pages, and the web browser transmitting, to a web server of the Internet service provider, a respective electronic signal including content indicative of a respective identifier for the respective one of the respective one or more Internet services provided by the respective Internet service provider, displaying content of a respective first web page belonging to the single identity service provider at a respective first Internet address of the single identity service provider in response to receiving a respective API call from the web server of the single identity service provider, transmitting, to a web server of the single identity provider, a respective electronic signal including content indicative of an electronic mail address, or an anonymous identifier, of the Internet user, and displaying content of a respective second web page belonging to the single identity service provider at a respective second Internet address of the single identity service provider in response to receiving a respective API call from the web server of the single identity service provider, where the content of the second web page includes a respective visually perceptible identifier of the respective Internet service provider, the electronic mail address, or the anonymous identifier, of the Internet user, and a respective Internet address of the respective web page belonging to the respective Internet service provider. The method includes the processor of the device automatically initiating the identity provider application residing on the device and, in response to receiving a respective API call from the computer server of the single identity provider, the identity provider application validating a respective user credential received from a respective page displayed by the identity provider application by decrypting the stored encrypted private key portion of the authentication token, generating a respective approved authentication challenge message by digitally signing a predefined pseudorandom string with the decrypted private key portion of the authentication token and transmitting, via an API call to the computer server of the single identity provider, the generated respective approved authentication challenge message, and the web browser re-directing to a respective call-back Internet address of, and displaying content of, another respective web page belonging to the respective Internet service provider where the another respective web page is usable by the Internet user to access the respective requested one of the respective one or more Internet services provided by the respective Internet service provider.

In various embodiments of the present disclosure, an authorization service server may communicate with multiple responding mobile devices that have remote service applications installed and a remote service server in order to authorize the respective initiation of a respective plurality of remote services by or for each of a plurality of mobile device users. The authorization service server may comprise a processor, a first non-transitory machine-readable storage device, and a second non-transitory machine-readable storage device. The first non-transitory machine readable storage device may be configured to store data. The stored data may include, for each of the plurality of mobile device users, a respective public key portion of a respective authentication token created by a mobile device of one or more devices of the mobile device user. The respective authentication token may be specific to a user credential of the mobile device user and to identity provider computer readable program code of the authorization service residing on a mobile device of one or more devices of the mobile device user. The respective authentication token may be configured to be used by the mobile device user to authorize each of a plurality of remote services. Each of a plurality of challenge origins may provide a different one of the plurality of remote services. The stored data may further comprise, for each one of the respective plurality of remote services, a respective identifier.

The second non-transitory machine-readable storage device may be encoded with program code executable by the processor for receiving, from the respective authorization service code residing on the respective mobile device of each of the mobile device users, only the respective public key portion of the respective authentication token created by the respective mobile device. The program code may be further executable by the processor for, for each action to initiate a respective one remote service of the respective plurality of remote services by or for a respective mobile device user, receiving, via a respective application programming interface (API) call from a remote service server, a respective identifier for the respective one remote service and respective challenge information. In response to receiving each of the respective identifiers and respective challenge information, the program code may be further executable by the processor for transmitting at least a portion of the respective challenge information to the respective mobile device of each of the mobile device users.

The program code may be further executable by the processor for receiving, from the respective mobile device of each of a plurality of the mobile device users, a respective one or more messages, at least one of each of the respective one or more messages indicating successful validation of a respective received user credential by a respective stored private key portion of the respective authentication token for the respective mobile device user. The program code may be further executable by the processor for validating a plurality of the received respective at least one messages using the respective stored public key portion of the respective authentication token for each of the plurality of the mobile device users. The program code may be further executable by the processor for, in response to validating the plurality of the received respective one or more messages, initiating the respective one remote service.

In various embodiments of the present disclosure, a non-transitory machine-readable storage device may be encoded with program code where, when the program code is executed by a processor of a mobile device, the processor performs a method comprising: authorization service computer readable program code residing on the mobile device and embedded within a remote service application creating an authentication token comprising a public key portion and a private key portion. The created authentication token may be specific to a user credential of a mobile device user and the authorization service computer readable program code. The created authentication token may be configured to be used by the mobile device user to authorize one or more remote services. The method may further comprise the authorization service computer readable program code storing the private key portion of the created authentication token in a memory of the mobile device. The method may further comprise the authorization service computer readable program code transmitting, to a computer server of the authorization service, only the public key portion of the created authentication token.

The method may further comprise the processor receiving challenge information from the authorization service server. The challenge information may comprise information indicative of an action to initiate one of the one or more remote services. The method may further comprise the processor enabling the input of a user credential from the mobile device user. The method may further comprise, in response to receiving at least a portion of the challenge information, the authorization service code validating a received user credential using the stored private key portion of the created authentication token. The method may further comprise the processor, if the received user credential is validated, transmitting a message to the authorization service server, wherein the message is configured to enable initiation of the one remote service.

In various embodiments of the present disclosure, the authorization service server may communicate with at least one mobile device of a mobile device user and a plurality of challenge origins in order to authorize the respective initiation of a plurality of remote services by or for a mobile device user. The authorization service server may comprise a processor, a first non-transitory machine-readable storage device, and a second non-transitory machine-readable storage device. The first non-transitory machine-readable storage device may be configured to store data. The stored data may comprise, for a mobile device user, a public key portion of an authentication token. The authentication token may be specific to a user credential of the mobile device user and to authorization service computer readable program code residing on at least one mobile device of the mobile device user. The authentication token may be configured to be used by the mobile device user to authorize each of a plurality of remote services. The stored data may further comprise, for each one of the plurality of remote services, a respective identifier received from a respective challenge origin of a plurality of challenge origins.

The second non-transitory machine-readable storage device may be encoded with program code executable by the processor for requiring the respective authorization service residing on the at least one mobile device of the mobile device user to cause a processor on the at least one mobile device to: create the authentication token, store a private key portion of the authentication token on the at least one mobile device, and prevent transmission of the private key portion of the authentication token from the at least one mobile device. The program code may be further executable by the processor for, for each of a plurality of actions to initiate a respective one remote service of the plurality of remote services by the mobile device user, receiving, via an API call from a respective one of the plurality of challenge origins, the respective identifier for the respective one remote service and respective challenge information.

The program code may be further executable by the processor for, in response to receiving the respective identifier and the respective challenge information, transmitting a respective first portion of the respective challenge information to at least one mobile device of the mobile device user. The program code may be further executable by the processor for receiving, from the at least one mobile device, a respective request message and, in response to receiving the respective request message, transmitting a respective second portion of the respective challenge information to the at least one mobile device. The program code may be further executable by the processor for receiving, from the at least one mobile device, a respective response message comprising response information regarding the respective one remote service and validating the received respective response message using the stored public key portion of the authentication token for the mobile device user. The program code may be further executable by the processor for, in response to validating the received respective response message from the at least one mobile device, initiating the respective one remote service.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

FIGS. 5A-5H are illustrative screenshots of examples of Internet user interfaces to single identity provider Internet services, Internet user interfaces to an identity provider application residing on a device, and Internet user interfaces to a relying party Internet service, according to some embodiments of the present subject matter.

DETAILED DESCRIPTION OF THE EXAMPLES

Figure 1:
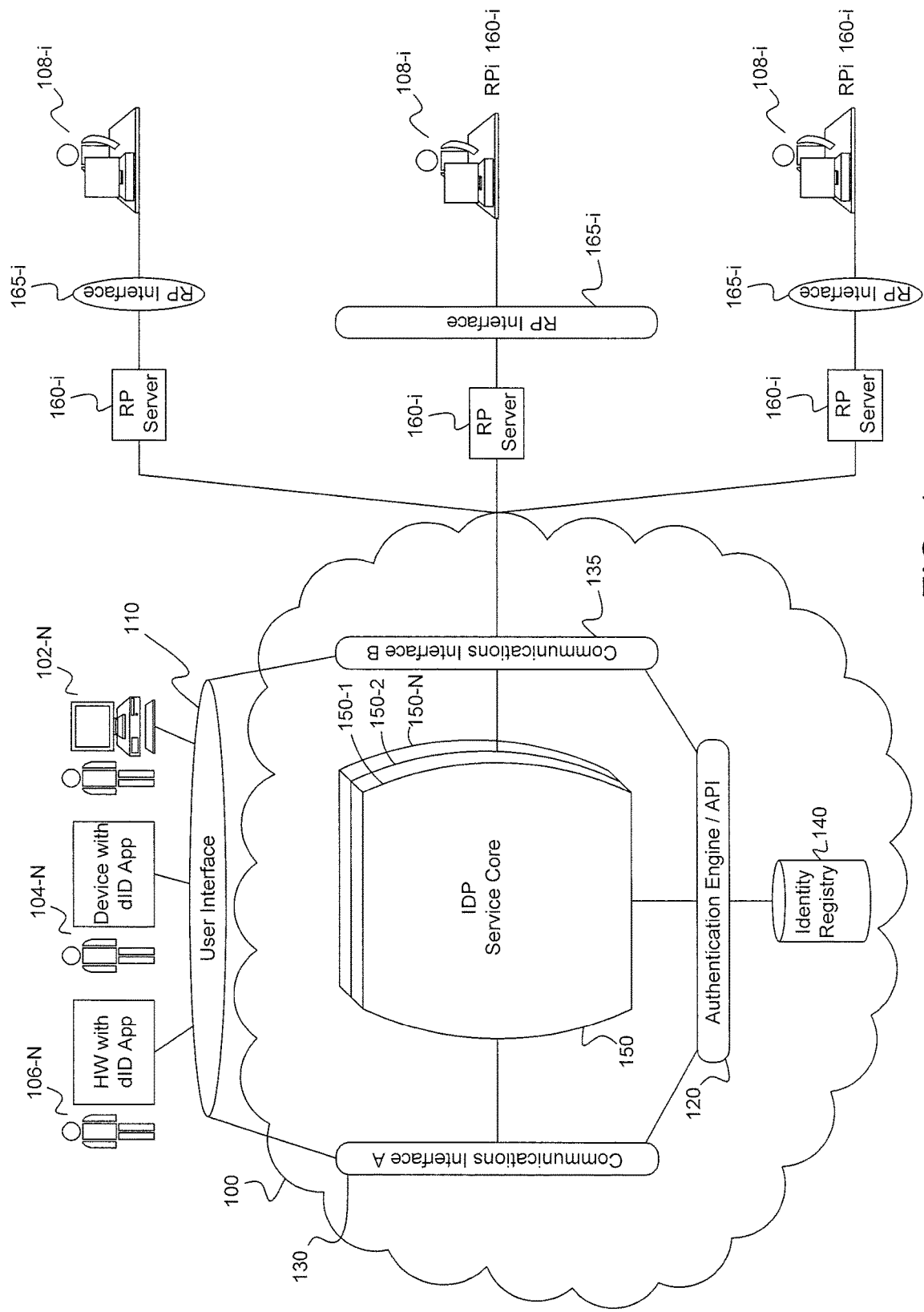
FIG. 1 is a block diagram of an example of an Internet-accessible cloud service platform of a single identity provider in accordance with some embodiments of the present disclosure.

With reference to the Figures, where like elements have been given like numerical designations to facilitate an understanding of the drawings, the various embodiments of a computer-implemented system and method of authorizing respective access by each of a plurality of Internet users to a respective one or more Internet services provided by each of a plurality of Internet service providers are described. The figures are not drawn to scale.

The computer-implemented systems and methods described herein, with their uniquely secure, cost-effective, and device-based schemes, provide a technical solution to resolve the security vulnerabilities and technical adoption challenges arising specifically in existing Internet-centric (e.g. web-based) authentication processes. In various embodiments, Internet users can utilize a respective identity provider application of a single identity provider residing on a respective device that is configured with an authentication token and an user credential of the Internet user, where the authentication token is specific to an user identifier of the Internet user, the user credential of the Internet user, a device identifier for one or more devices including the device, and the identity provider application. In various embodiments, Internet users can utilize the identity provider application, and services provided by the single identity provider, to authenticate to an unlimited number of participating Internet services of an unlimited number of Internet service providers. In various embodiments, the Internet users, single identity provider, and relying parties, utilize an authentication scheme necessarily rooted in respective identity provider applications residing on respective Internet user devices, a secure asymmetric cryptography technique, a rotating encryption key technique, multi-channel Internet communication protocols to protect data both in rest (e.g. stored in memory of respective Internet user devices, in memory of a server of the single identity provider, in memory of respective servers of the relying parties, etc.) and in transit (communication over multi-channel Internet communication protocols). In various embodiments, relying parties/Internet service providers can implement open standards-based Open ID Connect authentication protocols to enable authorization of Internet users' access to Internet services provided by the relying parties/Internet service providers via the single identity provider service. The computer-implemented systems and methods described herein create a seamless and secure framework for authorizing respective access by each of a plurality of Internet users to Internet services provided by each of a plurality of Internet service providers that provides a technical solution to transform Internet-centric (e.g. online) authentication from a vulnerable, risk-realized scheme to a seamless and secure framework for Internet-centric interaction and provision of Internet services.

Various embodiments resolve the foregoing technical challenges and vulnerabilities unique to prior art single factor, and multifactor, Internet-centric authentication schemes and provide computer-implemented systems and methods to facilitate secure and seamless Internet-centric, device-based, authentication of Internet users to Internet-based relying party systems. For example, Internet users may benefit from being able to use a device-based application of a single identity provider to securely and seamlessly authenticate themselves to the single identity provider and relying parties over the Internet, and to securely and seamlessly be granted authorized access to Internet services provided by such relying parties, from any possible network access point, including without limitation, a browser on a laptop computer, an application on a separate device (e.g. mobile device), and/or a service running on the same device (e.g. mobile device). Internet users and Internet-accessible relying parties may both benefit from being able to seamlessly use cryptographic techniques with a single identity provider which resolve vulnerabilities of prior art Internet-centric authentication schemes and yet reduce technical implementation complexity. Internet-accessible relying parties may also benefit from streamlined adoption achieved by leveraging Open ID Connect protocols.

The following description is provided as an enabling teaching of a representative set of examples. Many changes can be made to the embodiments described herein while still obtaining beneficial results. Some of the desired benefits discussed below can be obtained by selecting some of the features or steps discussed herein without utilizing other features or steps. Accordingly, many modifications and adaptations, as well as subsets of the features and steps described herein are possible and can even be desirable in certain circumstances. Thus, the following description is provided as illustrative and is not limiting.

This description of illustrative embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present disclosure. Relative terms such as "lower," "upper," "horizontal," "vertical,", "above," "below," "up," "down," "top" and "bottom" as well as derivative thereof (e.g., "horizontally", "downwardly", "upwardly", etc.) should be construed to refer to the orientation as then described or as shown in the drawing under discussion. These relative terms are for convenience of description only and do not require that a system or apparatus be constructed or operated in a particular orientation. Terms such as "attached," "affixed," "connected" and "interconnected," refer to a relationship wherein structures are secured or attached to one another either directly or indirectly through intervening structures, as well as both movable or rigid attachments or relationships, unless expressly described otherwise. The term "adjacent" as used herein to describe the relationship between structures/components includes both direct contact between the respective structures/components referenced and the presence of other intervening structures/components between respective structures/components.

As used herein, use of a singular article such as "a," "an" and "the" is not intended to exclude pluralities of the article's object unless the context clearly and unambiguously dictates otherwise.

The inventors have developed computer-implemented systems and methods of authorizing respective access by each of a plurality of Internet users to a respective one or more Internet services provided by each of a plurality of Internet service providers that provides Internet users and Internet-accessible relying parties with decentralized, secure, seamless, authentication capabilities to improve revenue, decrease costs, resolve vulnerabilities and technical implementation challenges, and achieve enhanced security Internet-centric authentication processes previously unrealized by existing schemes. For example, the inventors have determined that various embodiments of the computer-implemented systems and methods provided herein may combine decentralized authentication protocols, cryptographic authentication algorithms, and core capabilities of Internet-capable devices (e.g. mobile devices) to form a unique, secure, seamless, digital identity and authentication scheme. Various embodiments include a mobile application designed to run on mobile operating systems, a cloud-based identity provider service of a single identity provider, and cooperating relying parties that provide Internet services, communicating over a network such as the Internet.

The inventors have also determined that various embodiments of the computer-implemented systems and methods provided herein can protect an Internet user's account access over the Internet to relying parties' Internet services by multi-factor authentication including binding an authentication token created by an identity provider application residing on a device to an identifier of the Internet user, an identifier of one or more of his/her Internet-capable devices, the Internet user's knowledge or possession of a user credential of the Internet user (e.g. a PIN and/or a biometric factor), and to the identity provider application. By way of example, the inventors have also observed that various embodiments of the systems and methods described herein can provide enhanced security to a user's account access over the Internet to relying parties' Internet services, and a user's identity assertion over the Internet, by requiring one or more user credentials (e.g. PIN and/or a biometric factor) before successful Internet-centric authentication to relying party Internet services. In various embodiments, a pseudo-random string received by an identity provider application residing on a device from the single identity provider, and a user credential retrieved by the identity provider application in real-time, are processed and utilized by the identity provider application to decrypt a selected stored portion (e.g. private key portion) of an authentication token, enables multi-factor Internet-centric authentication to relying party Internet services. In various embodiments, and from an Internet user's perspective, the user's submission of relying party Internet services' identifiers to a single identity provider by selection of a link on the relying parties' websites, submission of his/her identifier (e.g. email address or anonymous identifier) via an application programming interface call from an identity provider application to a single identity provider over the Internet, click (or press, or otherwise activate) a hypertext (or hot spots, such as buttons, or an image) "submit" or the like on a page of an application other than the identity provider application in an out-of-band interaction, display of an alert communicated over the Internet to his/her device (e.g. his/her mobile device), the submission of his/her user credential to be validated by the identity provider application, upon successful user credential validation, generation and transmission of an approved authentication challenge message via an application programming interface call from the identity provider application to the single identity provider over the Internet, and, upon successful approved authentication challenge message validation, provides a user-friendly Internet-centric authentication process to authorize access by Internet users to Internet services provided by each of a plurality of relying parties/Internet service providers.

Various embodiments of the present disclosure provide multifactor device based authentication capabilities with an identity provider (IDP) service of a single IDP, computer code deployed and executed on a processor of a server of the single IDP, a device identity provider application (dID app or dID application such as, for example, a PrivaKey™ device identity and authentication application), and computer code deployed and executed on respective processors of respective servers of cooperating Relying Party's (RP) Internet services. In various embodiments, a single IDP service, dID app(s), and RP Internet service(s) and associated computer code, operate in concert to ensure that the digital identity authenticating to one or more RP Internet services belongs to the individual who initially registered the identity with the single IDP service and that the one or more RP Internet services are registered with the single IDP service. For example, the inventors have observed that in using various embodiments of the systems and methods described herein, an Internet user can authenticate to a plurality of Internet (e.g. online) RP Internet services over the Internet from any access point by initiating requests over the Internet for access to the plurality of (RP) Internet services that are pre-registered with a single identity provider (IDP) service such that the requested RP Internet services are identifiable to the single IDP service via Open ID Connect protocol communications, and asserting his/her identity over the Internet to the single IDP service to initiate a device identity provider application (dID app) (such as for example, a PrivaKey™ device identity and authentication application) residing on a registered device of the Internet user. In various embodiments, the Internet user can confirm the requests for access using the dID app residing on a registered device of the Internet user, and the dID app can then access the Internet user's encrypted, cryptographic private key portion of the Internet user's authentication token via one or more additional factors (e.g., one or more user credentials (e.g. Internet user's PIN, one or more Internet user biometric factors, and/or combinations thereof). In various embodiments, in systems and methods provided herein, the dID app can use an Internet user's decrypted, cryptographic private key portion of the Internet user's authentication token to digitally sign an approved authentication challenge response (e.g. a string of data pre-defined between the Internet user and the single IDP) transmitted to the single IDP service over the Internet using an API call, and where the single IDP service can validate the transmitted approved authentication challenge response using a cryptographic public key portion of the Internet user's authentication token. In some embodiments, after the single IDP validates the transmitted approved authentication challenge response, the single IDP service can re-direct a web browser of the Internet user to an RP Internet service Internet address that is pre-registered with the single IDP (e.g. a call-back Internet address of the RP Internet service) to authorize the Internet user's access to the requested RP Internet service with a validation token (e.g. an Internet service identifier, an Internet service secret, and/or combinations thereof), and the RP providing the RP Internet service can then confirm the authenticity of the validation token with the single IDP service via Open ID Connect protocol communications.

In various embodiments, the systems and methods provided herein include the single IDP service deployed as a cloud network service allowing various (e.g. multiple, independent) cooperative relying parties (RP) to leverage the single IDP service and dID app Internet user environment. In various embodiments, independent relying parties (RPs) are connected over a communications network to the single IDP service core (e.g. over the Internet (e.g. web pages) and over Open ID Connect protocol communications) and their respective RP Internet services, Internet users are connected over the Internet to the independent RP Internet services, Internet users are connected to the single IDP service using the dID app residing on a respective device of each Internet user and over the Internet using a respective web browser residing on a respective device of each Internet user. In some embodiments, the systems and methods provided herein are deployed as a dedicated service in which a plurality of dID apps, the single IDP service, and one or more RP Internet services of a plurality of RPs, are bound and dedicated to each other over a communications network.

Various embodiments of the present disclosure provide a cloud computing Internet-centric environment 100 as shown in FIG. 1 that includes multiple blocks of hardware, referred to as identity provider service cores (denoted IDP service cores 150-1, 150-2, . . . , 150-N; these may be referred to collectively as "IDP service cores 150") of a single IDP, and various modules operating in a cloud computing Internet-centric environment 100 including an Internet user interface 110, an authentication engine 120 that provides authentication services to various RPs and various Internet users. Although three IDP service cores of the single IDP are shown in this example, any number of IDP service cores of the single IDP may be used. Respective operational personnel 108-$i$ (e.g., system administrators or other personnel) of each RP Internet service provider 160-$i$ providing one or more RP Internet services may access the IDP services core 150 via a respective RP server 160-$i$ to register their respective RP interface 165-$i$. Although three RP interfaces 165-$i$ for three RP Internet service providers 160-$i$, and a single Internet user-interface 110, are shown in this example, the environment 100 can support any number of RP Internet service providers (160-$i$) and any number of Internet users N. In various embodiments, operational personnel (not shown) (e.g., system administrators or other personnel of a single IDP service) may access the authentication engine 120 (referred to as authentication engine 120 for convenience). In various embodiments, operational personnel of an IDP service of the single IDP (not shown) can access other modules or repositories (e.g. identity repository 140, etc.).

In various embodiments, the authentication engine 120 interfaces with each respective Internet user interface module 110, identity provider service core 150, identity repository 140, and each respective RP interface module 165-$i$. In various embodiments, authentication engine 120 stores cryptographic rules, binding rules, information authentication rules, as discussed herein for each particular Internet user N, for each particular RP 160-$i$, for particular Internet services provided by each particular RP 160-$i$, and/or by or for the single identity provider service in a storage unit (e.g. NoSQL, MySQL cluster, database). In various embodiments, authentication engine 120 stores such rules in a storage unit running on a database service (e.g. Relation Database Service). In some embodiments, authentication engine 120 can store such rules in a non-transitory, tangible machine readable storage medium. The non-transitory, tangible storage medium can be a non-transitory computer readable storage medium. The computer readable medium can be a machine-readable storage device, a machine-readable storage medium, a memory device (e.g., flash or random access memory), a hard disk drive, a tape drive, an optical drive (such as, but not limited to CD-ROM, DVD, or BD-ROM) or the like, or a combination of one or more of them. In various embodiments, authentication engine 120 is an integrated module of identity provider service core 150.

Figure 3:
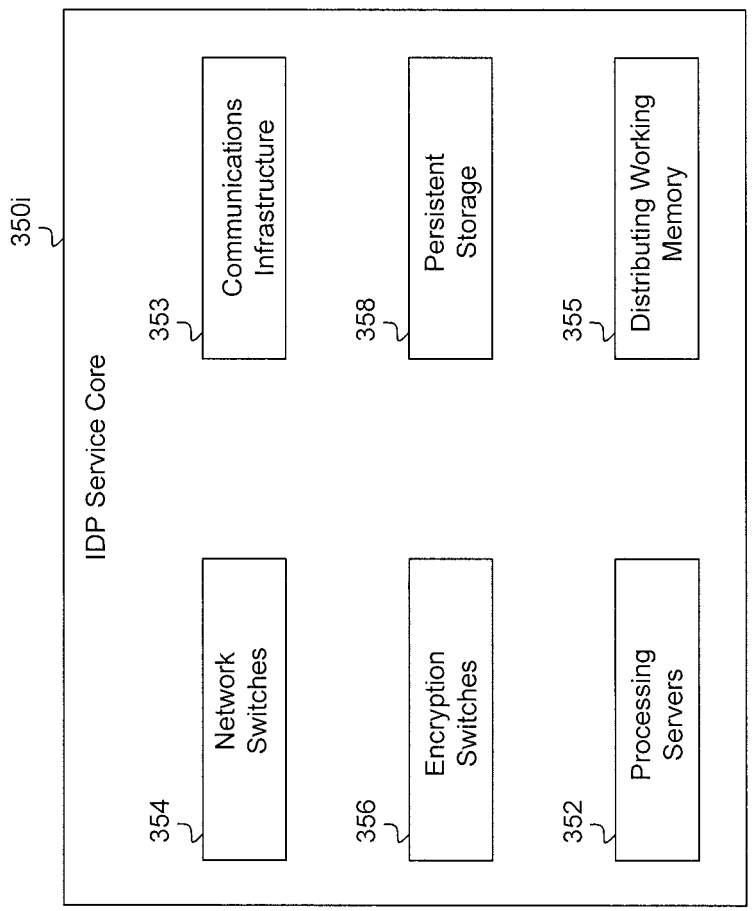
FIG. 3 is a diagram of an example of a service core for an Internet-accessible cloud of a single identity provider in a cloud computing environment in accordance with some embodiments.

FIG. 3 shows an example of an IDP service core 350-N of the single IDP that includes one or more servers 352 (e.g., Linux, Windows, blade servers), distributed working memory 355 (e.g. IMDB, MMDB, memory resident database, etc.), and one or more network switches, including network switch 354 and/or encryption switch 356. In various embodiments, IDP service core 350 software of the single IDP is installed on a Windows, Linux, or similar server in a secure data center. In various embodiments, IDP service core 350-N includes a persistent storage unit 358 (e.g. NoSQL, MySQL cluster, database). In various embodiments, persistent storage unit 358 is configured to run on a database service (e.g. Relation Database Service). In various embodiments, distributed working memory 355 is software running on server 352 and includes a plurality of in-memory data grids (e.g. IMDB, MMDB, memory resident, data grids), server 352 is a blade server running the distributed working memory software and communicating with each respective user interface 110-N via an object-oriented data interchange format such as JavaScript Object Notation (JSON) and providing, for example, NoSQL, or MySQL cluster, persistence. For example, IDP service core 350-N may be hosted on a web services cloud computing infrastructure and include a Domain Name Server (DNS) (e.g. Route 53 DNS) (not shown), an Elastic Load Balancer (ELB) (not shown) to distribute traffic across servers 352, Elastic Compute Cloud (EC2) (not shown) instances to host IDP service core 350-N, and an electronic mail service for electronic mail delivery. In various embodiments, DNS server (not shown) is configured to route Internet web traffic (e.g. HTTP, HTTPS) to a registered domain of the single IDP or registered domains of respective Internet services of respective registered RPs, to servers 352 or ELB (not shown). In various embodiments, ELB (not shown) is configured to distribute received traffic to a selected IDP domain for IDP service core 150 running, for example, within Internet Information Services on Windows 2012 servers hosted on one or more EC2 servers. In various embodiments, cloud computing Internet centric environment 100 includes a traffic filtering module that is configured to only allow HTTP and HTTPS protocols to access the EC2 server. In various embodiments, distributed working memory 355 can provide scalability, distribution and/or resiliency to the architecture of IDP service core 350-N of the single IDP. In various embodiments, IDP service core 350-N of the single IDP includes a plurality of distributed nodes built on top of distributed working memory 355 using distributed working memory software.

In various embodiments, IDP service core 350-N of the single IDP includes suitable database software running in conjunction with IDP software of the single IDP, such as, for example with identity repository 140. In various embodiments, identity repository 140 is an identity store and stores registration information of single IDP registered Internet users and/or single IDP registered Internet user devices such as, for example, Internet user names, electronic mail addresses, public key portions of dID app created authentication tokens, anonymous identifiers, device identifiers of one or more Internet user devices, etc. In various embodiments, identity repository 140 stores registration information of single IDP registered relying parties and single IDP registered Internet services provided by such single IDP registered relying parties such as, for example, relying party identifiers (e.g. relying party name, relying party image, relying party logo) that are visually perceptible when displayed on a page of the dID app and/or when displayed on a web page belonging to the relying party, Internet service identifiers (e.g. pseudorandom string uniquely generated for each Internet service), one or more respective call-back Internet addresses for each Internet service, one or more respective call-back Internet addresses for each relying party, respective base Internet addresses for each Internet service, respective base Internet addresses for each relying party, and/or Internet service secrets. It is understood that to be cryptographically secure, a pseudorandom sequence must be unpredictable where a secret key, or seed, is used to set the initial state of the pseudorandom sequence generator, and where a pseudorandom sequence generator produces a pseudorandom sequence with a period that is long enough so that a finite sequence of reasonable length is not periodic. In various embodiments, a base Internet address may be a base Uniform Resource Locator (URL) for a particular Internet service for a particular relying party. In some embodiments, a base Internet address may be a base Uniform Resource Locator (URL) for a particular relying party. In various embodiments, a base Internet address does not include http or any subdomain. In various embodiments, a call-back Internet address may be a re-direct URL that determines where the single IDP re-directs a web browser of an Internet user requesting access to a particular Internet service of a particular relying party over the Internet in response to the single IDP's validation of an associated approved authentication challenge message. In various embodiments, a call-back Internet address is a fully qualified URL such as, for example, a URL including https and a subdomain (e.g. "www" (world wide web)). In various embodiments, identity repository 140 can be deployed on a server in a secure data center of the single IDP.

Referring again to FIG. 1, the Internet user interface module 110 provides an interface between Internet user devices 102-N, 104-N, 106-N of a plurality of Internet users and the cloud 100 (e.g. a public cloud). The Internet user in this context may refer to a customer N of the cloud (e.g. employee, government agency, agent, analyst, etc.) provided by an IDP service core 150-N of the single IDP, or an individual N at a customer site with a network connection to the cloud 100, and that is requesting authorization to access one or more Internet services provided by one or more relying parties 160-i. In various embodiments, the user interface 110 is a representational state transfer (REST) application programming interface (API) based on a JSON model to provide access to many types of clients (e.g. thick and thin clients, human wearable (HW) device 106 clients, mobile device 104 clients, etc.) over the Internet. In various embodiments, user interface module 110 provides a Web-based interface (e.g. via a web-based application) to provide access over the Internet to many types of clients (e.g. HW device 106 clients, mobile device 104 clients, desktop 102 clients, etc.). In various embodiments, user interface 110 provides platform/device independent visualization. In various embodiments, devices (e.g. 102, 104, 106) can include any suitable device such as, for example, a microprocessor-based computer terminal, a mobile device, a kiosk, a personal digital assistant, a cellular phone, a tablet, an electronic personal planner, a slate tablet, a booklet computer, a convertible notebook, a phablet, a smart phone, a human-wearable computing device, a networked microprocessor-based computer in an automobile, etc. In various embodiments, user interface 110 provides portal-based network services to many types of clients (102, 106, 104). In various embodiments, user interface module 110 includes web services. In various embodiments, user interface module 110 provides a command driven interface (e.g. DOS, Linux, etc. command driven interface). The user interface module 110 can include a networked portal, including a separate portal for each N customer of IDP service core 150-N of the single IDP.

Cloud computing Internet-centric environment 100 can also include respective communications interface modules A 130 and B 135 communicating with IDP service core 150-N of the single IDP, authentication engine 120 of the single IDP, user interface 110 for each of a plurality of Internet users, and/or RP interface 165-*i* for each of a plurality of RPs and to a respective one or more Internet services provided by each of the plurality of RPs. Communications interface modules A 130 and B 135 allow software and data to be transferred between service core 150-N of the single IDP, authentication engine 120 of the single IDP, RP Internet services of each of the RPs 160-*i*, and/or Internet user devices (102, 104, 106) over the Internet. Examples of communications interface modules A 130 and B 135 can include a modem, Ethernet card, wireless network card, a Personal Computer Memory Card International Association (PCMCIA) slot and card, or the like. Software and data transferred via communications interface modules A 130 and B 135 can be in the form of signals, which can be electronic, electromagnetic, optical, or the like that are capable of being received by communications interface modules A 130 and B 135. These signals can be provided to communications interface modules A 130 and B 135 via a communications path (e.g., channel), which can be implemented using wire, cable, fiber optics, a telephone line, a cellular link, a radio frequency (RF) link and other communication channels. These signals can be provided to communications interface modules A 130 and B 135 via Open ID Connect protocols.

The Identity Provider Service of the Single Identity Provider

In various embodiments, Identity Provider (IDP) service 150 of the single Identity Provider serves as an authentication broker between a plurality of Relying Parties (RP) 160-*i* and respective Internet user devices for a plurality of Internet users requesting respective access to respective Internet services provided by each of the plurality of RPs 160-*i*, as a repository of Internet user identities, Internet user device identities, RP identities, and/or Internet service identities for Internet services provided by RPs, and as a management interface for Internet users, their devices, and RPs.

In various embodiments, to broker authentication requests, IDP service core 150 of the single IDP uses Open ID Connect protocols while interacting with respective one or more RP Internet services of each of a plurality of RPs 1604 over a communications network, and cryptographic validation when interacting with dID app (FIG. 1) residing on Internet user devices over a communications network, other applications operating on Internet user devices over a communications network, web browsers operating on Internet user devices over a communications network, via authentication engine 120 and respective communications interface modules A 130, B 135. In various embodiments, as discussed herein, the IDP service core 150 of the single IDP can leverage Internet user device operating system notification frameworks such as Google's Android, Apple's iOS, Windows, Blackberry OS, and MAC OS.

Figure 7:
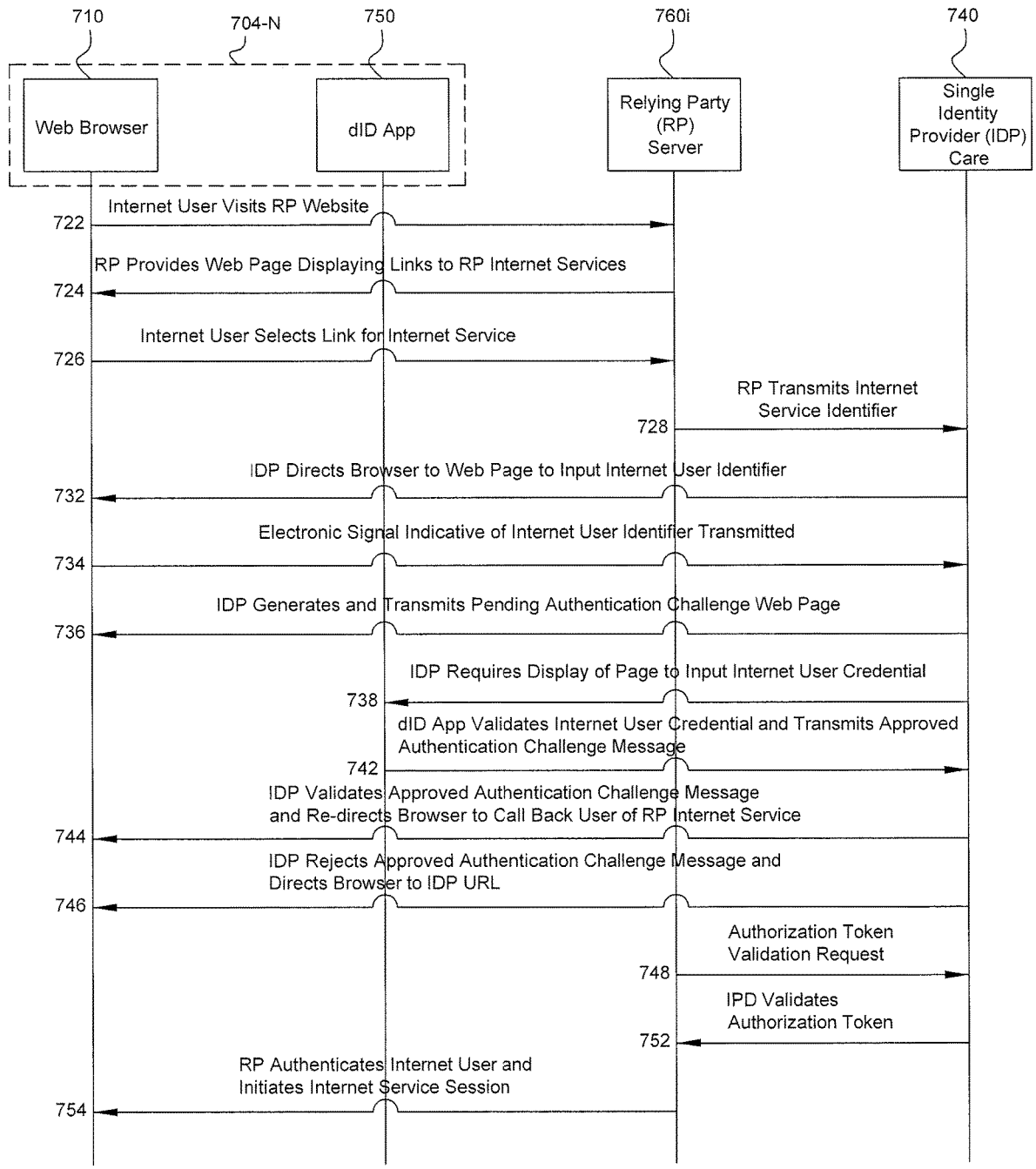
FIG. 7 is a flow chart illustrating a computer-implemented method of authorizing respective access by each of a plurality of Internet users to a respective one or more Internet services provided by each of a plurality of Internet service providers according to some embodiments.

In various embodiments, as a repository of information (e.g. identity repository 140), IDP service core (150, 250) of the single IDP can store respective Internet user and/or respective Internet user device identity records, his/her respective public key portions of dID app created authentication tokens and bindings, respective RP identity records and/or respective Internet service identity records for respective Internet services provided by each RP, and a history of authentication requests (e.g. pending, expired, acted upon, etc.) transmitted over the Internet. In various embodiments, an Internet user N can interface over the Internet with IDP service core 150-N via user interface 110 and communications interface A 130, authenticate to IDP service core 150 via authentication engine 120 and using dID app (FIG. 7) residing on one of more of his/her devices (e.g. his/her mobile device) and a web browser residing on one or more of his/her devices (e.g. his/her mobile device) to manage his/her identity, his/her devices respective identity, and his/her authentication tokens. In various embodiments, and as discussed in more detail below, a dynamic catalog of respective Internet users' and/or respective Internet users' device(s) identity records maintained in identity repository 140 can be changed based on an Internet user's input, an Internet user device(s)' approval/rejection by the single IDP, and/or an IDP administrator's input (e.g. based on a user's subscription to the IDP service) of the single IDP. In various embodiments, IDP service core 150 of the single IDP can generate a unique anonymous identifier code for an Internet user. Internet users within one organization can be segregated from Internet users in other organizations and Internet users in one portion of an organization can be can be segregated from Internet users in other portions of the same organization. Internet users working on one project for an organization can be segregated from Internet users working on another project for the same organization. Although the breakdown is by organizations, portions of organizations, or projects within organizations, in these examples, portals may be used for providing access to Internet users in other segregational or classification schemes. Internet users are referred to generically as users of devices (such as for example devices 102, 104, 106).

The authentication engine 120 of the single IDP manages and provides multifactor device based authentication capabilities for IDP service core (150, 250) of the single IDP to authorize respective access by each of a plurality of Internet users to a respective one or more Internet services provided by each of a plurality of Internet accessible RPs, dID application (FIG. 1), RPs 160-*i* (260-*i*), and respective Internet services provided by each of the RPs, including without limitation the operations of Internet user(s), Internet user device(s), RP(s), and RP(s)' services, registration, validating Internet user(s), Internet user device(s), RP(s), and RP(s)' services, registration information, encrypting and decrypting information, binding key portions of authentication tokens and Internet user and/or Internet user device information, generating authentication challenge request notification messages, and/or validating Internet user authentication requests to access Internet services provided by RPs.

In various embodiments, IDP service core 150 of the single IDP can also operate as a networked interface for respective administrators 108-*i* of RPs 160-*i*. In various embodiments, IDP service core 150 can allow various RPs 160-*i* to respectively register the RP and Internet services provided by the RP, with IDP service core 150 over a communications network, and provide registration information about RPs 160-*i* respective Internet services over a communications network (e.g. using a web browser to interface with a web server of the single IDP). In various embodiments, the single IDP requires relying parties 160-*i* to register with the single IDP in order for the single IDP to broker Internet users' access Internet services provided by the RPs. In various embodiments, the single IDP requires each RP 160-*i* to provide an input (e.g. via respective RP interface 165-*i*) that adds each respective RP Internet service for which the respective RP desires the single IDP to broker Internet users' access. In various embodiments, IDP service core 150 requires, during an initial registration process, the single IDP requires each RP 160-*i* to provide (e.g. via respective RP interface 165-*i*) respective registration information such as, for example, one or more respective RP identifiers (e.g. RP name, RP image, RP logo) that are visually perceptible when displayed on a page of the dID app and/or when displayed on a web page belonging to the RP 160-*i*, one or more respective call-back Internet addresses for each respective Internet service provided by the respective RP 160-*i* and/or for the respective RP 160-*i*, and a respective base Internet address for each Internet service provided by the respective RP 160-*i* and/or for the respective RP 160-*i*. In various embodiments, a POST is performed with an appropriate string of data, e.g., JSON data.

In various embodiments, IDP service core 150 can generate a respective unique RP Identifier Code (RPIC) for each RP 160-*i*. In various embodiments, the unique RP Identifier code allows the IDP service core 150 to identify authentication requests received over a communications network from varied RPs 160-*i*. In various embodiments, during an initial registration process, IDP service core 150 may generate a respective unique Internet service identifier (e.g. uniquely generated pseudorandom string) for each Internet service provided by each respective RP. In various embodiments, the unique Internet service identifiers allow the IDP service core 150 to identify an Internet user request to access the particular Internet service from a plurality of Internet services provided by a plurality of RPs 160-*i*. In various embodiments, the unique Internet service identifiers allow the IDP service core 150 and respective RP 160-*i* to validate respective IDP service core 150 re-directions to a respective call back Internet address. In various embodiments, IDP service core 150 can generate a respective unique Internet service secret (e.g. uniquely generated pseudorandom string) for each Internet service provided by each respective RP. In various embodiments, the respective unique Internet service secrets allow the IDP service core 150 and respective RP 160-*i* to validate respective IDP service core 150 re-directions to a respective call back Internet address. In various embodiments, the respective unique Internet service secrets and respective unique Internet service identifiers allow the respective RP 160-*i* to interface with IDP service core 150 to configure their respective Internet service to accept Internet user requests to access the respective Internet service by implementing Open ID Connect protocols such as, for example, an Authorization Code Flow of Open ID Connect Protocols (e.g. OAuth 2.0). In various embodiments, IDP service core 150 can generate a respective unique pseudorandom domain identifier (e.g. a unique pseudorandom string) for each RP and/or for each Internet service provided by each respective RP. In various embodiments, IDP service core 150 may prompt the respective RP to create a TXT record at the domain name server (DNS) (not shown) at the respective base Internet address for the RP, and/or at the respective base Internet address for the respective Internet service provided by the respective RP, using the respective unique pseudorandom domain identifier. In various embodiments, IDP service core 150 may query the domain name server (DNS) (not shown) to locate a respective unique pseudorandom domain identifier to activate the respective RP, and/or the respective Internet Service provided by the respective RP, such that the IDP service core 150 will accept authentication challenges from the respective RP, and/or Internet user requests for access to the respective Internet Service provided by the respective RP.

Figure 2:
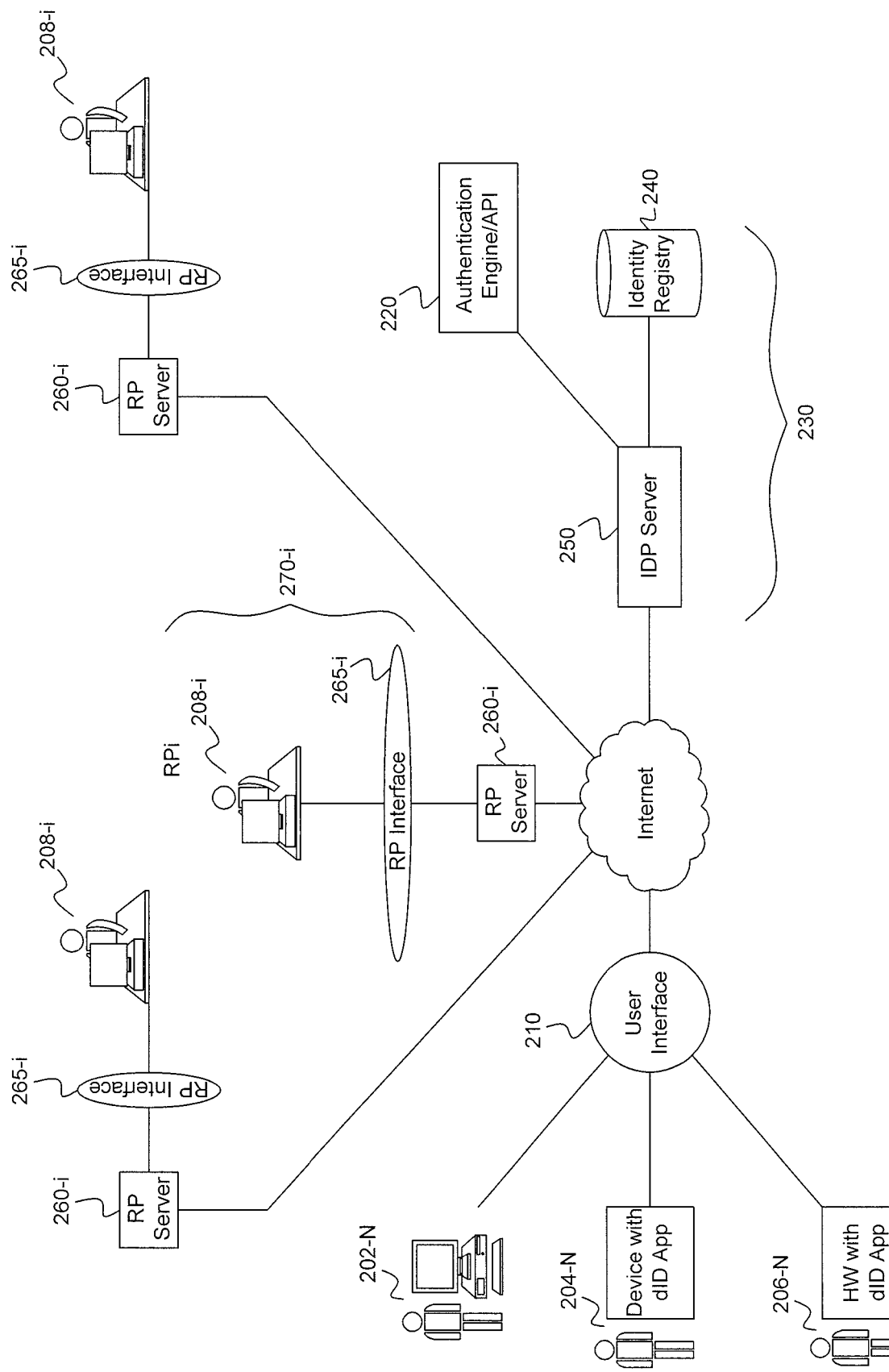
FIG. 2 is a block diagram of an example of a system in accordance with some embodiments of the present disclosure.

Referring now to FIG. 2, a system 200 according to some embodiments includes one or more devices (e.g. HW device 106, mobile device 104, desktop device 102) of one or more Internet users, a remote IDP network 230, and remote RP networks 270 to respective RPs 160-*i*. The remote IDP network 230 may include networked one or more IDP servers (e.g., server computers) 250, authentication engine 220, and one or more identity repositories 240. For convenience, the following description refers to server 250 and repository 240, although any number of servers and/or storage units may be used. Authentication engine 220 can provide authentication services to various RPs and various Internet users over the Internet as described for authentication engine 120. Repository 240 can store, for example, registration information of single IDP registered Internet users and/or single IDP registered Internet user device(s) such as, for example, Internet user names, e-mail addresses, public key portions of dID app created authentication tokens, anonymous identifiers, device identifiers of one or more Internet user devices, and/or a history of authentication requests (e.g. pending, expired, acted upon, etc.) transmitted over the Internet. In various embodiments, IDP servers 250 includes suitable database software running in conjunction with IDP software, such as, for example with identity repository 240. In various embodiments, identity repository 240 can be deployed on a server of the single IDP in a secure data center.

Figure 8:
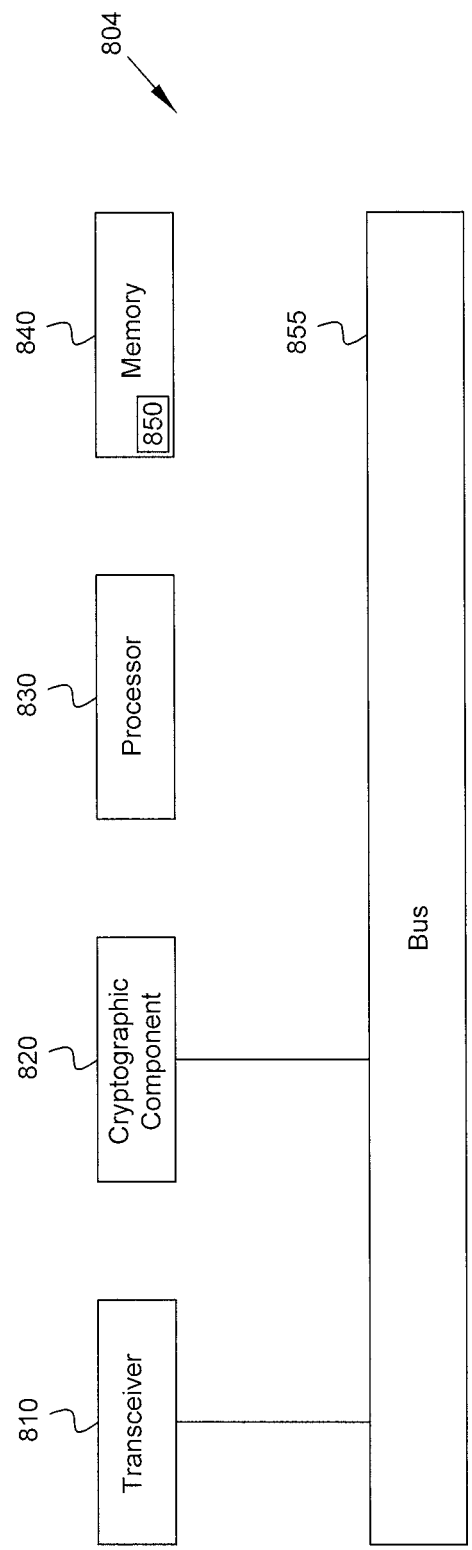
FIG. 8 is a block diagram of a mobile device according to some embodiments.

Referring now to FIG. 8, each mobile or hand-wearable device 804 (mobile device 104 or HW device 106) can include a transceiver 810, a cryptographic component 820, a computer processor 830, one or more memory components 840, and a device identity provider application (dID app such as, for example, a PrivaKey™ device identity and authentication application) 850 stored in the memory component(s) 840. Memory component(s) 840 may be any suitable type of memory of various types of memory, e.g., flash memory, RAM, in-memory data grids, in-memory database (e.g. IMDB, MMDB, memory resident database, etc.), keychain software (e.g. Apple® Keychain) Device 804 may also include an input component such as a keyboard (not shown). The keyboard may be a physical keyboard with buttons that the user may press, or it may be a virtual keyboard that is displayed on a touch sensitive screen that is also used to display output. A microphone, a camera, an identification code reader, and/or a speech recognition module may optionally be used for providing input to device 804. In various embodiments, device 804 includes a biometric identification reader (e.g. fingerprint scanner, camera) configured to read biometric information (e.g. a fingerprint, a facial image) from an Internet user. In various embodiments, device 804 includes an identification code reader (e.g. QR code reader, barcode reader) configured to read an IDP-service generated recovery key embedded in a QR code and/or barcode on, for example, a printed paper to allow an Internet user to regain access to Internet services provided by RPs that are pre-registered with IDP service core (150, 250) and if all of the one or more Internet user's devices (104, 106, 102), having an instance of the dID app installed thereon, are destroyed, lost, or stolen.

Transceiver 810 is capable of communication with a remote device (e.g., server 150, 250) over a wired or wireless communication link, e.g., using a communications protocol such as HTTP or HTTPS or Open ID Connect. Cryptographic component 820 may include a cryptographic engine for generating encryption keys including, for example, cryptographically secure symmetric keys (e.g. for HTTPS transmissions over a network security protocol such as, for example, SSL or TLS), a cryptographically secure encryption key generated using inputs received from dID app, and/or an application programming interface call from a server of the single IDP 150, and a predetermined cryptographic algorithm (e.g. AES-256), and/or asymmetric key pairs. In various embodiments, cryptographic component 820 can be configured to perform hardware-based encryption, software-based encryption, and/or combinations thereof. In various embodiments, cryptographic component 820 can use one or more of such generated keys to encrypt and decrypt information. Device 804 may also include an audio output component (not shown) including a speaker or an audio output jack capable of providing audio to headphones via a suitable cable. Processor 830 is operatively coupled to control transceiver 810, cryptographic component 820, and memory component(s) 840, e.g., via a bus 855. The Internet user of device 804 can run dID application 850 to perform various tasks as described herein.

In various embodiments, the dID app 850 operates as an identity wallet, including generating an authentication token, including a respective asymmetric key pair of a private key portion and a public key portion, with which respective portions the dID app 850 and the single IDP service core (FIG. 1 (150), FIG. 2 (250)) use, in part, to complete or reject authentication requests to access an Internet service provided by a relying party (RP) 160-*i* and initiated by an Internet user selection of a link on a web page belonging to the relying party (RP) transmitted over the Internet, and brokered by the IDP service core (FIG. 1 (150), FIG. 2 (250)). In some embodiments, the IDP service core (150, 250) of the single IDP can broker the authentication request initiated by an Internet user selection of a link on a web page belonging to an RP 160-*i*, and transmitted from the RP 160-*i*, by pre-registering the Internet user and/or one or more of the Internet user devices (e.g. one or more of the Internet user devices where a respective instance of dID app 850 resides, the Internet user device associated with the Internet user's web-based authentication request), pre-registering the RP 160-*i* and the Internet service provided by the RP 160-*i* and to which the Internet user has requested access, requiring, in response to the Internet user's selection of the link on the web page belonging to the RP 160-*i*, that the RP 160-*i* send an API call (e.g. a GET or POST request) to the identity service provider including a call-back Internet address (e.g. URL), validating the call-back URL with one or more pre-registered Internet addresses (e.g. URL), identifying the requested Internet service with an Internet service identifier in the request, requiring the web browser to display a web page belonging to the identity service provider and requiring input of an Internet user identifier (e.g. an electronic mail address, an IDP service generated anonymous identifier, an identifier derived from a pre-existing, external token, such as a U.S. Government issued Personal Identity Verification card, etc.), requiring the dID app 850 to display a page to input an Internet user credential (e.g. PIN, biometric factor, combination thereof), receiving, via an API call from dID app 850 an approved authentication challenge message, validating the received approved authentication challenge message electronic signals using the public key portion stored (e.g. in identity registry 140, 240), and re-directing the web browser of the Internet user to a pre-registered callback Internet address of the requested RP 160-*i* Internet Service, or directing the web browser of the Internet user to an Internet address of the single IDP, based on the result of the validation. In various embodiments, the authentication engine 120 of IDP service core (150, 250) and communicates and displays the appropriate web page for the authenticated Internet user to access the Internet service provided by the RP 160-*i*, or the appropriate web page for the unauthenticated Internet user, at the user interface (110, 210). In various embodiments, the RP 160-*i* and IDP service core (150, 250) further validate the result of the authentication with a validation token (e.g. identifier token) transmitted to the RP 160-*i* in an API call when the web browser was re-directed to the pre-registered callback Internet address of the requested RP Internet Service. In various embodiments, the validation token is a JSON Web Token (JWT).

In various embodiments, a server of the RP 160-*i* may transmit a service call to IDP service core (150, 250) including a received validation token, a unique Internet service secret, a unique Internet service identifier, to an Open ID Connect discovery endpoint at the IDP service core (150, 250) using, for example, a network security protocol such as Secure Socket Layer (SSL) or Transport Layer Security (TLS), IDP service core (150, 250) may validate the received validation token, Internet service secret, and Internet service identifier against pre-registered values, and may transmit, via a return API call to the server of the RP 160-*i* using SSL or TLS, a subject identifier used to identify the Internet user to RP 160-*i*. In various embodiments, the subject identifier is an OpenID Connect Protocol subject identifier, i.e. a locally unique and never reassigned identifier string within the IDP service core (150, 250) for the Internet user, which is intended to be consumed by RP 160-*i*, does not exceed 255 ASCII characters in length, and is case sensitive (e.g. 24400320 or AItOawmwtWwcT0k51BayewNvutrJUqsvl6qs7A4). In various embodiments, IDP service core (150, 250) may validate an Internet service secret and Internet service identifier, received from a server of the RP 160-*i* using SSL or TLS, against pre-registered values, and may transmit, via a return API call to the server of the RP 160-*i* using SSL or TLS, a validation token that the RP 160-*i* may parse a subject identifier from to identify the Internet user to RP 160-*i*. In some embodiments, an encryption switch (356) of the IDP service core (150, 250) may digitally sign the validation token with a private key of the IDP service provider (150, 250), transmit the digitally signed validation token in an API call to the RP 160-*i* using communications interface B 135, a server of the RP 160-*i* may validate the validation token using a public key of the IDP service provider, and may parse a subject identifier out of the validated validation token to identify the Internet user to RP 160-*i*. In various embodiments, a server of the RP 160-*i* may transmit a service call to an Open ID Connect discovery endpoint (e.g. at an IDP service core (150, 250) at/well-known/openid-configuration) to receive configuration details for the IDP service provider from the Open ID Connect discovery endpoint (e.g. the response includes a parameter jwks_uri, which identifies the location of the JSON Web Key Set, which includes the public key of the IDP service provider.)

In various embodiments, identity provider services using the dID app are made accessible to each Internet user of a respective instance of application 850 with a one-time license fee. For example, device 804 (104, 106) may be provided to Internet users with dID application 850 already provided (loaded or installed) therein to operate on the respective device operating system (OS) (e.g. Android, iOS, MAC OS, Windows, Blackberry OS, etc.), and the license fee incorporated into the cost of the respective device which may entitle the Internet users to usage of respective device 804 (104, 106) and respective dID application 850 for the lifetime of respective device 804 (104, 106). In some embodiments, dID application 850 may be made available for Internet users to download (e.g., from a website or another application for downloading device applications (e.g. Apple's App Store, Google Play Store, Blackberry World, Microsoft Store, etc.) for a one-time license fee. Thus, in various embodiments, Internet users can avoid having to pay on a per-authentication basis (e.g., fixed or variable fee per authentication request initiated by the Internet user requesting access to an Internet service provided by a RP) or on a subscription basis (e.g., involving a monthly or annual subscription fee). A one-time license fee may entitle the Internet users of dID application 850 to unlimited authentication requests initiated by each Internet user's respective requests to access respective Internet services provided by various RPs **160-*i***.

In various embodiments, RPs **160-*i* using the IDP service core 150 can be charged based on the number of IDP service core 150 and dID application 850 authentications for RP 160-*i* provided services. For example, the dID application 850 can be provided free-of-charge to Internet users (e.g. as a free download on his/her respective device 804, 104, 106) and IDP service core 150 can permit unlimited use of dID application 850 by Internet users at no charge but may charge each RP based on the respective number of authentications for the respective RP 160-*i*** provided services.

Internet User dID Application Interface

Figure 4A:
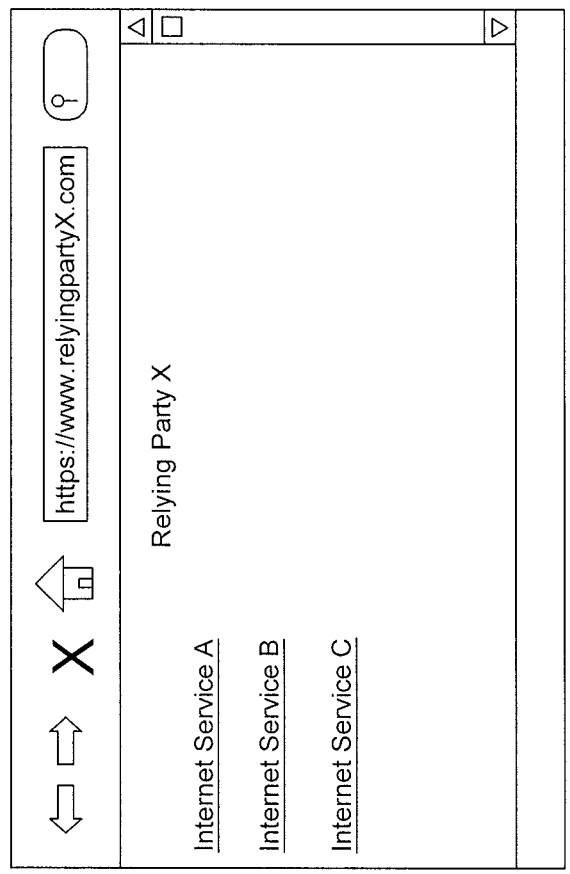
FIGS. 4A-4B are illustrative screenshots of examples of Internet user interfaces to relying party Internet services according to some embodiments of the present subject matter.
Figure 4B:
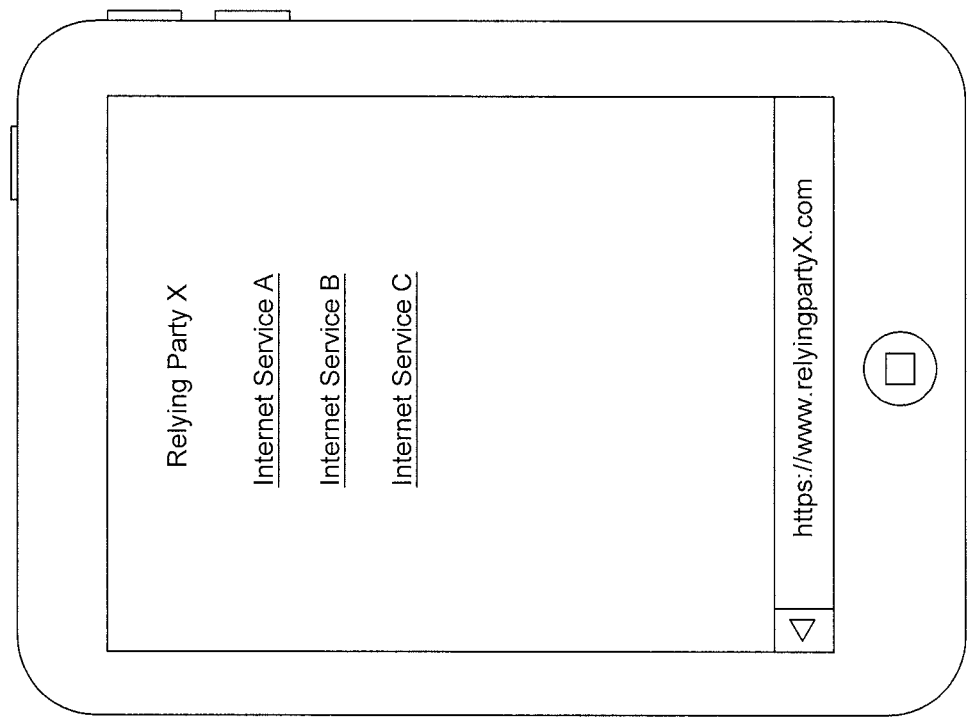

Referring now to FIGS. 4A-4B, illustrative screenshots of examples of Internet user interfaces to relying party Internet services according to some embodiments of the present subject matter are provided. With reference to FIGS. 4A and 4B, an example of a relying party (RP) (160, 260) website screenshot on a respective web browser of an Internet user device (102, 202) and a respective web browser of another Internet user device (804, 104, 204) according to some embodiments is provided. In the illustrated embodiments of FIG. 4A, dID app 850 Internet users make a selection of a link displayed on the Relying Party "X"'s web page identifying an Internet service provided by the RP using a keyboard, pointing device, e.g., a mouse or a trackball, or other kinds of devices to interact with Internet user interface (110, 210) and the RP's (**160-*i*, 260) website. In the illustrated embodiments of FIG. 4B, dID app 850 Internet users make a selection of a link displayed on the Relying Party "X"'s web page identifying an Internet service provided by the RP using a touch screen display. Input from the Internet user can be received in any suitable form, including acoustic, speech, or tactile input, and indicates the Internet's users request to access the selected Internet service provided by the RP. A web browser of any suitable device (e.g. 106, 206) can be utilized to display web pages of the RP (160-*i*, 260-*i***) website and to receive inputs from the Internet user.

In various embodiments, a call or request from a web browser to a server (e.g. a web server) of a relying party (e.g. relying party X) or to a server of a single identity provider may be made using HTTP or HTTPS. For example, HTTP defines several "verbs" including without limitation, GET, POST, PUT, HEAD, TRACE, OPTIONS, CONNECT, and DELETE. The single identity provider service may use any one or several of these verbs and may define a pattern of URLs to correspond to certain authentication or Internet service entities. For example, performing a GET on a given URL may be used to direct a web browser to an Internet address of, and displaying content of, a web page belonging to the single identity service provider. Performing a POST on a given URL may be used to direct a web browser to another Internet address of, and displaying content of, another web page belonging to the single identity service provider.

In some embodiments, an API call may return a single JSON object (which may have inner objects) (e.g. a JSON Web Token (JWT)), a list of JSON objects, or a location of a JSON object (e.g. a location of a JSON Web Key Set). The documentation for a specific API call may determine the type of returned object returned by the respective field (e.g., a validation token may have a "user identifier" field, a validation request may have a "validation token" field, an "Internet service secret" field, an "Internet service identifier" field, an authentication request may have a "call-back Internet address" field, an "Internet service identifier" field, etc.). Any number of fields may be specified, depending upon the particular service provided or requested by the API call. Furthermore, a default set of fields may be provided. In various embodiments, a response to an API call using JSONP (JSON with padding) may be employed to request data from a server in a different domain whereby the calling application supplies the name of a function in the global namespace. The respective API call, instead of returning the data, may return JavaScript to call this function and pass the appropriate data. For example, an API call may specify a query parameter "callback" setting it to the name of the function. The returned JSON may then be wrapped with "<function-name>("and");", for example. In various embodiments, APIs may include a variety of levels of security. For example, initial security may be implemented through the use of a TLS or SSL tunnel in communications over Communications Interface A 130 and over Communications Interface B 135 with single identity service provider core 150. In various embodiments, API calls made to single identity service provider core 150 may use HTTPS rather than HTTP and any call not so encrypted may be rejected.

Figure 5A:
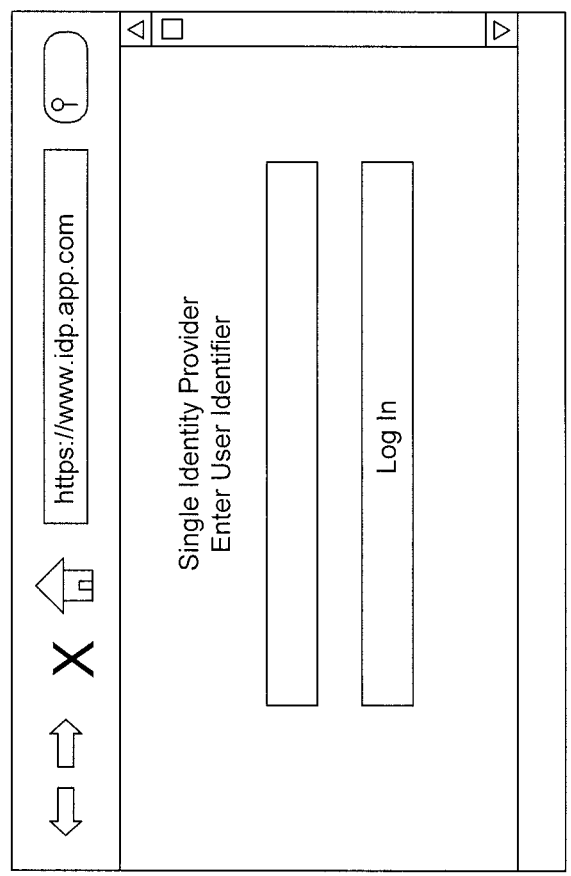
Figure 5B:
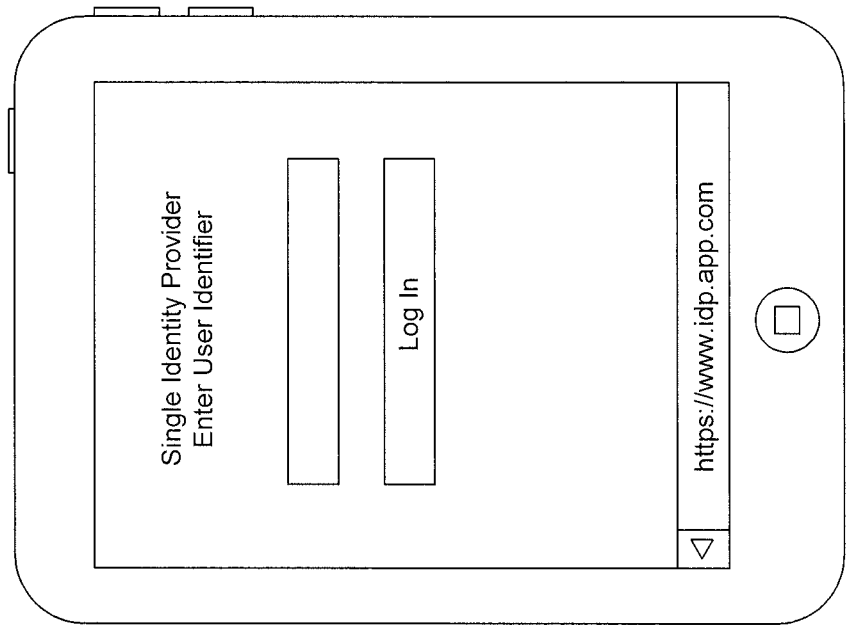

Referring now to FIGS. 5A-5D, illustrative screenshots of examples of Internet user interfaces to single identity provider Internet services according to some embodiments of the present subject matter are provided. With reference to FIGS. 5A and 5B, an example of a single identity provider (150, 250) website screenshot on a respective web browser of an Internet user device (102, 202) and a respective web browser of another Internet user device (804, 104, 204) according to some embodiments is provided. In the illustrated embodiments of FIGS. 5A and 5B, the respective web browser of the respective Internet user is directed to the website of the single identity provider (150, 250) in response to the respective Internet user's selection of a link displayed on the respective RP's web page (e.g. FIGS. 4A, 4B) that identified a respective Internet service provided by the RP. As shown in FIGS. 5A and 5B, the single identity provider (150, 250) requires dID app 850 Internet users to provide an input of an Internet user identifier (e.g. an electronic mail address, an IDP service generated anonymous identifier). In various embodiments, a POST may be performed with an appropriate string of data, e.g., JSON data. In the illustrated embodiments of FIG. 5A, dID app 850 Internet users provide an input of his/her Internet user identifier using a keyboard, pointing device, e.g., a mouse or a trackball, or other kinds of devices to interact with Internet user interface (110, 210) and the single IDP's (150, 250) website. In the illustrated embodiments of FIG. 5B, dID app 850 Internet users provide an input of his/her Internet user identifier using a touch screen display. Input from the Internet user can be received in any suitable form, including acoustic, speech, or tactile input, to initiate the dID app 850. A web browser of any suitable device (e.g. 106, 206) can be utilized to display web pages of the single identity provider (150, 250) website and to receive inputs from the Internet user.

Figure 5C:
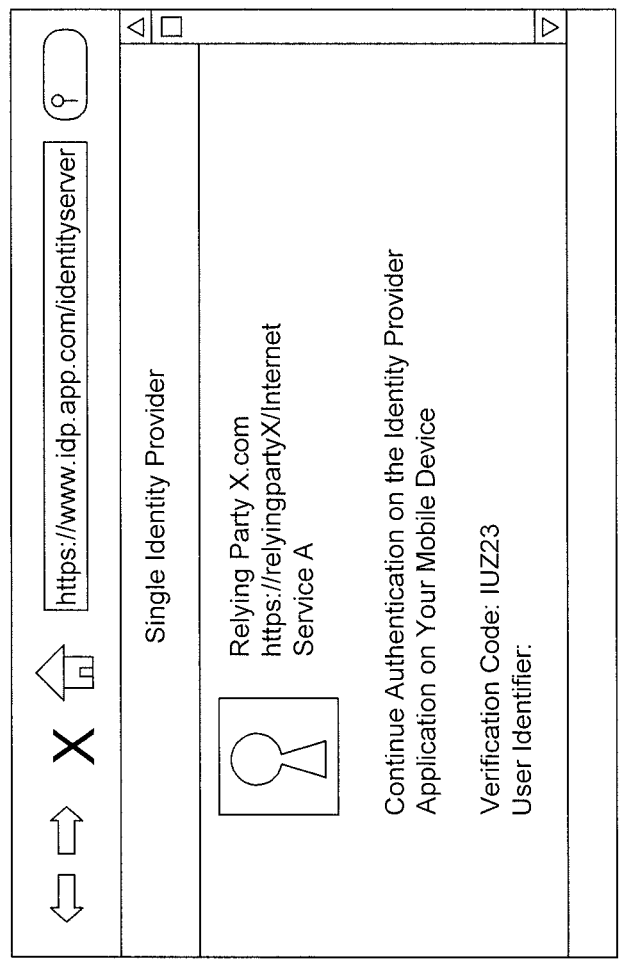
Figure 5D:
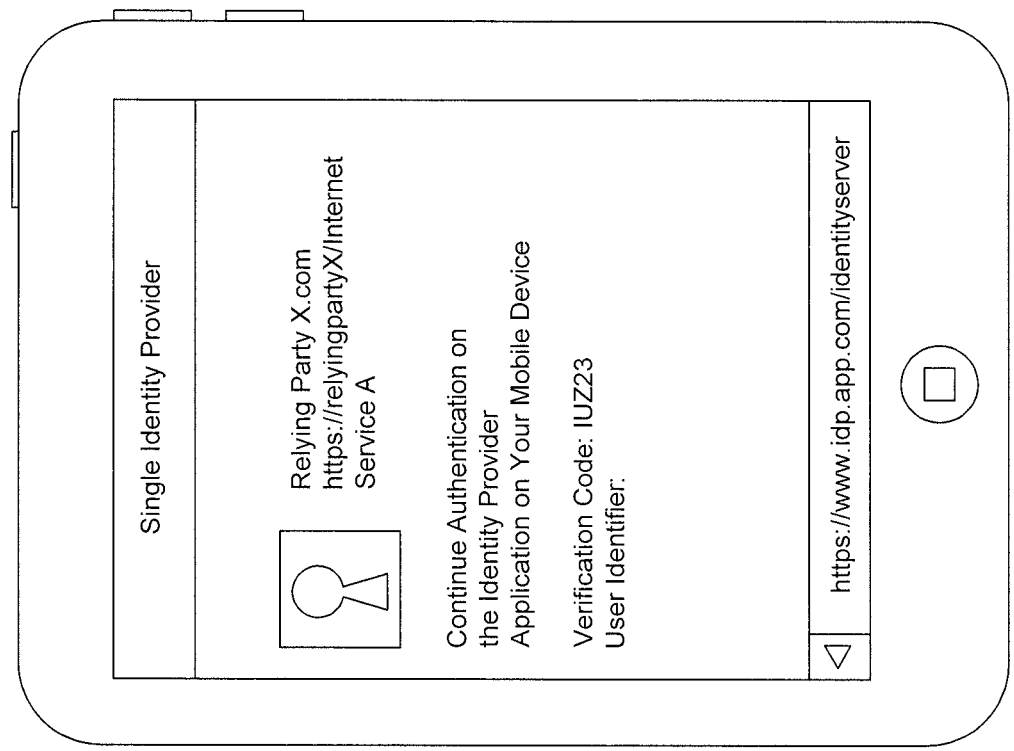

With reference to FIGS. 5C and 5D, an example of a single identity provider (150, 250) website screenshot on a respective web browser of an Internet user device (102, 202) and a respective web browser of another Internet user device (804, 104, 204) according to some embodiments is provided. In the illustrated embodiments of FIGS. 5C and 5D, the respective web browser of the respective Internet user is directed to another web page of the website of the single identity provider (150, 250) in response to the successful validation of the respective Internet user's identifier received by the single IDP (e.g. FIGS. 5A, 5B). In various embodiments, in response to successful validation of the Internet user identifier, the single IDP automatically generates, and transmits to the web browser, a web page such as the web page depicted in the examples of FIGS. 5A and 5B. As shown in the illustrated embodiments of FIGS. 5C and 5D, the respective web browser may display a web page that displays a respective visually perceptible identifier of the respective RP 160-i (e.g. RP name ("Relying Party X", RP image (key hole image)), a respective Internet address of a respective web page belonging to the respective RP 160-i (e.g. "https://www.relyingpartyX.com/InternetServiceA"), a notification to the Internet user, a verification code generated by the single IDP (e.g. "IUZ23"), and an Internet user identifier (e.g. the Internet user identifier received by the single IDP (e.g. FIGS. 5A, 5B)). A web browser of any suitable device (e.g. 106, 206) can be utilized to display web pages of the single identity provider (150, 250) website.

Figure 5E:
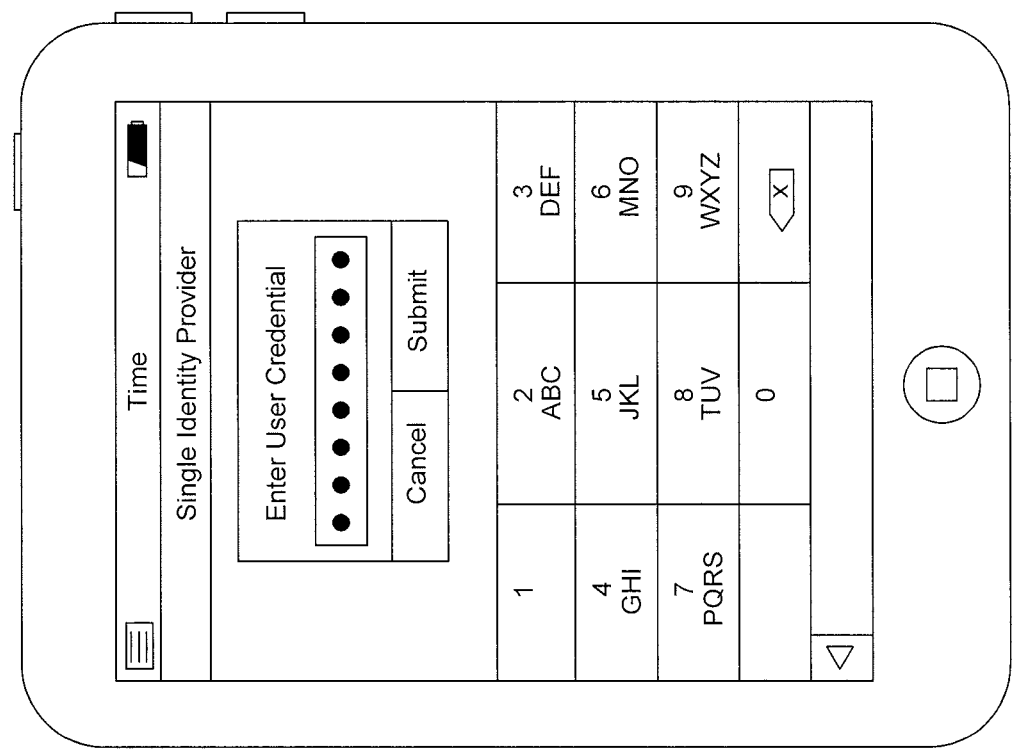
Figure 5F:
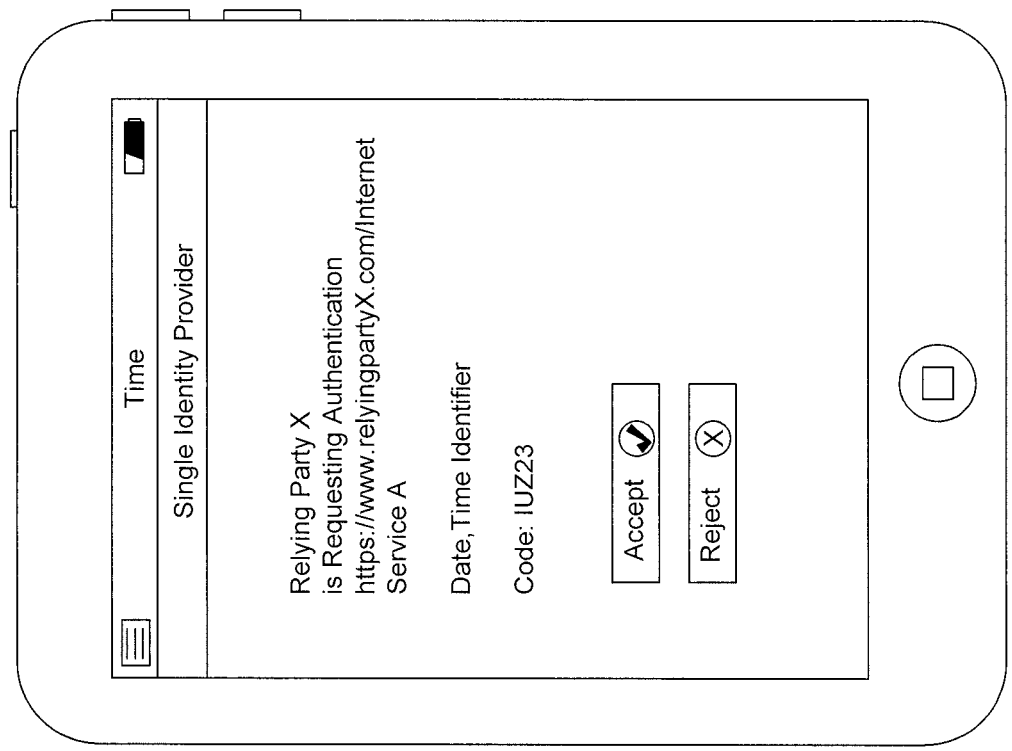
Figure 5G:
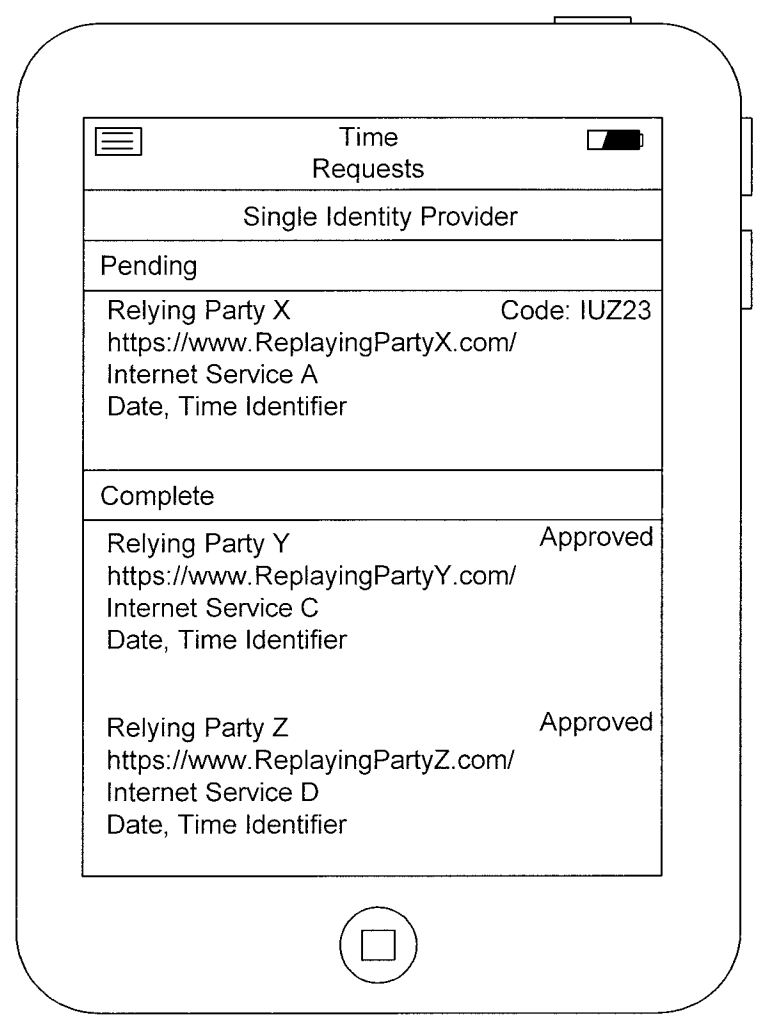

Referring now to FIGS. 5E-5G, illustrative screenshots of examples of Internet user interfaces to dID app 850 residing on an illustrative Internet user device (804, 104, 204) according to some embodiments of the present subject matter are provided. As shown in FIGS. 5E-5G, a touchscreen display may be provided. Input from the user of device (e.g. 804, 104, 106) can be received in any suitable form. In the illustrated embodiments, a device (e.g. 804, 104, 106) including a touch screen display is provided. In various embodiments, device (e.g. 804, 104, 106) can include any suitable device such as, for example, a mobile device, a personal digital assistant, a cellular phone, a tablet, an electronic personal planner, a slate tablet, a booklet computer, a convertible notebook, a phablet, a smart phone, a human-wearable computing device, a networked microprocessor-based computer in an automobile, etc. For example, an illustrative touch-screen display can be any suitable touch screen display. For example, touch screen display can be a cathode ray tube (CRT) touch screen display, a liquid crystal touch screen display (LCD), a LCD resistive touch screen display, a LCD capacitive touch screen display, a LCD multi-touch capable touch screen display, etc. In various embodiments, a processor of a device (e.g. 804, 104, 106) can support a markup language (e.g. HTML5, HTML4 with jQuery, CSS3, PHP 5.6) including a suitable selection API (e.g. native Drag and Drop API, Long Touch API) for Internet user selections on a display of the device (e.g. 804, 104, 106). In some embodiments, display of device (e.g. 804, 104, 106) is a display that is enabled by an input of the user that is non-tactile.

With reference to FIG. 5E, dID app 850 residing on a pre-registered device (e.g. 804, 104, 106) of the Internet user is initiated to display a page to receive an input of a user credential of the Internet user (e.g. PIN, biometric factor, combination thereof) in response to the successful validation of the respective Internet user's identifier received by the single IDP (e.g. FIGS. 5A, 5B). In various embodiments, single IDP core (150, 250) requires the dID app 850 to display the page to input the Internet user credential. In various embodiments, the processor of device (e.g. 804, 104, 106) automatically initiates dID app 850 in response to receiving an API call from a server (e.g. 352) of the single IDP (150, 250). In some embodiments, a notification to the Internet user displayed on a web page of the single IDP (e.g. FIGS. 5C, 5D) instructs the Internet user to initiate the dID app 850 to display the page to input the Internet user credential. In various embodiments, an Internet user may launch the dID application 750 by pressing (or clicking, or otherwise activating) an icon (or other suitable hypertext, image, hot spot, etc.) of the web page depicted in the examples of FIGS. 5A and 5B displayed on web browser 710. Referring to FIG. 5F, dID app 850 residing on the pre-registered device (e.g. 804, 104, 106) of the Internet user displays a page that displays a respective visually perceptible identifier of the respective RP 160-i (e.g. RP name ("Relying Party X", RP image (key hole image)) (e.g. FIGS. 5C, 5D), a respective Internet address of a respective web page belonging to the respective RP 160-i (e.g. "https://www.relyingpartyX.com/InternetServiceA") (e.g. FIGS. 5C, 5D), a date identifier (e.g. the date (e.g. "11/31/2014" of the Internet user's selection of a link displayed on the respective RP's web page (e.g. FIGS. 4A, 4B)), a time identifier (e.g. the time (e.g. "10:28:49 AM EDT" of the Internet user's selection of a link displayed on the respective RP's web page (e.g. FIGS. 4A, 4B)), and a verification code generated by the single IDP (e.g. "IUZ23") (e.g. FIGS. 5C, 5D), in response to the successful validation of the respective Internet user's credential received by the dID app 850 (e.g. FIG. 5E), and requiring an input (e.g. selection of "Accept" or selection of "Reject") from the Internet user to generate and/or transmit an approved authentication challenge message via an API call to a server (e.g. 352) of the single IDP. In various embodiments, dID app 850 automatically generates and transmits an approved authentication challenge message via an API call to a server (e.g. 352) of the single IDP in response to the successful validation of the respective Internet user's credential received by the dID app 850 (e.g. FIG. 5E).

With reference now to FIG. 5G, in various embodiments, dID app 850 residing on a pre-registered device (e.g. 804, 104, 106) of the Internet user may display a page that displays a plurality of respective visually perceptible identifiers of respective RPs 160-i (e.g. RPs name ("Relying Party X") (e.g. FIGS. 5C, 5D), respective Internet addresses of respective web pages belonging to the respective RPs 160-i (e.g. "https://www.relyingpartyX.com/InternetServiceA", "https://www.relyingpartyY.com/InternetServiceC, "https://www.relyingpartyZ.com/InternetServiceD") (e.g. FIGS. 5C, 5D, 5G), a date identifier (e.g. the date (e.g. "11/31/2014" of the Internet user's respective selection of respective links displayed on the RPs' respective web pages (e.g. FIGS. 4A, 4B)), a time identifier (e.g. the time (e.g. "10:28:49 AM EDT" of the Internet user's respective selection of respective links displayed on the RPs' respective web pages (e.g. FIGS. 4A, 4B)), respective verification codes generated by the single IDP (e.g. "IUZ23") (e.g. FIGS. 5C, 5D), and respective status identifiers (e.g. "pending", "completed", "rejected") of authorizing respective access by the respective Internet user to the respective requested Internet services provided by the respective RPs. In various embodiments, dID app 850 may display a page as illustrated in FIG. 5G in response to an Internet user input on a page displayed by dID app 850. In various embodiments, dID app 850 may be initiated to display a page as illustrated in FIG. 5G in response to the successful validation of the respective Internet user's identifier received by the single IDP (e.g. FIGS. 5A, 5B). In various embodiments, the single IDP automatically generates, and transmits via an API call to dID app 850, a page as illustrated in FIG. 5G, in response to the successful validation of the respective Internet user's identifier received by the single IDP (e.g. FIGS. 5A, 5B). In various embodiments, the single IDP automatically generates, and transmits via an API call to dID app 850, a page as illustrated in FIG. 5G, in response to an API call received from dID app 850.

Figure 5H:
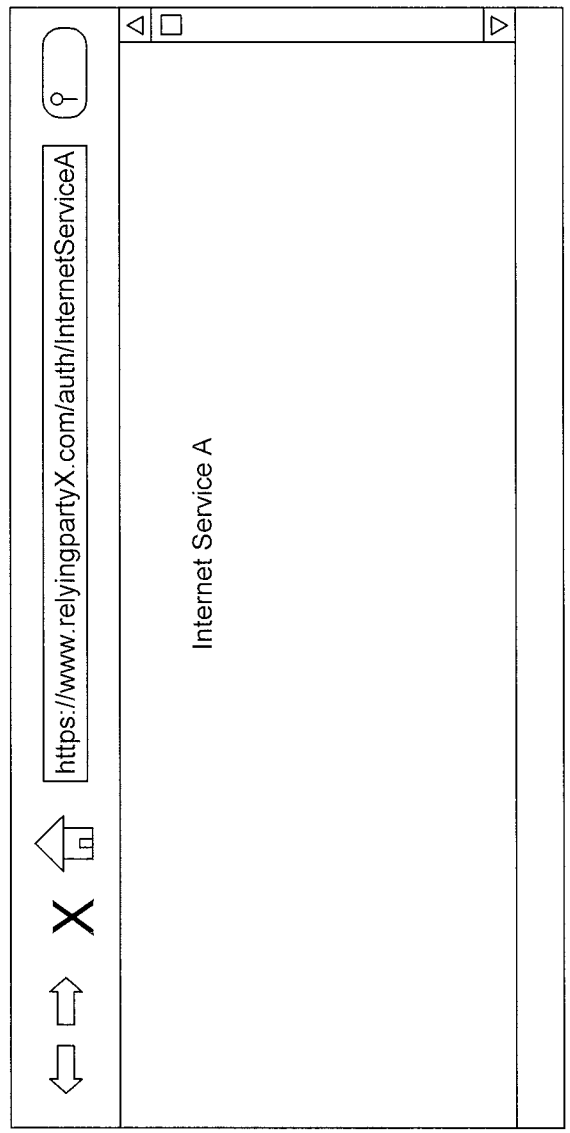

Referring now to FIG. 5H, an illustrative screenshot of an example of an Internet user interface to relying party Internet services according to some embodiments of the present subject matter are provided. In the illustrated embodiments of FIG. 5H, the respective web browser of the respective Internet user is re-directed by the single IDP (150, 250) to a pre-registered call-back Internet address for the respective Internet service of the respective RP in response to the single IDP successfully validating the received approved authentication challenge message transmitted from dID app 850, and the web browser of the respective Internet user displays a web page, such as the web page depicted in the example of FIG. 5H, that indicates the single IDP (150, 250) has authorized access by the respective Internet user to the respective requested Internet service. In various embodiments, in response to successful validation of the received approved authentication challenge message transmitted from dID app 850, the single IDP automatically generates, and transmits to the web browser, a web page such as the web page depicted in the example of FIG. 5H.

The dID Application: Internet User Registration and Management

In various embodiments, the dID Application 850 (e.g. running on Android or iOS or Blackberry OS or MAC OS or Windows) can provide identity registration and management services, authentication token generation and management services, encryption key generation and management services, and authentication services in conjunction with authentication engine 120 of the single IDP. For example, in various embodiments, an Internet user can access the dID app 850 on one or more respective mobile devices (104, 804) or on respective HW devices (106, 804) running the Android, Blackberry OS, MAC OS, or iOS operating system. In some embodiments, upon initial launch of dID app 850, dID app 850 can prompt the Internet user to register for Internet services provided by the single IDP.

Figure 6A:
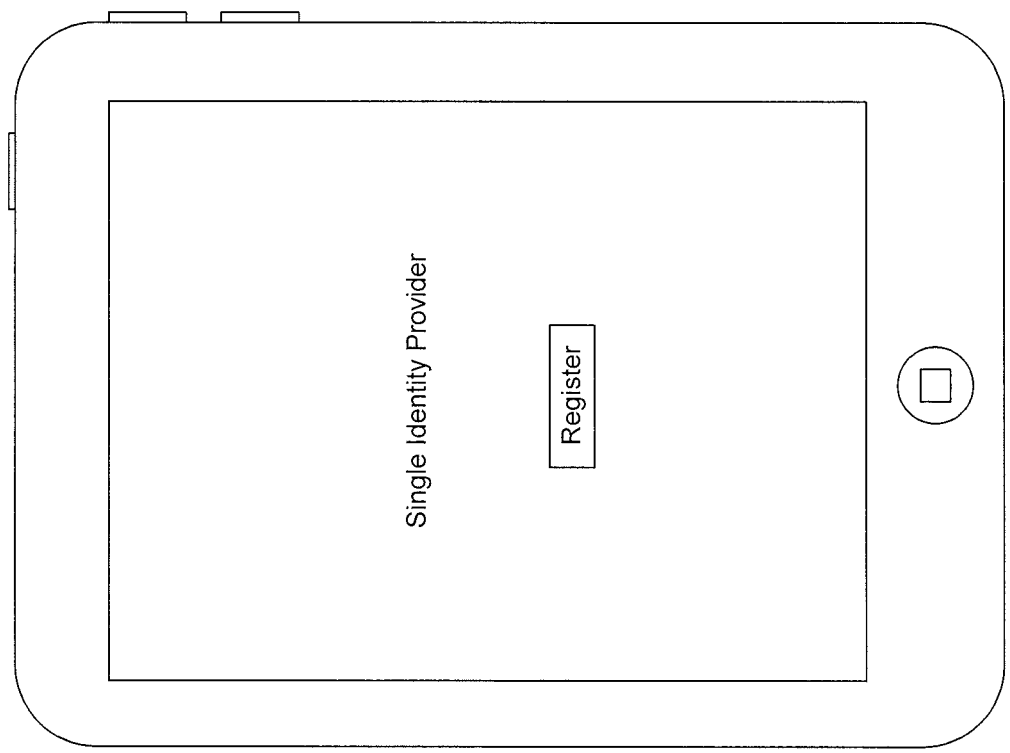
FIGS. 6A-6E are illustrative screenshots of examples of Internet user interfaces to an identity provider application residing on a device, to an application other than the identity provider application residing on the device, and to single identity provider Internet services.
Figure 6B:
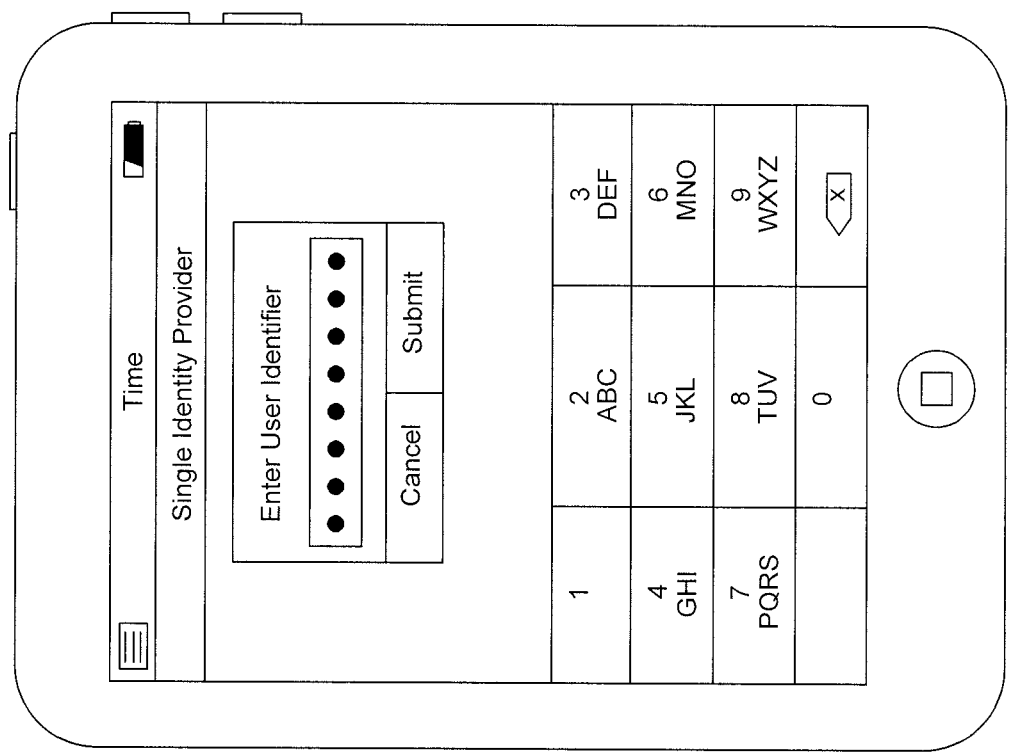
Figure 6C:
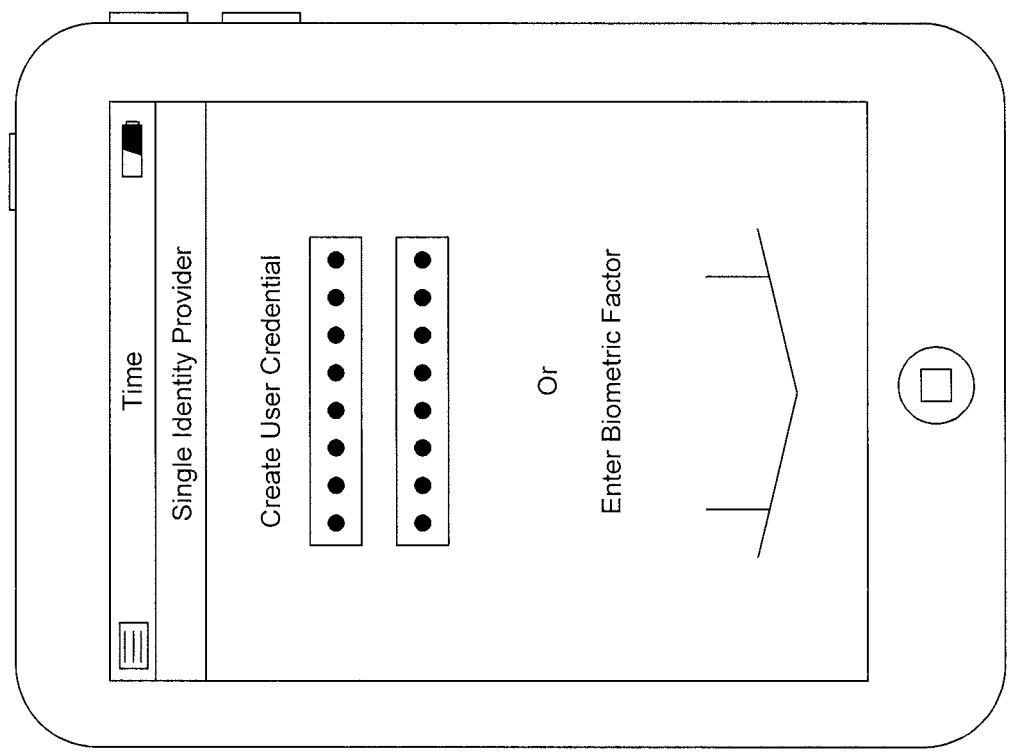

Referring now to FIGS. 6A-6C, illustrative screenshots of examples of Internet user interfaces to dID app 850 residing on an illustrative Internet user device (804, 104, 204) according to some embodiments of the present subject matter are provided. With reference to FIG. 6A, dID app 850 residing on a device (e.g. 804, 104, 106) of the Internet user may be initially launched to display a page to receive an input from an Internet user (e.g. a click (or press, or otherwise activate)) a hypertext (or hot spots, such as buttons, or an image) "Register" or the like on the page. In various embodiments, a computer-implemented process of an Internet user registering for Internet services provided by the single IDP may require, for example, an Internet user's input of registration information such as, for example, one or more of his/her email addresses, his/her first name and last name, on a page displayed via dID app 850. With reference to FIG. 6B, dID app 850 residing on a device (e.g. 804, 104, 106) of the Internet user may display a page to receive an input of an user identifier (e.g. an email address) of the Internet user in response to receiving an Internet user request to register on a page of dID app 850 (e.g. FIG. 6A). In some embodiments, IDP service core 150-N of the single IDP may generate an anonymous identifier for the Internet user N in response to receiving an API call from dID app 850 including electronic signals indicative of Internet user registration information. In various embodiments, a POST is be performed with an appropriate string of Internet user registration data, e.g., JSON data. In some embodiments, IDP service core 150-N of the single IDP may generate an anonymous identifier for the Internet user N in response to receiving an API call from dID app 850 including electronic signals indicative of an Internet user request to register on a page of dID app 850. In some embodiments, IDP service core 150-N of the single IDP may transmit the anonymous identifier to another application (e.g. an electronic mail application, an Internet user account at a website of the single IDP accessible by a web browser application) residing on a device (e.g. 804, 104, 106, 102) of the Internet user in an out-of-band interaction from dID app 850. In some embodiments, dID app 850 may automatically generate an anonymous identifier for the Internet user N in response to receiving an Internet user request to register on a page of dID app 850 (e.g. FIG. 6A) and display the generated anonymous identifier on a page of dID app 850 (not shown).

With reference now to FIG. 6C, dID app 850 residing on a device (e.g. 804, 104, 106) of the Internet user may display a page to receive an input of a user credential (e.g. an Internet user selected personal identification number (PIN) and/or a biometric factor of the Internet user) in response to receiving an Internet user request to register on a page of dID app 850 (e.g. FIG. 6A) or in response to receiving an input of a user identifier from the Internet user on another page of dID app 850 (e.g. FIG. 6B). In some embodiments, dID app 850 residing on a device (e.g. 804, 104, 106) of the Internet user may display a page to receive an input of a user credential in response to receiving an API call from IDP service core 150-N of the single IDP such as, for example, in response to the IDP service core 150-N generation of an anonymous identifier for the Internet user N. In various embodiments, dID app 850 receives an input of a biometric factor via signals received from a biometric identification reader (e.g. fingerprint scanner, camera) configured to read biometric information (e.g. a fingerprint, a facial image) from an Internet user.

Figure 6D:
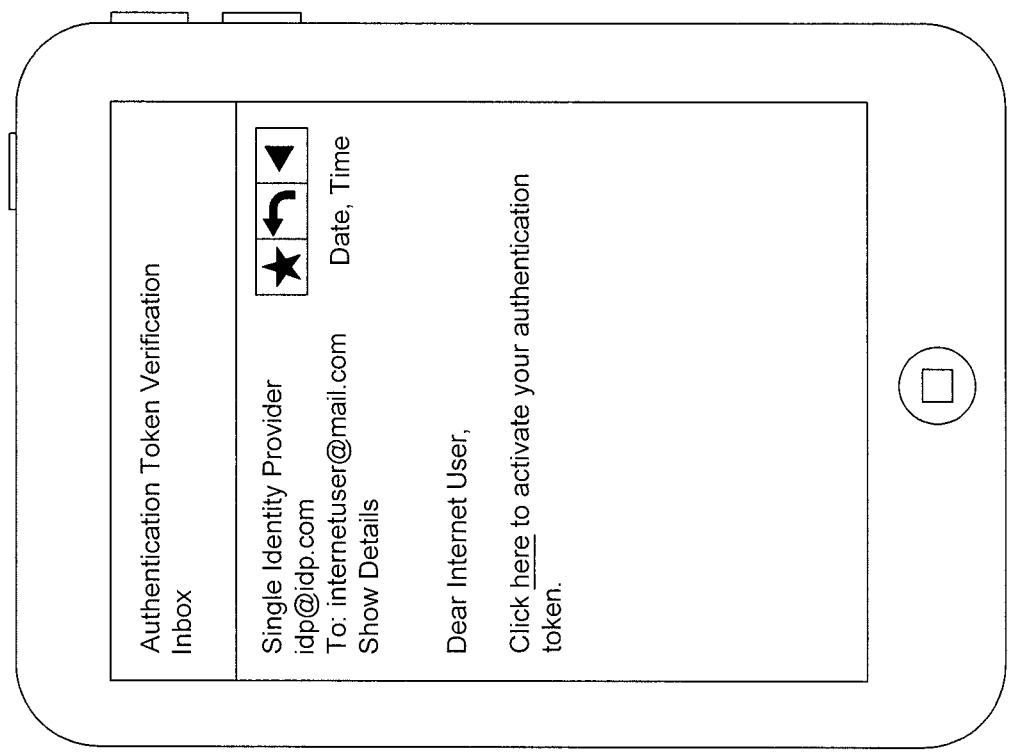

Referring now to FIG. 6D, an illustrative screenshot of an example of an Internet user interface to an application other than the dID app 850 residing on a device (e.g. 804, 104, 106, 102) according to some embodiments is provided. In various embodiments, in an out-of-band interaction from dID app 850, another application residing on a device (e.g. an electronic mail application, an Internet user account at a website of the single IDP accessible by a web browser application) may display a page to receive an input from an Internet user (e.g. a click (or press, or otherwise activate)) a hypertext (or hot spots, such as buttons, or an image) "here" or the like on the page including an active link. In various embodiments, the single IDP service core (150-N, 250-N) may generate the page displayed at the another application residing on a device to activate a dID app 850 created authentication token of the Internet user. In various embodiments, the single IDP service core (150-N, 250-N) may generate the page displayed at the another application residing on a device, and transmit the generated page to the another application in an out-of-band interaction from dID app 850, in response to receiving a public key portion of the dID app 850 created authentication token of the Internet user via an API call from dID app 850. In various embodiments, the single IDP service core (150-N, 250-N) may generate the page displayed at the another application residing on a device to include an active link associated with a pseudorandom activation code generated by the single IDP service core (150-N, 250-N) in response to receiving a public key portion of the dID app 850 created authentication token of the Internet user via an API call from dID app 850.

Figure 6E:
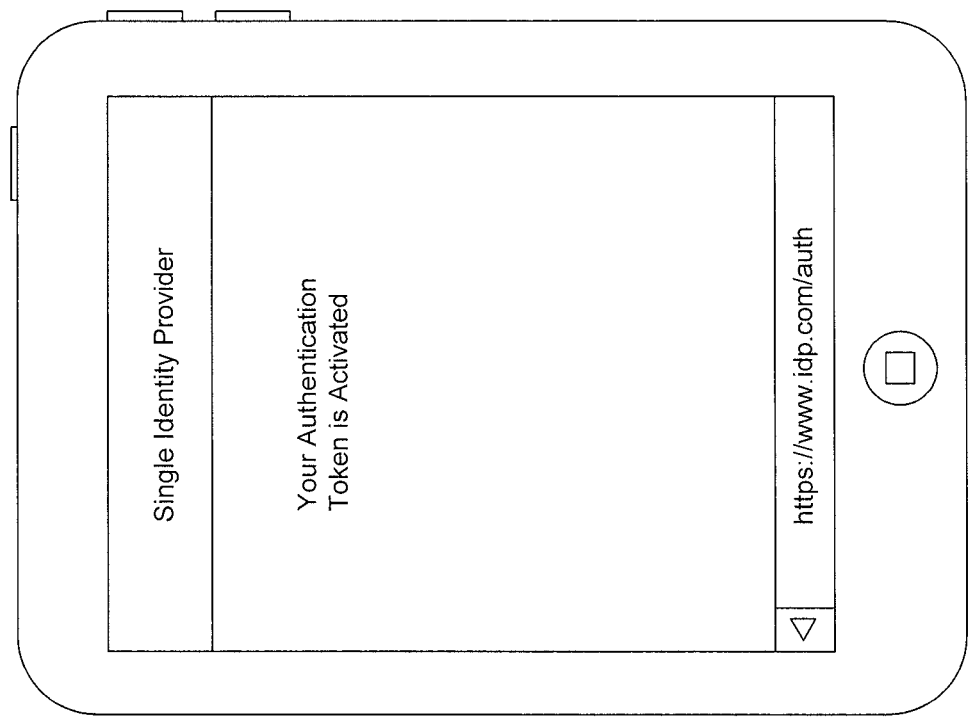

In various embodiments, the generated pseudorandom activation code is usable to activate the dID app 850 created authentication token for the Internet user. In some embodiments, in an out-of-band interaction from dID app 850 with a web browser residing on a device (e.g. 804, 104, 106, 102) of an Internet user, the single IDP service core (150-N, 250-N) may automatically activate the dID app 850 created authentication token in response to receiving a signal from the another application residing on the device indicative of an Internet user's selection of the active link displayed on a page by the another application. With reference to FIG. 6E, an example of a single identity provider (150, 250) website screenshot on a respective web browser of an Internet user device (e.g. 804, 104, 106, 102) according to some embodiments is provided. In the illustrated embodiments of FIG. 6E, the respective web browser of the respective Internet user device is directed to a web page of the website of the single identity provider (150, 250) in response to receiving a signal from the another application residing on the device indicative of an Internet user's selection of the active link displayed on a page by the another application. (e.g. FIG. 6D). In various embodiments, as shown in FIG. 6E, the single IDP service core (150-N, 250-N) may generate the web page displayed at the respective web browser to display a notification to the Internet user that the dID app 850 created authentication token is activated.

In some embodiments, an Internet user can input such registration information using dID app 850 and user interface 110. In various embodiments, an Internet user can input such registration information in an out-of-band interaction from dID app 850 with single IDP service core (150, 250) such as, for example, on the single IDP's website and via an Internet user's web browser on his/her device(s) (804, 104, 106) running dID app 850 and user interface (110, 210). In some embodiments, an Internet user N can input such registration information in an out-of-band interaction from his/her device(s) (804, 104, 106) running dID app 850 with IDP service core (150-N, 250-N) such as, for example, on the IDP service core's (150, 250) website and via a web browser on another one of the Internet user's devices (e.g. 102) and user interface (110, 210). In various embodiments, a computer-implemented process of an Internet user N registering for Internet services provided by the single IDP may involve an Internet user request to register using dID app 850 and, in response to receiving an API call including electronic signals indicative of such request, IDP service core (150-N, 250-N) generating an anonymous identifier for the Internet user N that is unique to the Internet user N. In various embodiments, an Internet user N can input registration information for one or more devices on which dID app 850 resides such as, for example a device identifier (e.g. device name, device PIN, device IMEI, device MIN, device MAC address, device SIM card, etc.). In various embodiments, dID app 850 automatically transmits, via an API call to the IDP service core (150, 250), a device identifier (e.g. device name, device PIN, device IMEI, device MIN, device MAC address, device SIM card, etc.) for the device running the dID app 850 and transmitting Internet user N registration information to the single IDP service core (150-N, 250-N).

In various embodiments, the dID app 850 created authentication token is specific to a user identifier (e.g. an electronic mail address, an anonymous identifier) of the Internet user N, a user credential (a PIN and/or a biometric factor) of the Internet user, a device identifier of one or more devices, and the dID app residing on the one or more devices, where the user identifier, respective device identifier(s), and public key portion of the dID app 850 created authentication token are registered with the single IDP service core (150-N, 250-N). In various embodiments, the dID app 850 created authentication token is specific to a user identifier (e.g. an electronic mail address, an anonymous identifier) of the Internet user N, a user credential (a PIN and/or a biometric factor) of the Internet user N, a device identifier of one or more devices, and the dID app residing on an Internet-user selected one of the one or more devices, where the user identifier, respective device identifier(s), and public key portion of the dID app 850 created authentication token are registered with the single IDP service core (150-N, 250-N). In various embodiments, the dID app 850 created authentication token is also specific to a pseudorandom activation code generated by the single IDP service core (150-N, 250-N), for example, in response to receiving a public key portion of the dID app 850 created authentication token. In various embodiments, single IDP service core (150-N, 250-N) will require dID app 850 to register the Internet user N identifier(s), one or more of the Internet user N device identifier(s), and/or the public key portion of the dID app 850 created authentication token, if they do not already exist in the single IDP identity repository (140, 240), with single IDP service core (150-N, 250-N). In various embodiments, dID app 850 is usable to create a different authentication token for an Internet user that has already registered information existing in the single IDP identity repository (140, 240), but that is specific to, for example, a different user identifier (e.g. electronic mail address) for the Internet user and to register the different user identifier, device identifier (s), and public key portion of the different authentication token with single IDP service core (150-N, 250-N).

In some embodiments, during registration, authentication engine 120 (220) of IDP service core (150, 250) can validate that the registering Internet user controls the user identifier (e.g. electronic mail address) provided during an initial registration step via an out-of-band from dID app 850 confirmation process. In various embodiments, for example, IDP service core (150, 250) can send a generated page of an electronic mail or other communication (e.g. text message, SMS message, page, etc.) to an application other than dID app 850 to display identity information provided by the Internet user (e.g. e-mail address, phone number, pager number), and provide instructions for the Internet user to respond and/or to confirm the registration information (e.g. e-mail address) initially supplied by the Internet user using the application other than dID app 850. In various embodiments, IDP service core (150, 250) of the single IDP can store single IDP registered Internet user's identity information (e.g. user identifier (e.g. email address(es), anonymous identifier), first name, last name, etc.), and/or single IDP registered Internet user device(s)' identity information (e.g. device identifier(s)) in identity repository (140, 240) of the single IDP. In various embodiments, IDP service core (150, 250) can validate that the registering Internet user controls the registering Internet user device that transmitted the user registration request. In various embodiments, for example, IDP service core (150, 250) can send a message requesting and requiring registration confirmation to the Internet user device (804, 104, 106) based on device identifier(s) (e.g.

device name, device PIN, device IMEI, device MN, device MAC address, device SIM card, etc.) received during the registration process. In various embodiments, Internet users can manage the identity information stored in identity repository (140, 240) of the single IDP, including by updating the registered identity information (e g name) and/or the registered Internet user identifier (e.g. electronic mail address) with authentication engine (120, 220) of the single IDP via user interface (110, 210), deletion of some or all of their registered identifying information via user interface (110, 210), revocation of devices (e.g. if a user device upon which dID app 850 resides is lost, destroyed, or stolen) and/or registered identity information via user interface (110, 201) and/or dID app 850 (described in more detail below), denying registration confirmation requests, etc. In various embodiments, IDP service core (150, 250) of the single IDP may automatically suspend and/or revoke a registered device upon receiving an indication that the device has been lost, stolen, destroyed, or compromised and such that all approved authentication challenge messages sent from the dID app 850 residing on such device, and such device itself, are automatically repudiated.

The dID Application: Authentication Token Generation and Management

In various embodiments, after an Internet user registers and/or validates his/her, and/or his/her device's, identity information with authentication engine (120, 220) of the single IDP, the dID app 850 may generate an authentication token including an asymmetric key pair (private key portion and corresponding public key portion) using a cryptographically secure algorithm. In various embodiments, the dID app 850 generated authentication token is specific to a user identifier (e.g. an electronic mail address, an anonymous identifier) of the Internet user N, a user credential (a PIN and/or a biometric factor) of the Internet user, a device identifier of one or more devices, and the dID app residing on the one or more devices, where the user identifier, respective device identifier(s), and public key portion of the dID app 850 created authentication token are registered with the single IDP service core (150-N, 250-N). In various embodiments, IDP service core (150-N, 250-N) of the single IDP may require dID app 850 to generate an authentication token. In various embodiments, during registration, dID app 850 may prompt the Internet user to choose and validate a personal identification number (PIN) and/or submit one or more biometric factors (e.g. fingerprint, facial image, etc.). In various embodiments, an Internet user's PIN for his/her dID app 850 generated authentication token may include at least numbers, letters or symbols, or combinations thereof.

In various embodiments, the private key portion of the dID app 850 generated authentication token is bound to a user credential (e.g. an Internet user selected personal identification number (PIN) and/or Internet user biometric factor). For example, if the dID app 850 generated authentication token is bound to an Internet user biometric factor, the Internet user may be prompted by dID app 850 to enter a biometric factor in addition to submitting his/her PIN (e.g. FIG. 6C, 5E) during initial registration and during authentication challenges. In some embodiments, dID app 850 may interface with internal and/or external components (not shown) of device (804, 104, 106) such as, for example, a camera, fingerprint sensor, or other sensor of device (804, 104, 106), and/or a sensor in communication with device (804, 104, 106). In various embodiments, the biometric factor may be sequenced and/or processed by the dID app 850. In various embodiments, the private key portion of the dID app 850 generated authentication token is bound to a combination of a user credential and a pseudorandom string generated by the single IDP service core (150-N, 250-N) and transmitted to dID app 850 in an API call. In various embodiments, the private key portion of the dID app 850 generated authentication token is bound to a combination of a user credential, a pseudorandom string generated by the single IDP service core (150-N, 250-N) and transmitted to dID app 850 via an API call, and a device identifier (e.g. device name, device PIN, device IMEI, device MIN, device MAC address, device SIM card, etc.) of the device upon which dID app 850 resides.

In various embodiments, such as for example where the OS of a user device (804, 104, 106) includes an OS and hardware controlled key store (e.g. iOS), cryptographic component 820 of dID app 850 can generate an authentication token (asymmetric key pair (e.g. public key portion and corresponding private key portion)) using the hardware controlled key store, encrypt the private key portion of the generated authentication token using the Internet user's user credential and the hardware controlled key store, and store the encrypted private key in memory 840 on device (804, 104, 106). In various embodiments, such as for example where the OS of a user device (804, 104, 106) includes an OS without a hardware controlled key store (e.g. Android, Blackberry OS), cryptographic component 820 of dID app 850 can generate an authentication token (asymmetric key pair (e.g. public key portion and corresponding private key portion)) using a cryptographically secure algorithm, use the user credential, or user credential combination, to generate a cryptographically secure encryption key (e.g. use the user credential, or user credential combination, as a seed to an AES encryption algorithm to generate an AES-256 encryption key), encrypt the private key portion of the generated authentication token using the generated encryption key, and store the encrypted private key in memory 840 on device (804, 104, 106). In various embodiments, cryptographic component 820 of dID app 850 can use a sequenced biometric factor, or for example a biometric factor identifier, in encrypting, or generating the encryption key for encrypting, the private key portion of the generated authentication token.

In various embodiments, dID app 850 transmits the public key portion of the generated authentication token via an API call to the IDP service core (150-N, 250-N) of the single IDP. In various embodiments, the cryptographic component 820 of the dID app 850 encrypts the public key portion of the generated authentication token, using for example a network security protocol such as Secure Socket Layer (SSL) or Transport Layer Security (TLS). In various embodiments, the cryptographic component 820 of the dID app 850 may create a binding to link the public key portion of the generated authentication token to an instance of the dID app 850, and/or the device (704, 104, 106) upon which the dID app 850 resides. In some embodiments, the cryptographic component 720 of dID app 850 may generate a temporary symmetric transport key pair to encrypt the public key portion of the generated authentication token and created binding (e.g. error correction code, cryptographic hash) for transmission from the device (704, 104, 106) to the IDP service core (150-N, 250-N) of the single IDP. In some embodiments, dID app 750 may display the temporary symmetric transport key generated by cryptographic component 820 to the user on a display (not shown) of device (804, 104, 106). In various embodiments, dID app 850 transmits this encrypted public key portion and binding to the IDP service core (150, 250) via transceiver 810 of device (804, 104, 106). In various embodiments, to complete a key exchange of the dID app 850 generated temporary symmetric transport key, dID app 850 directs a web browser of the device (804, 104, 106) to a website of the single IDP, and where the Internet user can, for example, manually enter the generated temporary symmetric transport key during an Internet user-IDP service core (150, 250) interaction separate (e.g. out-of-band) from dID app 850 using user interface (110, 210).

In some embodiments, the information sent between a web browser (e.g. of device 804, 102, 104, 106), and/or dID app 850, and the IDP service core (150, 250) is encrypted using a network security protocol such as, for example, Secure Socket Layer (SSL) or Transport Layer Security (TLS). In various embodiments, the IDP service core (150, 250) receives the public key portion of the generated authentication token via an API call from dID app 850. In some embodiments, authentication engine (120, 220) of IDP service core (150, 250) decrypts the received encrypted public key portion using SSL or TLS or the symmetric transport key provided by the web browser of the Internet user such as, for example, in an out-of-band Internet user-IDP service core interaction. In various embodiments, the IDP service core (150, 250) stores the received public key portion of the dID app 850 generated authentication token in identity repository 140. In various embodiments, the IDP service core (150, 250) may store the received public key portion of the dID app 850 generated authentication token and binding in identity repository 140. In various embodiments, the IDP service core (150, 250) stores the received public key portion of the dID app 850 generated authentication token in identity repository 140 in a cryptographically secure manner (e.g. encrypted, digitally signed, etc.)

In various embodiments, the authentication engine 120 (220) of IDP service core (150, 250) may generate a binding between the received public key portion of the dID app 850 generated authentication token, Internet user information (e.g. user identifier), and/or device information (e.g. device identifier) via cryptographic methods such as, for example, generating a cryptographic hash of an Internet user N identifier, the received public key portion of the dID app 850 generated authentication token, and/or a device identifier (804, 104, 106) and may coordinate storage of the generated binding and the received public key portion of the dID app 850 generated authentication token in a repository such as, for example, identity repository 140. In various embodiments, the authentication engine (120, 220) of the single IDP may validate an Internet user's requests for access to RP Internet services provided by a RP (160-i, 260-i) with the stored received public key portion of the dID app 850 generated authentication token, and/or binding, in the identity repository 140. In various embodiments, authentication engine (120, 220) can generate a binding to ensure that no changes have been made (e.g. ensure data integrity) to the stored user identity information (e.g. user identifier), received public key portion of the dID app 850 generated authentication token, device (804, 104, 106) information (e.g. device identifier), etc.

In various embodiments, an Internet user can use dID app 850 to register with the IDP service core (150, 250) of the single IDP and generate a plurality of different authentication tokens (e.g. different asymmetric key pairs), for different purposes and/or increased levels of assurance. For example, an Internet user can use dID app 850 to register with IDP service core (150, 250) of the single IDP and generate different authentication tokens using dID app 850 and using respectively different Internet user registration information such as, for example, different pseudonyms and different user identifiers (e.g. e-mail addresses) and/or different device identifiers such that the dID app 850 transmits and registers each different public key portion of each different dID app 850 generated authentication token to the IDP service core (150, 250) of the single IDP. In various embodiments, dID app 850 and the IDP service core (150, 250) of the single IDP may permit the Internet user to register more than one user identifier (e.g. more than one electronic mail address, an anonymous identifier and an electronic mail address), and more than one device identifier, such that the dID app 850 generated authentication token is specific to the registered more than one user identifier, the registered more than one device identifier, the user credential of the Internet user, and dID app 850. In some embodiments, a master dID app 750 residing on a pre-registered device 704 generates an authentication token that is also specific to slave dID applications residing on each of one or more additional pre-registered devices (e.g. 102, 104, 106).

In various embodiments, dID app 850 may receive a new pseudorandom string at a predetermined periodicity (e.g. after a predetermined number of authentications, after the expiration of a predetermined period of time, after the expiration of a predetermined amount of time from the last authentication) and via an API call from IDP service core 150 of the single IDP. In various embodiments, cryptographic component 820 of dID app 850 can generate a new cryptographically secure encryption key, for example, using each received new pseudorandom string and the user credential of the Internet user, encrypt the private key portion of the generated authentication token using the generated new encryption key, and store the newly encrypted private key in memory 840 on device (804, 104, 106). In various embodiments, in response to dID app 850 receiving a new pseudorandom string from IDP service core 150 of the single IDP, dID app 850 may generate and display a page requiring the Internet user to input a user credential (e.g. FIG. 5E), and use the user credential to decrypt the stored private key portion of the prior created authentication token as described above. In various embodiments, in response to dID app 850 receiving a new pseudorandom string from IDP service core 150 of the single IDP and a successful decryption, dID app 850 may also generate and display a page requiring the Internet user to create a new user credential (e.g. FIG. 6C), cryptographic component 820 of dID app 850 may generate a new cryptographically secure encryption key using the received new pseudorandom string and the received new user credential of the Internet user as described above, encrypt the private key portion of the generated authentication token using the generated new encryption key, and store the newly encrypted private key in memory 840 on device (804, 104, 106).

In various embodiments, dID app 850 may periodically create a new authentication token (e.g. after a predetermined number of authentications, after the expiration of a predetermined period of time, after the expiration of a predetermined amount of time from the last authentication). In various embodiments, in response to the creation of the new authentication token, dID app 850 may generate and display a page requiring the Internet user to input a user credential (e.g. FIG. 5E), and use the user credential to decrypt the stored private key portion of the prior created authentication token as described above. In various embodiments, in response to a successful decryption, dID app 850 may delete the stored private key portion of the prior created authentication token, encrypt the private key portion of the new created authentication token using the user credential as described above, and store the encrypted private key portion of the new created authentication token in memory 840 on device (804, 104, 106). In various embodiments, in response to a successful decryption, dID app 850 may also generate and display a page requiring the Internet user to create a new user credential (e.g. FIG. 6C), cryptographic component 820 of dID app 850 may generate a new cryptographically secure encryption key using the received new user credential of the Internet user as described above, encrypt the private key portion of the generated authentication token using the generated new encryption key as described above, and store the newly encrypted private key in memory 840 on device (804, 104, 106). In various embodiments, dID app 850 transmits the public key portion of the new created authentication token via an API call to the IDP service core (150-N, 250-N) of the single IDP. In various embodiments, dID app 850 may receive a new pseudorandom string via an API call from IDP service core 150 (150-N, 250-N) of the single IDP in response to the IDP service core 150 (150-N, 250-N) receiving the public key portion of the new created authentication token.

The RP Internet Services, IDP Service, and dID App: Authentication

In various embodiments, once an Internet user registers with IDP service core (150, 250) and dID app generates an authentication token, an Internet user can use dID app 750 to authenticate to RP Internet services of RPs (160-i, 260-i) (e.g. Internet services accessed via an RP website) with which each RP (160-i, 260-i) has pre-registered with the single IDP. In various embodiments, an Internet user may register with a respective one or more RP Internet services at each of one or more RPs (160, 260) at the respective one or more RP Internet services' websites via user interface (110, 201). For example, an Internet user may register with two or more RPs (160, 260) (e.g. Facebook®, Amazon®) and indicate, during or after registration, that he/she desires to use identity provider services of the single IDP to authenticate to the RPs and to be authorized access to a respective one or more RP Internet services of each of the RPs. In some embodiments, for example in embodiments where dID app 850, the IDP service core (150, 250) of the single IDP and a respective one or more RP Internet services (160-i, 260-i) of RPs are bound and dedicated to each other, an Internet user can use dID app 850 to authenticate to the respective one or more RP Internet services of each RP to which dID app 850 and the IDP service core (150, 250) are bound. In various embodiments, authentication requests are initiated from the respective RP Internet service of the respective RP (160-i, 260-i) as described herein, and brokered by the Identity Provider service (150, 250) as described herein.

Referring now to FIGS. 4A-5H and 7, a flow chart illustrating a computer-implemented method for authorizing respective access by each of a plurality of Internet users to a respective one or more Internet services provided by each of a plurality of Internet service providers, and illustrative screenshots of examples of Internet user interfaces to relying party Internet services, to single identity provider Internet services, and to an identity provider application residing on a device, according to some embodiments are provided. In various embodiments, at block 722, an Internet user (e.g. via his/her device 704) visits an RP Internet service provider's 760 website, such as a website of Facebook®. The user may access the RP Internet service provider's 760 website a number of ways (e.g., the user's entrance into the RP Internet service provider's 760 website may be "path sensitive" such as via a public network, via a link from another account the customer may have with the RP Internet service provider, via a notice or alert sent to the customer by the RP Internet service provider, via an e-mail advertisement sent to the user by the RP Internet service provider, in response to a receipt of a promotional advertisement, etc.) For example, at block 724 (FIGS. 4A-4B), a respective RP Internet service provider 760 can present a dID app 750 authentication option to access a respective one or more of the Internet services provided by the respective Internet service provider 760 to the Internet user on an appropriate screen in the graphical user interface (GUI) (FIGS. 4A-4B) of a web browser 710 of device 704 of the Internet user that is displayed by the website. Examples of such screens are shown at FIGS. 4A-4B.

As shown in the example graphical user interfaces (GUI) of FIGS. 4A-4B, and at block 724, the RP Internet service provider's 760 website may present the Internet user with a web page displaying a plurality of links where each link is associated with a respective Internet service provided by the respective Internet service provider 560. In some embodiments (not shown), at block 524, the RP Internet service provider's 760 website may present the user with a prompt to securely login with the single IDP by entering text at the prompt including the Internet user's identifier (e.g. email address or anonymous identifier) registered with the IDP service core 750 of the single IDP. In some embodiments (not shown), as the Internet user enters text at the secure login prompt displayed on the web page of the RP Internet service provider's 760 website, an entry may be auto-completed based on matching information stored at an RP service provider's 760 database (not shown).

At block 726, the Internet user indicates his/her desire to access a respective one Internet service provided by the respective RP by making a selection of the appropriate link displayed on the Relying Party (e.g. "X"'s, FIGS. 4A, 4B) web page using a suitable input device as described above. In some embodiments (not shown), at block 726, the Internet user indicates his/her desire to authenticate to access respective Internet services provided by the respective RP by entering Internet user's identifier (e.g. email address or anonymous identifier) registered with the IDP service core 750 of the single IDP and chooses a dID app login option by, for example, pressing (or clicking, or otherwise activating) an "authentication" icon (or other suitable hypertext, image, hot spot, etc.). In some embodiments, the display at block 724, and/or user entry at block 726, are optional, and the RP Internet service provider's website may be pre-configured to indicate an Internet user's selection of an Internet service provided by the RP Internet service provider when the Internet user enters an Internet address to access the Internet service of the RP Internet service provider in the web browser 710.

Based on the Internet user's selection, or pre-configuration for the Internet address to access the Internet service of the RP Internet service provider 760, at block 728, an association session is initiated between the RP Internet service provider 760 and the IDP service core 750. At block 728, the RP Internet service provider 760 transmits an API call (e.g. a GET or POST request) including the respective unique Internet service identifier (e.g. uniquely generated pseudorandom string), generated by IDP service core 750 for the selected Internet service during registration, and a call back Internet address (e.g. URL) pre-registered with IDP service core 750, to the IDP service core 750. At block 732, in response to the respective Internet user's selection of a respective link displayed on the respective RP's web page (e.g. FIGS. 4A, 4B) that identified a respective Internet service provided by the RP and the RP's transmission of the respective RP service identifier and the web browser identifier, the IDP service core 750 directs the Internet user's web browser 710 to the website of the single IDP that is operatively coupled to IDP service core 750, and, as shown in FIGS. 5A and 5B, the IDP service core 750 presents an appropriate web page in the graphical user interface (GUI) of a device 704 in the web browser 710 user that requires dID app 750 Internet users to provide an input of an Internet user identifier (e.g. an electronic mail address, an IDP service generated anonymous identifier) into the web browser 710 of the device.

At block 734, the dID app 750 Internet user provides an input of his/her Internet user identifier via web browser 710 and using a suitable input device as described above, and the web browser generates and transmits an electronic signal indicative of the Internet user identifier received from the Internet user input. In some embodiments, the direction at block 732, and Internet user entry at block 734, are optional, and an Internet user's user identifier may be pre-configured to be sent to the IDP service core 750 when the Internet user enters the Internet user identifier at the RP service provider's 160 (260) website. In various embodiments, the IDP service core 750, may require the Internet user's web browser 710 to direct to a web page that indicates that the Internet user's request is cancelled, and/or the Internet user's account with the single IDP is locked, for example, after expiration of a predetermined amount of time or a predetermined number of invalid entries.

At block 736, authentication engine (120, 220) of IDP service core 750 processes the received Internet user identifier and the received respective RP service identifier, validates the received Internet user identifier against stored data in identity repository (140, 240), retrieves a stored visually perceptible identifier of the RP (e.g. FIG. 5C RP name ("Relying Party X", RP image (key hole image)), and a stored Internet address of a respective web page belonging to the RP (e.g. FIG. 5C "https://www.relyingpartyX.com/InternetServiceA"), from identity repository (140, 240), generates a verification code (e.g. FIG. 5C "IUZ23"), generates a pending authentication challenge web page including such data and transmits the web page to the web browser 710 of a device 704 that displays, as shown in the example of FIG. 5C, the visually perceptible identifier of the RP, the respective Internet address of the respective web page belonging to the RP, a notification to the Internet user, and the generated verification code. In various embodiments, information provided on the pending authentication challenge web page is displayed to the Internet user to allow the Internet user to visually verify such information on the pending authentication challenge web page. For example, the Internet user may compare the information displayed on the pending authentication challenge web page to his/her knowledge from providing the inputs to request access to the respective Internet service provided by the RP. The inventors have observed that in using various embodiments of the systems and methods described herein, the generation and display of a pending authentication challenge web page (e.g. FIG. 5C) to the Internet user on a web browser 710 of a device 704 benefit the RPs, single IDP, and Internet users, by reducing the vulnerability of an unauthorized third party attempting to concurrently mimic the authentication that the Internet user is attempting to complete. In various embodiments, an Internet user can choose to reject an authentication request and relay that information to IDP service core 750 using dID app 750 and/or web browser 710. In some embodiments, if an authentication request is cancelled by an Internet user, the web browser (e.g. 710) is directed to a failed authentication page.

In various embodiments, once an authentication request has been initiated by an RP server 760 and brokered by IDP service core 750, authentication engine (120, 220) may generate and transmit a page, and/or an update to a page, to dID app 750 to notify the Internet user of the pending and completed authentication challenges for the received user identifier. In some embodiments, the notification page is set by, for example, an administrator (not shown), for IDP service core 750, and updated using information provided by authentication engine (120, 220). For example, the updated notification page indicating that a new authentication challenge has been initiated by an RP Internet service provider (160-*i*, 260-*i*, 760) for a respective Internet service of the RP and brokered by IDP service core 750 for the received user identifier may be delivered through the Android Cloud Messaging framework if dID app 750 is running on an Android OS on device 704, or delivered leveraging Apple's Push Notification framework if dID app 750 is running on iOS on device 704.

As shown in the example of FIG. 5G, dID app 750 residing on a device 704 of the Internet user may display a notification page that displays a plurality of respective visually perceptible identifiers of respective RPs 160-*i*, respective Internet addresses of respective web pages belonging to the respective 160-*i*, a date identifier, a time identifier, respective verification codes generated by the single IDP, and respective status identifiers of authorizing respective access by the respective Internet user to the respective requested Internet services provided by the respective RPs. In various embodiments, information provided on the notification page is displayed to the Internet user to allow the Internet user to visually verify such information on the notification page. For example, the Internet user may compare the information displayed on the notification page to his/her knowledge from providing the inputs to request access to the respective Internet service provided by the RP. The inventors have observed that in using various embodiments of the systems and methods described herein, the generation and display of a notification page (e.g. FIG. 5G) to the Internet user on dID app 750 of a device 704, as well as the generation and display of a pending authentication challenge web page (e.g. FIG. 5C) to the Internet user on a web browser 710 of a device 704, benefit the RPs, single IDP, and Internet users, by reducing the vulnerability of an unauthorized third party attempting to concurrently mimic the authentication that the dID app 750 user is attempting to complete.

In various embodiments, dID app 750 stores recent (un-archived) authentication requests in memory 740. In various embodiments, IDP service core 550 stores such recent (un-archived) authentication requests for various users in one or more data repositories (not shown). In some embodiments, the notification page of dID app 750 displays a list (including information such as a respective visually perceptible identifier of each RP and/or each requested RP Internet service 560, the respective date/time (e.g. a date/time stamp) of each authentication request and a status of each authentication request (e.g. Pending, Approved, Canceled, Timed-Out)) of recent (un-archived) authentication requests, including the authentication request acted on most recently by dID app 750. In various embodiments, dID app 750 may request this list from IDP service core 550. For example, dID app 750 may use a GET call to check the status of an authentication request. A return value of "Canceled" in this case may indicate that the Internet user, dID app, IDP service core 550, or RP, has rejected the Internet user's request to access a requested RP Internet service 560. A return value of "pending" may indicate that the Internet user, dID app, IDP service core 550, or RP, has not yet approved or rejected the Internet user's access request. A return value of "approved" may indicate that the Internet user has been granted the requested access. In various embodiments, an Internet user may request dID app 750, and/or an appropriate program operating on a computer interacting with a device running dID app 750, to archive one or more items on a list of recent (un-archived) authentication requests received from IDP service core 750. In some embodiments, dID app 750 generates and displays the list on an appropriate screen in the GUI of a device (e.g. 704) of a user to allow the user to see any unauthorized authentication requests that may have occurred when he/she was away from his/her device or unable to review the authentication challenge request notification. In various embodiments, dID app may use a GET call to obtain a list of recent authentication requests for an Internet user's account. The IDP service core 550 may return a JSON list of authentication request structures which may, for example, include fields such as, but not limited to, RP 160-*i* identifier (visually perceptible identifier of RP 160-*i*), RP 160-*i* Internet address (Internet address of web page belonging to the RP 160-*i*), date (date on which the authentication request was made), time (time at which the authentication request was made), VerificationCode, and StatusId (status identifier of authorizing access by the Internet user to the requested Internet service provided by the RP 160-*i*) as shown in FIG. 5G. In some embodiments, these GET calls may utilize query parameters or other ways to allow the caller to control what authentication requests are returned. For example, a count parameter may be used to control the number of authentication requests to return, a startAfter parameter may specify which page of results should be returned, and a direction parameter may be used to specify whether earlier authentication requests or later authentication requests are returned. In various embodiments, a displayed list can show when (e.g. date/time) an Internet user launched dID application 750, such as, for example, from dID application's 750 icon in the operating system on the Internet user's device 704. In various embodiments, authentication engine (120, 220) may generate and transmit a notification page, and/or an update to a notification page, to the master dID app 750 and slave dID applications on each of the pre-registered devices to notify the Internet user of the pending and completed authentication challenges for the received user identifier. In some embodiments, authentication engine (120, 220) may generate and transmit a notification page, and/or an update to a notification page, to the master dID app 750 and a pre-selected slave dID application on the corresponding pre-registered devices to notify the Internet user of the pending and completed authentication challenges for the received user identifier. In various embodiments, an Internet user can choose to reject an authentication request and relay that information to IDP service core 750 using dID app 750 and/or web browser 710. In some embodiments, if an authentication request is cancelled by an Internet user, the web browser (e.g. 710) is directed to a failed authentication page. In various embodiments, if an authentication request is cancelled by an Internet user, dID application 750 refreshes a GUI of the user's device (e.g. 704) to a list of recent, un-archived authentication requests.

At block 738, IDP service core 750 requires dID app 750 on device 704 to display, as shown in the example of FIG. 5E, a page to receive an input of a user credential of the Internet user (e.g. PIN, biometric factor, combination thereof) in response to the successful validation of the respective Internet user's identifier received by the single IDP service core at block 734. In various embodiments, single IDP core service 750, at block 538, requires the dID app 750 to display the page to input the Internet user credential. At block 542, dID app 750 validates the received user credential. In various embodiments, dID app 750 receives an input of the user credential from the page displayed by the dID app 750 and validates the received user credential by temporarily decrypting the stored encrypted private key portion of the authentication token. In various embodiments, such as for example where the OS of a user device 704 includes an OS and hardware controlled key store (e.g. iOS), cryptographic component 820 of dID app 750 can validate the received user credential by temporarily decrypting the stored encrypted private key portion of the authentication token using the received user credential and the hardware controlled key store. In various embodiments, such as for example where the OS of a user device (804, 104, 106) includes an OS without a hardware controlled key store (e.g. Android, Blackberry OS), cryptographic component 820 of dID app 750 can validate the received user credential by using the received user credential to generate a cryptographically secure decryption key (e.g. use the received user credential as a seed to an AES encryption algorithm to generate an AES-256 encryption key), and by temporarily decrypting the stored encrypted private key portion of the authentication token using the newly generated decryption key. In various embodiments, cryptographic component 820 of dID app 750 can use a sequenced biometric factor, or for example a biometric factor identifier, in decrypting, or generating the decryption key for decrypting, the stored encrypted private key portion of the authentication token. If the validation fails, dID app 750 can generate a page to provide an appropriate indication to the Internet user, and/or generate and transmit a message to provide an appropriate indication to the IDP service core 750, that the authentication attempt has failed. In various embodiments, in response to the successful validation of the received user credential, dID app 750 increments a counter value stored in memory (e.g. 840) of device 804.

In various embodiments, in response to the successful validation of the received user credential, and as shown in the example of FIG. 5F, dID app 750 residing on the device 704 may display a page that displays a visually perceptible identifier of the RP 560 (e.g. RP name ("Relying Party X", RP image (key hole image)) (e.g. FIGS. 5C, 5D), an Internet address of a web page belonging to the RP 560 (e.g. "https://www.relyingpartyX.com/InternetServiceA") (e.g. FIGS. 5C, 5D), a date identifier (e.g. the date (e.g. "11/31/2014" of the Internet user's selection of a link displayed on the RP's web page (e.g. FIGS. 4A, 4B)), a time identifier (e.g. the time (e.g. "10:28:49 AM EDT" of the Internet user's selection of a link displayed on the RP's web page (e.g. FIGS. 4A, 4B)), and a verification code generated by the single IDP (e.g. "IUZ23") (e.g. FIGS. 5C, 5D) and requires an input (e.g. selection of "Accept" or selection of "Reject") from the Internet user to generate and/or transmit an approved authentication challenge message via an API call to IDP service core 750. As shown in the example screenshot of FIG. 5F, an Internet user may select to "Accept" or "Reject" the authentication request by, for example, pressing (or clicking, or otherwise activating) an appropriate "Accept" or "Reject" icon (FIG. 5F) (or other suitable hypertext, image, hot spot, etc.). If the Internet user elects to "Reject" the authentication request (e.g. because any of the displayed information is incorrect), the IDP service core 750 may inform the Internet user that the authentication request is cancelled by any appropriate method including, for example, by displaying an error message, or a failed authentication page, in the GUI of device 704 by dID app 750. If the Internet user elects to authorize the authentication request (e.g. because all of the displayed information is correct), the method will proceed to block 742.

At block 742, dID app 750 generates an approved authentication challenge message by digitally signing a predefined pseudorandom string (e.g. a predefined string of text including the verification code received in the pending authentication challenge web page and notification page, timestamp that the string was generated, a counter value stored, in memory (e.g. 840) of the device 704, and/or text) with the decrypted private key portion of the authentication token. At block 742, dID app 750 transmits, via an API call (e.g. a GET or POST request) to the IDP service core 750, the generated approved authentication challenge message. In various embodiments, dID app 750 transmits the predefined string of text and signature to the IDP service core 750 without further encryption. In various embodiments, dID app 750 encrypts the predefined string of text and signature, using, for example a network security protocol such as Secure Socket Layer (SSL) or Transport Layer Security (TLS), and transmits the encrypted predefined string of text and signature to IDP service core 750.

At block 744, authentication engine 120 (220) of IDP service core 750 validates the received approved authentication challenge message (e.g. signed pre-defined string of text) with the public key portion stored in identity repository (140, 240) for the dID app 750 generated authentication token and, in response to the successful validation of the received approved authentication challenge message, and as shown in the example of FIG. 5G, IDP service core 750 re-directs the web browser to a pre-registered call-back Internet address of (e.g. stored in identity repository (140, 240) for the registered RP and the registered, requested Internet service of the registered RP), and displaying content of, a web page belonging to the RP where the web page displayed by the web browser 710 is usable by the Internet user to access the requested Internet service provided by the RP. In various embodiments, in response to the web browser 710 re-directing to the respective call-back Internet address, dID app 750 increments the counter value stored in memory (e.g. 840) of device 804. In various embodiments, identity repository (140, 240) stores a respective counter value associated with each authentication token generated by dID app 750. In various embodiments, IDP service core 750 validates the received approved authentication challenge message using the public key portion, and the counter value, stored in identity repository (140, 240) for the dID app 750 generated authentication token. In various embodiments, in response to validating the received approved authentication challenge message, IDP service core 750 increments the counter value in the stored data of identity repository (140, 240) for the authentication token generated by dID app 750.

At block 746, authentication engine 120 (220) of IDP service core 750 may repudiate the received approved authentication challenge message (e.g. signed pre-defined string of text) with the public key portion stored in identity repository (140, 240) for the authentication token generated by dID app 750 and, in response to the repudiation of the received approved authentication challenge message, the IDP service core 750 denies access by the Internet user to the respective Internet service provided by the RP 560 by directing the web browser 710 to an Internet address of the single IDP that notifies the Internet user of the denied access.

In various embodiments, IDP service core 750 may repudiate the received approved authentication challenge message using the public key portion, and the counter value, stored in identity repository (140, 240) for the dID app 750 generated authentication token. In various embodiments, in response to repudiating the received approved authentication challenge message, IDP service core 750 may restart the counter value in the stored data of identity repository (140, 240) for the authentication token generated by dID app 750. In various embodiments, in response to repudiating the received approved authentication challenge message, IDP service core 750 may automatically require dID app 750 to generate a new authentication token upon receiving the next subsequent API call from dID app 750. If the authentication engine 120 (220) of IDP service core 750 repudiates the received approved authentication challenge message, IDP service core 750 may send an appropriate notification to RP server 760.

In various embodiments, upon successful validation of the received approved authentication challenge message, IDP service core 750 generates a validation token using pre-registered information stored in identity repository (140, 240) for the registered RP and the registered, requested Internet service of the registered RP (e.g. an Internet service identifier, an Internet service secret, and/or combinations thereof), and re-directs the user to the pre-registered call-back Internet address with the validation token. At block 748, RP server 760 sends a validation token validation request to IDP service core 750 that includes the validation token included in the callback URL. In various embodiments, RP server 760 sends the validation token validation request via Open ID Connect protocol communications. At block 752, authentication engine (120, 220) of IDP service core 750 validates the received validation token and, if successfully validated, IDP service core 750 sends a token validation message to RP server 560. In various embodiments, IDP service core 750 sends the token validation message via Open ID Connect protocol communications. If the received validation token is not successfully validated, IDP service core 750 can send an appropriate notification to RP server 760. At block 754, the Internet user is granted access to the requested Internet service provided by the RP and RP server 760 initiates an authenticated session with the user's web browser to provide such Internet service.

Figure 9:
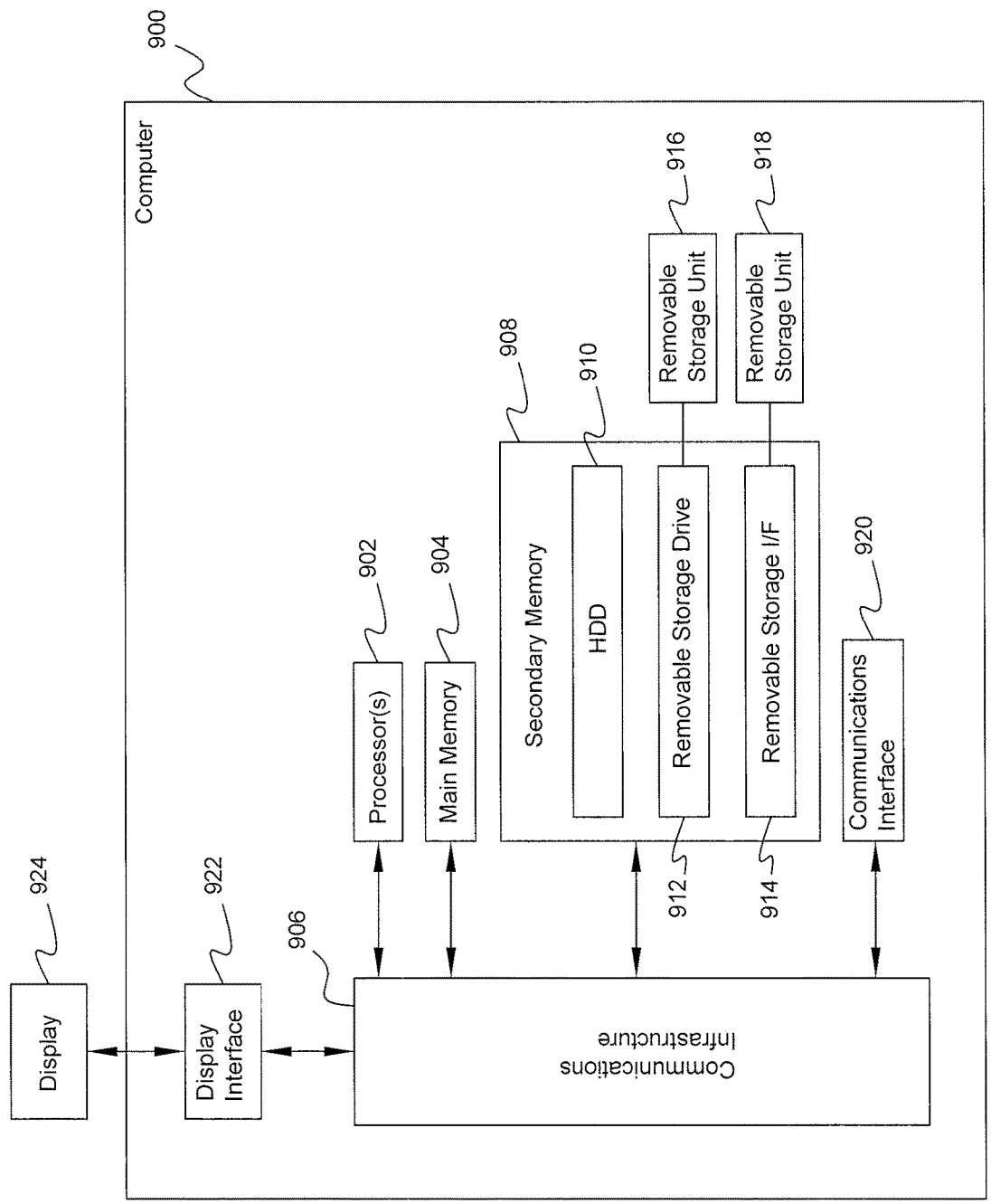
FIG. 9 is a block diagram of a server in accordance with some embodiments.

FIG. 9 is a block diagram of an example architecture for a server (e.g., RP server 760) in accordance with various embodiments. Computer system 900 may include one or more processors 902. Each processor 902 is connected to a communication infrastructure 906 (e.g., a communications bus, cross-over bar, or network). Computer system 900 may include a display interface 922 that forwards graphics, text, and other data from the communication infrastructure 906 (or from a frame buffer, not shown) for display on the display unit 924.

Computer system 900 may also include a main memory 904, such as a random access memory (RAM), and a secondary memory 908. The secondary memory 908 may include, for example, a hard disk drive (HDD) 910 and/or removable storage drive 912, which may represent a floppy disk drive, a magnetic tape drive, an optical disk drive, a memory stick, or the like as is known in the art. The removable storage drive 912 reads from and/or writes to a removable storage unit 916. Removable storage unit 916 may be a floppy disk, magnetic tape, optical disk, or the like. As will be understood, the removable storage unit 916 may include a computer readable storage medium having tangibly stored therein (embodied thereon) data and/or computer software instructions, e.g., for causing the processor(s) to perform various operations.

In alternative embodiments, secondary memory 908 may include other similar devices for allowing computer programs or other instructions to be loaded into computer system 900. Secondary memory 908 may include a removable storage unit 918 and a corresponding removable storage interface 914, which may be similar to removable storage drive 912, with its own removable storage unit 916. Examples of such removable storage units include, but are not limited to, USB or flash drives, which allow software and data to be transferred from the removable storage unit 916, 918 to computer system 900.

Computer system 900 may also include a communications interface 920. Communications interface 920 allows software and data to be transferred between computer system 900 and external devices. Examples of communications interface 920 may include a modem, Ethernet card, wireless network card, a Personal Computer Memory Card International Association (PCMCIA) slot and card, or the like. Software and data transferred via communications interface 920 may be in the form of signals, which may be electronic, electromagnetic, optical, or the like that are capable of being received by communications interface 920. These signals may be provided to communications interface 920 via a communications path (e.g., channel), which may be implemented using wire, cable, fiber optics, a telephone line, a cellular link, a radio frequency (RF) link, Wi-Fi and other communication channels.

In this document, the terms "computer program medium" and "non-transitory computer-readable storage medium" refer to media such as, but not limited to, media at removable storage drive 912, or a hard disk installed in hard disk drive 910, or removable storage unit 916. These computer program products provide software to computer system 900. Computer programs (also referred to as computer control logic) may be stored in main memory 904 and/or secondary memory 908. Computer programs may also be received via communications interface 920. Such computer programs, when executed by a processor, enable the computer system 900 to perform the features of the methods discussed herein. For example, main memory 904, secondary memory 908, or removable storage units 916 or 918 may be encoded with computer program code (instructions) for performing operations corresponding to various processes disclosed herein.

Figure 10:
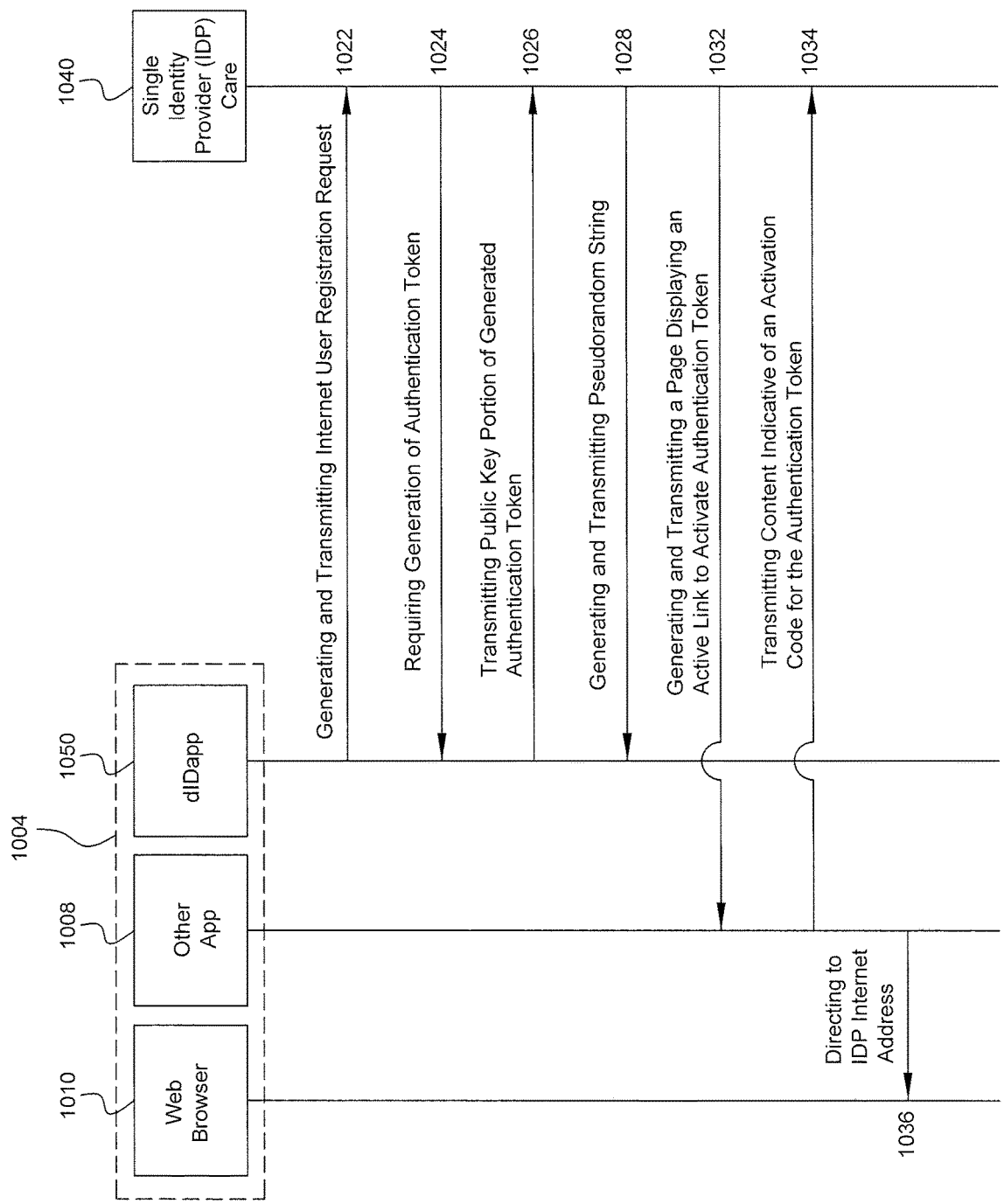
FIG. 10 is a flow chart illustrating a computer-implemented method of authorizing respective access by each of a plurality of Internet users to a respective one or more Internet services provided by each of a plurality of Internet service providers according to some embodiments.

With reference now to FIG. 10, a flow chart illustrating a computer-implemented method of authorizing respective access by each of a plurality of Internet users to a respective one or more Internet services provided by each of a plurality of Internet service providers according to some embodiments is provided. At block 1022, and as shown in the example of FIG. 6B, dID app 1050 residing on a device 1004 may display a page to receive an input of a user identifier (e.g. an email address) of the Internet user in response to receiving an Internet user request to register on a page of dID app 850 (e.g. FIG. 6A) and may generate and transmit an Internet user registration request including the user identifier (e.g. an email address) via an API call to single IDP service core 1040. At block 1024, in response to receiving the Internet user registration request, single IDP service core 1040 requires dID app 1050 to generate, and transmit to dID app 1050 via an API call, a page to receive an input of a user credential (e.g. an Internet user selected personal identification number (PIN) and/or a biometric factor of the Internet user). At block 1026, dID app 1050 transmits the public key portion of the dID app 1050 created authentication token via an API call to the single IDP service core 1040.

At block 1028, in response to receiving the public key portion of the dID app 1050 created authentication token, single IDP service core 1040 generates a pseudorandom string (e.g. a pseudorandom string that is usable by dID app 1050 with the dID app 1050 received user credential to generate an encryption key to encrypt the private key portion of the dID app 1050 created authentication token) and transmits the pseudorandom string via an API call to the dID app 1050. At block 1032, and as shown in the example of FIG. 6D, in response to receiving the public key portion of the dID app 1050 created authentication token and in an out-of-band interaction from dID app 1050, single IDP service core 1040 generates, and transmits to another application 1008 residing on a device 1004 (e.g. an electronic mail application, an Internet user account at a website of the single IDP accessible by a web browser application), a page to receive an input from an Internet user including an active link to activate a dID app 1050 created authentication token. At block 1034, the another application 1008 residing on a device 1004, in an out-of-band interaction from dID app 1050, transmits content indicative of a single IDP service core 1040 generated pseudorandom activation code that is usable to activate the dID app 1050 created authentication token. At block 1036, as shown in the example of FIG. 6E, in an out-of-band interaction from dID app 1050, a web browser 1010 residing on a device 1004 is directed to a web page of the website of the single IDP (150, 250) in response to receiving a signal from the another application 1008 residing on a device 1004 that is indicative of an Internet user's selection of the active link displayed on a page by the another application 1008. (e.g. Block 1032, FIG. 6D).

Figure 11:
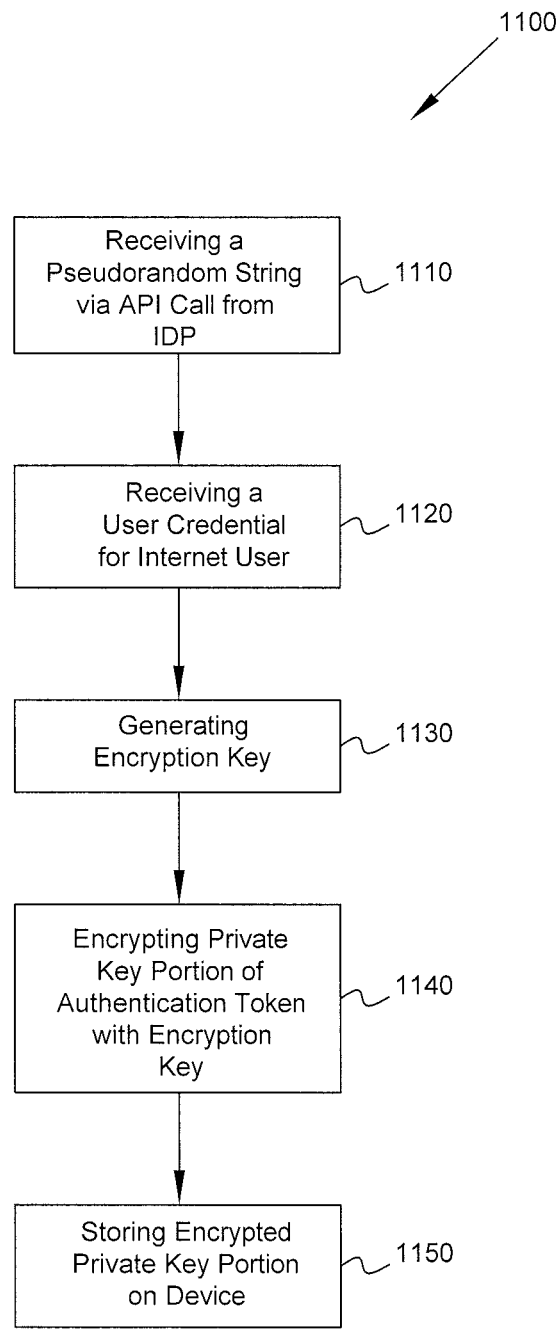
FIG. 11 is a flow chart illustrating a computer-implemented method according to some embodiments of the present disclosure.

Referring to FIG. 11, a flow chart illustrating a computer-implemented method 1100 according to some embodiments of the present disclosure is provided. At block 1110, a dID app (e.g. 850) receives a pseudorandom string via an API call from IDP service core 150-N of the single IDP. At block 1120, the dID app receives a user credential for an Internet user. At block 1130, the dID app generates a cryptographically secure encryption key using the received pseudorandom string and the received user credential of the Internet user. At block 1140, the dID app encrypts the private key portion of an authentication token generated by the dID app using the generated encryption key. At block 1150, the dID app stores the encrypted private key portion of the authentication token generated by the dID app in memory 840 on a device (804, 104, 106).

Figure 12:
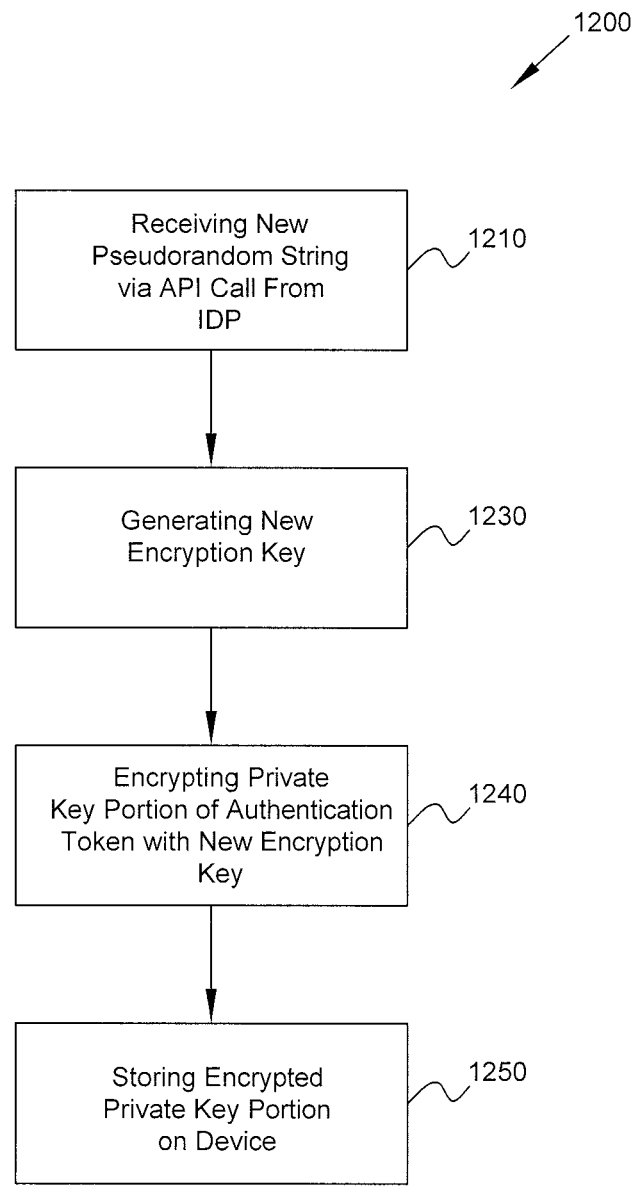
FIG. 12 is a flow chart illustrating a computer-implemented method according to some embodiments.

Referring to FIG. 12, a flow chart illustrating a computer-implemented method according to some embodiments is provided. At block 1210, a dID app (e.g. 850) receives a new pseudorandom string via an API call from IDP service core 150-N of the single IDP. At block 1230, the dID app generates a new cryptographically secure encryption key using the received pseudorandom string and a received user credential of the Internet user. At block 1240, the dID app encrypts the private key portion of an authentication token generated by the dID app using the newly generated encryption key. At block 1250, the dID app stores the newly encrypted private key portion of the authentication token generated by the dID app in memory 840 on a device (804, 104, 106). In various embodiments, the dID app performs the method 1200 at a predetermined periodicity (e.g. after a predetermined number of authentications, after the expiration of a predetermined period of time, after the expiration of a predetermined amount of time from the last authentication) and in response to receiving a new pseudorandom string via an API call from IDP service core 150-N of the single IDP.

Figure 13:
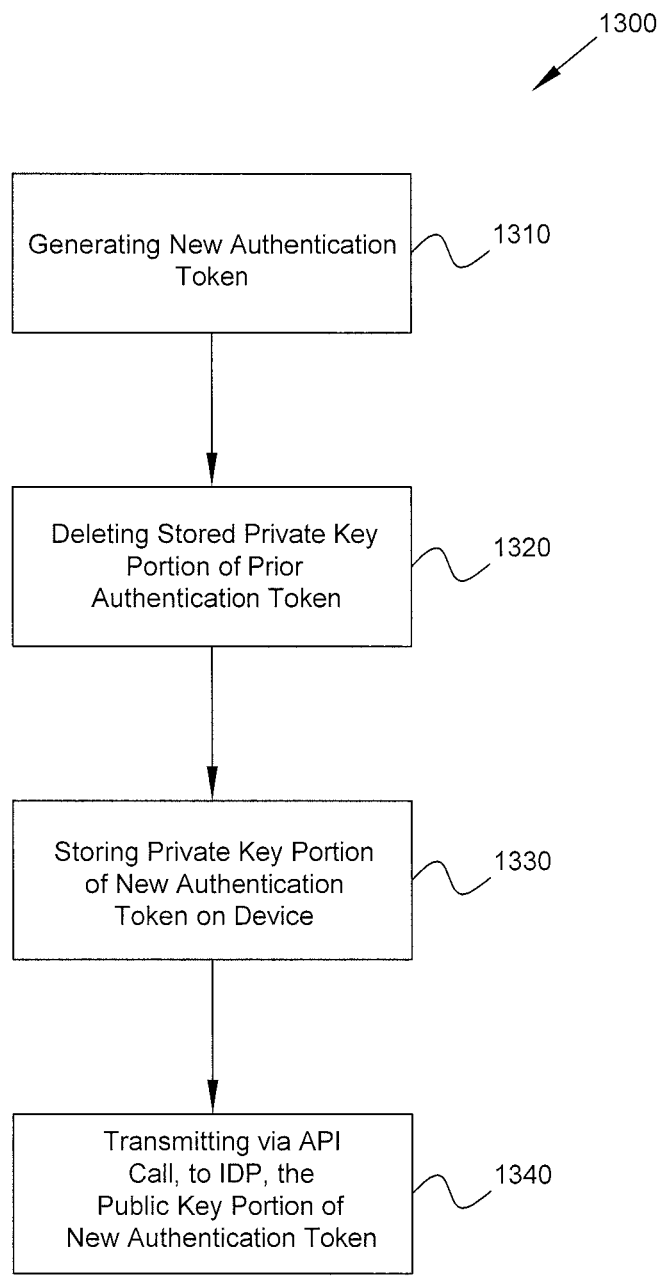
FIG. 13 is a flow chart illustrating a computer-implemented method according to some embodiments of the present disclosure.

Referring to FIG. 13, a flow chart illustrating a computer-implemented method according to some embodiments of the present disclosure is provided. At block 1310, a dID app (e.g. 850) generates a new authentication token. At block 1320, the dID app deletes the stored private key portion of a prior generated authentication token. At block 1330, the dID app encrypts the private key portion of the new generated authentication token (e.g. using the user credential and hardware controlled key store, using a dID app generated encryption key). At block 1340, the dID app stores the encrypted private key portion of the new generated authentication token in memory (e.g. 840) on device (e.g. 804, 104, 106). In various embodiments, the dID app performs the method 1300 at a predetermined periodicity (e.g. after a predetermined number of authentications, after the expiration of a predetermined period of time, after the expiration of a predetermined amount of time from the last authentication).

Figure 14:
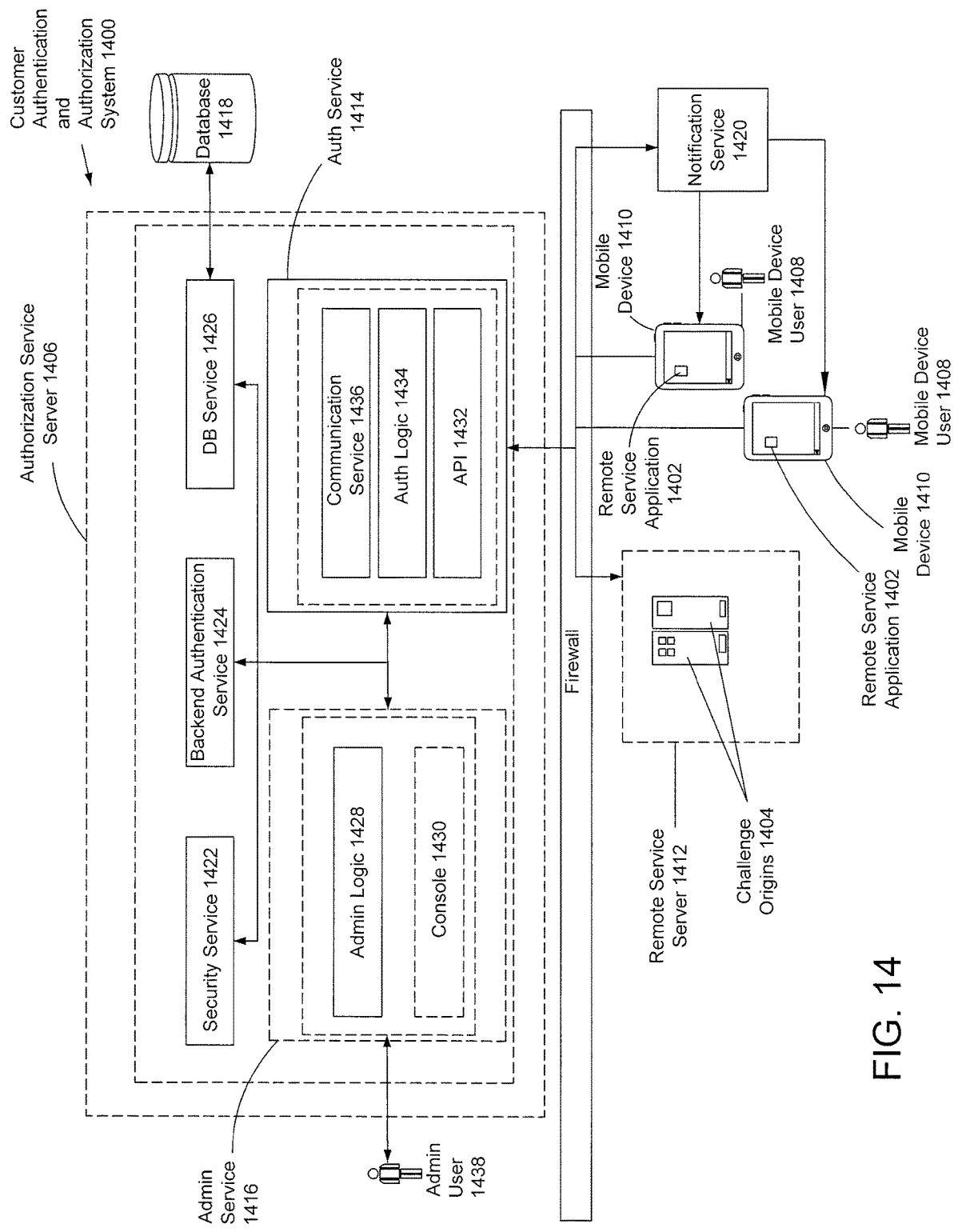
FIG. 14 is a diagram of a customer authentication and authorization system according to some embodiments of the present disclosure.

Various embodiments of the present disclosure provide a customer authentication and authorization system 1400 as shown in FIG. 14. Various embodiments of the present disclosure provide for highly contextual and secure digital transactions between challenge origins and mobile device users interacting with and responding to challenges related to an attempted remote service initiation. In various embodiments, remote services include remote actions. The system 1400 transforms existing remote service applications 1402 into strong customer authenticators and authorizers. Challenge origins 1404 that provide remote services use the authorization service (AS or AuthService) server 1406 to send users challenges, a new form of secure engagement within apps. In various embodiments, an AS may include a single IDP, as described above. In various embodiments, an AS may provide an authorization service that is part of the services of a remote service provider. In various embodiments, an AS server 1406 is a server embedded within a remote service provider framework. The inventors have identified that embedding this authorization service into a remote service provider environment gives the remote service provider the ability to open up a secure channel with a mobile device user 1408 during a transaction involving one or more of the remote service provider's remote services.

Figure 20:
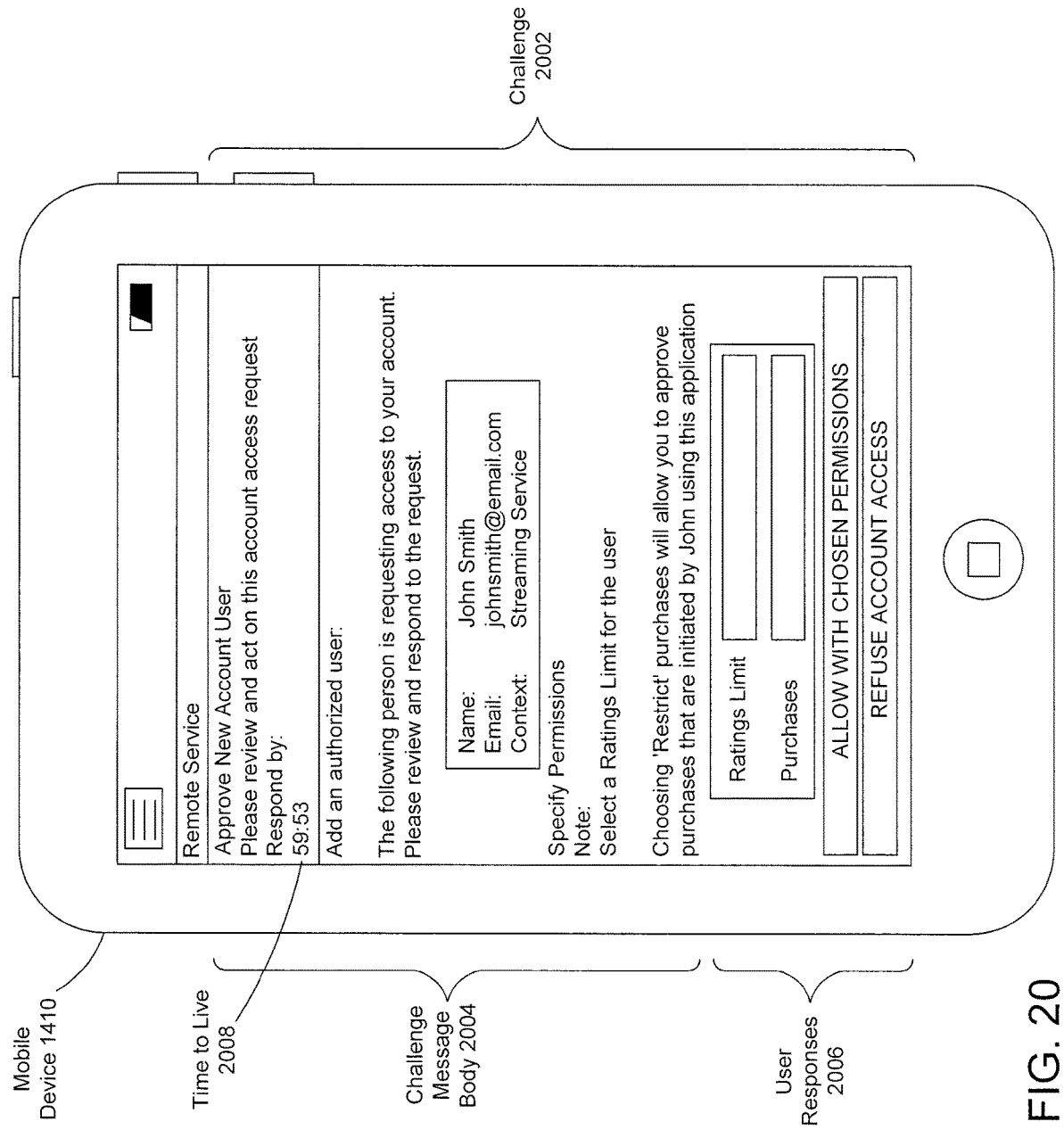
FIG. 20 is an illustrative screenshot of an example of a portion of challenge information.

Challenges 2002 (shown in FIG. 20) may include traditional identity assertions, confirmations of intent, and any type of message that may require a response. Challenges 2002 may require responses as simple as a "yes" or "no" response from a user as well as responses as contextually rich as digitally approving actionable contract terms. FIG. 20 shows an exemplary challenge 2002 from a challenge origin 1404 that provides a streaming service. Non-limiting examples of challenge origins may include: a customer service system, a transactional service system, and a voice clients system (e.g. a voice clients system in communication with a third-party voice appliance configured to receive a voice appliance user's spoken commands and/or any intervening cloud server receiving such audio from the voice appliance). Non-limiting examples of highly contextual and secure digital transactions between challenge origins and mobile device users related to an attempted remote service initiation may include, for example, account change acknowledgements, fraud alerts and responses, purchase confirmations, execution of contracts and legal agreements, execution of regulatory compliance forms, call center authentication, user registration and permissions, Internet of Things (IoT) device account linking and identification, trade and payment confirmations, wire transfer approvals, etc.

Challenges 2002 may include transaction intent verification related challenges including, for example, purchase and payment confirmations (PSD2 SCA), wire transfer approval, funds transfer, financial account linking, fraud alerts, etc. Challenges 2002 may also include passwordless login related challenges including device only login, device+biometric login, device+PIN login, etc. Challenges 2002 may also include online consumer account (financial, retail, media, etc.) related challenges including, for example, account changes, account review, user management, manage payment methods, manage shipping addresses, video/media shared accounts, household users/devices/permissions/restrictions, purchase review/edit/approval by household member (not primary account holder), Omni Channel authentication (browser, mobile, call center, in person, voice platform), acknowledgement of terms, receipt of notices, other required compliance communication, etc. Challenges 2002 may also include Smart home, security and business device related challenges including, for example, linking IoT devices (e.g., security systems, appliances, HVAC equipment, etc.) to online accounts and services, response/confirmation/cancellation of alarm conditions, authentication to registered IoT devices/platforms, etc. Challenges 2002 may also include enterprise and business systems related challenges including, for example, contract review/edit/signing, business workflow approvals, data sharing consent, physical, network, and application access systems, user permissions management and workflows, in-person identity assertion and proofing, supply chain and procurement approvals (contracts/payments), cash management and transaction approval flows, etc.

The AuthService turns users' mobile devices into cryptographically based, secure customer identifiers using AuthService code embedded within remote service applications installed on such devices. Mobile device users 1408 utilizing AuthService-enabled remote service applications 1402 simply respond to challenges 2102 delivered to their mobile devices 1410, where their responses definitively reflect their intent to initiate remote services by leveraging a private key portion of an authentication token (e.g., asymmetric key pair), bound to a user credential (e.g., PIN, biometric factor) of the mobile device user, for communications with the AuthService server 1406 (which stores only the public key portion of the authentication token). The challenges 2102 include a message body that can contain any type of interactive digital content such as HTML, PDFs, and forms.

In various embodiments, the AuthService server 1406 may communicate with multiple responding mobile devices 1410 that have remote service applications 1402 installed and a remote service server 1412 in order to authorize the respective initiation of a respective plurality of remote services by or for each of a plurality of mobile device users 1408. The AuthService server 1406 may comprise a processor, a first non-transitory machine-readable storage device, and a second non-transitory machine-readable storage device. The first non-transitory machine readable storage device may be configured to store data. The stored data may comprise, for each of the plurality of mobile device users 1408, a respective public key portion of a respective authentication token. The respective authentication token may be specific to a user credential 2102 of the mobile device user 1408 and to authorization service computer readable program code residing on a mobile device 1410 of one or more devices of the mobile device user 1408. The respective authentication token may be configured to be used by the mobile device user 1408 to authorize each of a plurality of remote services. In some embodiments, the stored data may comprise, for each of the plurality of mobile device users 1408, a respective public key portion of a respective access token. The respective access token may be specific to one or more mobile devices 1410 of the mobile device user 1408 and to the authorization service computer readable program code residing on the mobile device. Each of a plurality of challenge origins 1404 may provide a different one of the plurality of remote services. The stored data may further comprise, for each one of the respective plurality of remote services, a respective identifier.

The second non-transitory machine-readable storage device may be encoded with program code executable by the processor for requiring the respective AuthService code residing on the mobile device 1410 of each of the mobile device users 1408 to cause a processor on the mobile device to: create the respective authentication token, store a respective private key portion of the respective authentication token on the mobile device 1410, and prevent transmission of the respective private key portion of the respective authentication token from the respective mobile device 1410. In some embodiments, the program code may be further executable by the processor for requiring the respective AuthService code residing on the mobile device 1410 of each of the mobile device users 1408 to cause a processor on the mobile device to: create the respective access token, store a respective private key portion of the respective access token on the mobile device 1410, and prevent transmission of the respective private key portion of the respective access token from the respective mobile device 1410. The program code may be further executable by the processor for, for each action to initiate a respective one remote service of the respective plurality of remote services by or on behalf of a respective mobile device user 1408, receiving, via a respective application programming interface (API) call from a remote service server 1412, a respective identifier for the respective one remote service and respective challenge information. In various embodiments, the respective identifier for the respective one remote service is a client ID and/or a client secret. In response to receiving each of the respective identifiers and respective challenge information, the program code may be further executable by the processor for transmitting at least a portion of the respective challenge information to the respective mobile device 1410 of each of the mobile device users 1408 and requiring the respective AuthService code residing on the respective mobile device 1410 of each of the mobile device users 1408 to validate a respective received user credential 2102 using the respective stored private key portion of the respective authentication token for the respective mobile device user 1408.

The program code may be further executable by the processor for receiving, from the respective mobile device 1410 of each of a plurality of the mobile device users 1408, a respective one or more messages. The program code may be further executable by the processor for validating a plurality of the received respective one or more messages using the respective stored public key portion of the respective authentication token for each of the plurality of the initiating mobile device users. The program code may be further executable by the processor for, in response to validating the plurality of the received respective one or more messages, initiating the respective one remote service.

In various embodiments, a non-transitory machine-readable storage device may be encoded with program code where, when the program code is executed by a processor of a mobile device 1410, the processor performs a method comprising: AuthService computer readable program code residing on a mobile device 1410 and embedded within a remote service application 1402 creating an authentication token comprising a public key portion and a private key portion. The created authentication token may be specific to a user credential 2102 of a mobile device user 1408 and the AuthService computer readable program code. The created authentication token may be configured to be used by the mobile device user 1408 to initiate one or more remote services. The method may further comprise the AuthService computer readable program code storing the private key portion of the created authentication token in a memory of the mobile device 1410. The method may further comprise the AuthService computer readable program code transmitting, to a computer server 1406 of the AuthService, only the public key portion of the created authentication token. In various embodiments, the AuthService code transmits only the public key portion via an API call to the computer server 1406.

The method may further comprise the processor receiving challenge information from the AuthService server 1406. The challenge information may comprise information indicative of an action to initiate one of the one or more remote services. In various embodiments, the challenge information is authorization challenge information. The method may further comprise the processor enabling the input of a user credential 2102 from the mobile device user 1408. The method may further comprise, in response to receiving the challenge information, the AuthService code validating a received user credential 2102 by attempting to decrypt the stored private key portion of the created authentication token. The method may further comprise the processor, if the received user credential 2102 is validated by the AuthService code, transmitting one or more messages to the AuthService server 1406. At least one of the one or more messages may be configured to enable initiation of the one remote service.

Figure 15:
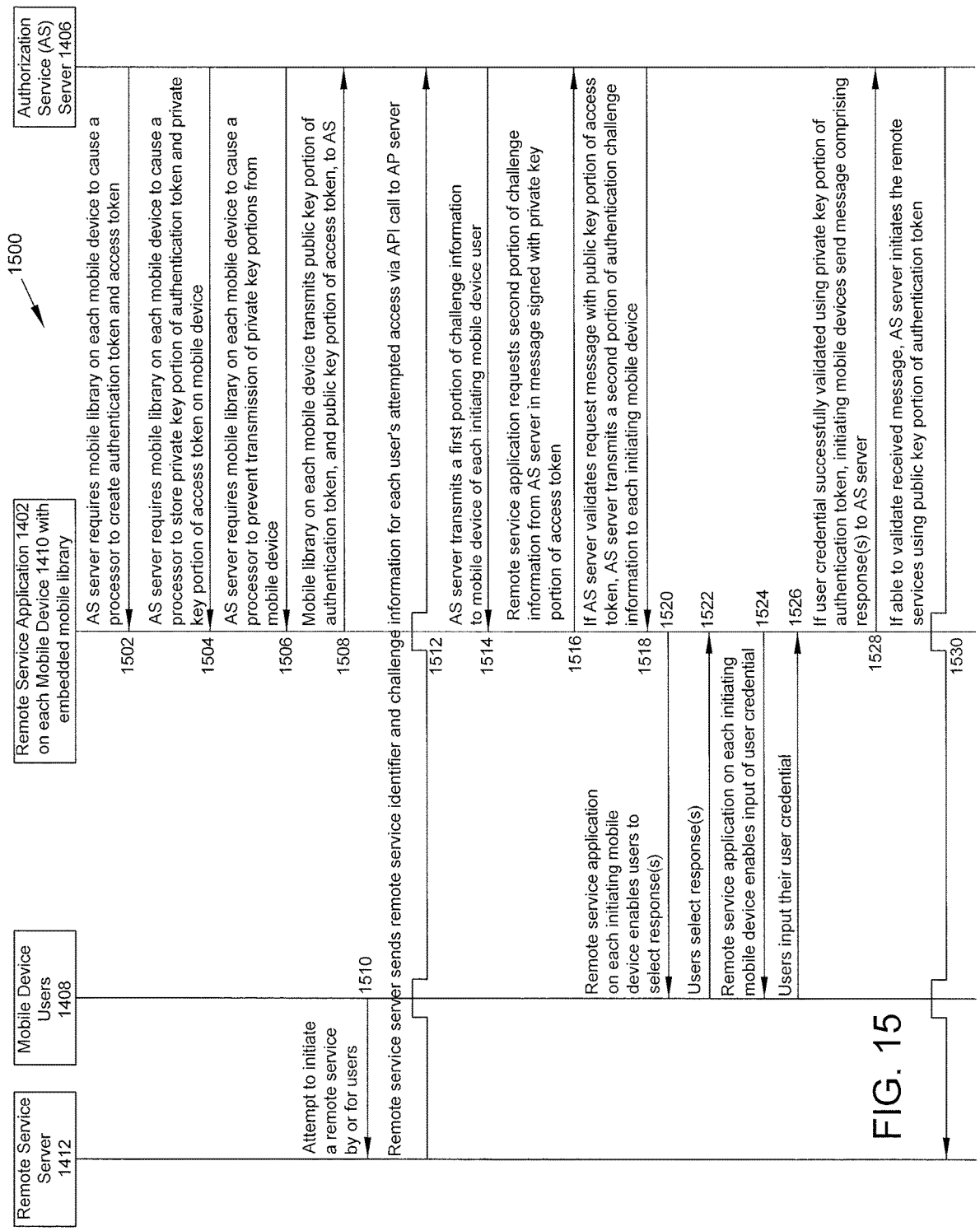
FIG. 15 is a flow chart illustrating a method of authorizing the respective initiation of a respective plurality of remote services provided by a remote service server by or for each of a plurality of mobile device users according to some embodiments.

FIG. 15 is a flow chart illustrating a method 1500 of authorizing the respective initiation of a respective plurality of remote services provided by a remote service server 1412 by or for each of a plurality of mobile device users 1408, according to some embodiments. The method 1500 begins at step 1502 where an AuthService server 1406 may require a respective mobile library on each respective mobile device 1410 to cause a processor on the mobile device 1410 to create a respective authentication token and a respective access token. The mobile library comprises AuthService computer-readable program code embedded within the remote service application 1402 on each mobile device 1410. In various embodiments, AuthService computer-readable program code is associated with a single identity provider. In various embodiments, AuthService computer-readable program code is associated with the remote service provider. The authentication token may be an asymmetric key pair, comprising a public key portion and a private key portion, as described above. The authentication token may be specific to a user credential of the mobile device user 1408 and to a mobile library residing on a mobile device 1410 of one or more devices of the mobile device user 1408. The access token may be an asymmetric key pair, comprising a public key portion and a private key portion. The authentication token may be specific to a mobile device 1410 of one or more devices of the mobile device user 1408 and to a mobile library residing on the mobile device 1410.

In various embodiments, a user credential 2102 is a mobile device user-selected personal identification number (PIN), a mobile device user biometric factor, or combinations thereof. Non-limiting examples of a mobile device user biometric factor include one or more fingerprints (e.g., a thumbprint), a facial mapping of one or more portions of the user's face, an eye mapping (e.g., eye veins, iris, retina), a speech profile, a voiceprint, or combinations thereof. Non-limiting examples of a mobile library include a library supporting a mobile device operating system such as, for example, iOS® (Swift programming language) or Android® OS (Java programming language). In various embodiments, at step 1502, the AuthService server 1406 may require a mobile library on a mobile device 1410 to cause a processor on the mobile device 1410 to create a respective authentication token for each of a mobile device user's different user credentials (e.g., a first asymmetric key pair for a user-selected PIN and a second asymmetric key pair for the user's fingerprint). The authentication token may be configured to be used by the mobile device user 1408 to authorize the initiation of each of a plurality of remote services.

The inventors have identified that the systems and methods described herein permit the remote service and/or challenge origin to interactively generate a contextually rich challenge, with contextually rich user response options, that is particular to the specific remote service initiation attempt, securely authenticates the mobile device user, and securely authorizes or rejects the specific remote service initiation attempt by or for the mobile device user within a remote service application environment. In various embodiments, a plurality of remote service providers may each provide a remote service server 1412, with each remote service server 1412 including a respective plurality of challenge origins 1404. For example, a remote service server 1412 may be provided by a financial institution with a variety of challenge origins 1404. Non-limiting examples of such challenge origins 1404 may include: a fraud analytics challenge origin, a customer service (e.g. billing, call center) challenge origin, and a voice clients challenge origin. An attempted significant purchase (e.g., an attempt to spend $2,000 on a computer) may trigger the fraud analytics challenge origin 1404 to interactively generate a contextually rich challenge 2102, with contextually rich challenge user response options, in order to have the particular mobile device user 1408 authenticate and authorize the specific, significant purchase. An upcoming credit card bill due date may trigger the customer service challenge origin 1404 to interactively generate a challenge 2102, with contextually rich challenge user response options, to notify the particular mobile device user 1408 of the due date and enable the mobile device user 1408 to select user responses 2106 such as, for example, "Pay minimum amount" or "Pay full balance." An attempt to purchase a product through a mobile device user's third-party voice appliance may trigger the voice clients challenge origin 1404 to interactively generate a contextually rich challenge 2102 (including the translated text from the audio retrieved by the voice appliance and/or any intervening cloud server receiving such audio from the voice appliance), with contextually rich challenge user response options, in order to have the particular mobile device user 1408 authenticate and authorize the specific purchase. The contextually rich challenge user responses 2106 may allow the mobile device user 1408 to, for example, allow the purchase unmodified, modify various parameters of the purchase, or prohibit the purchase.

At step 1504, the respective mobile library on each respective mobile device 1410 causes a processor on the mobile device 1410 to store the respective private key portion of the authentication token on the respective mobile device 1410. As illustrated at step 1504, the respective mobile library on each respective mobile device 1410 may cause a processor on the mobile device 1410 to store the respective private key portion of the access token on the respective mobile device 1410. The respective private key portion of the authentication token, and the respective private key portion of the access token (if created), may be stored in a memory of the mobile device 1410, as described above. In various embodiments, the respective private key portion of the authentication token, and the respective private key portion of the access token (if created), may be stored in a mobile library of the mobile device 1410. In various embodiments, the AuthService server 1406 may require the respective mobile library on each respective mobile device 1410 to cause the processor to store the respective private key portions. In various embodiments, cryptographic code within the AuthService code of the remote service application 1402 may be used to generate an authentication token using, for example, an OS (e.g., iOS) and a hardware controlled key store on the mobile device, and encrypt the private key portion of the generated authentication token using a portion or all of a mobile device user's user credential 2102 and the hardware controlled key store, and store the encrypted private key in a memory on device 1410. In various embodiments, cryptographic code within the AuthService code of the remote service application 1402 may be used to generate an authentication token using a cryptographically secure algorithm, use a portion or all of a mobile device user's user credential 2102 to generate a cryptographically secure encryption key (e.g. use a portion or all of the user credential as a seed to an encryption algorithm to generate an encryption key), encrypt the private key portion of the generated authentication token using the generated encryption key, and store the encrypted private key in a memory on device 1410. In various embodiments, cryptographic code within the AuthService code of the remote service application 1402 may be used to generate an access token, encrypt the private key portion of the generated access token, and store the encrypted private key in a memory on device 1410.

At step 1506, the respective mobile library on each respective mobile device 1410 causes a processor on the mobile device 1410 to prevent transmission of the respective private key portion of the authentication token (and of the respective private key portion of the access token (if created)) from the respective mobile device 1410, as described above, and only transmit the respective public key portion of the respective authentication token (and the respective public key portion of the access token (if created)) from the respective mobile device 1410 to the AuthService server 1406. In various embodiments, the respective mobile library on each respective mobile device 1410 causes the processor on the mobile device 1410 to prevent transmission of the respective private key portions and to only transmit the respective public key portions. In various embodiments, the AuthService server 1406 may require the respective mobile library on one or more of the respective mobile devices 1410 to prevent transmission of the respective private key portions and to only transmit the respective public key portions.

At step 1508, the mobile library on each respective mobile device 1410 may transmit only the respective public key portion of the authentication token (and the respective public key portion of the access token (if created)) to the AuthService server 1406, as described above. In various embodiments, at step 1508, the transmission of only the respective public key portion of the authentication token (and of the respective public key portion of the access token (if created)) is via an API call from the mobile device 1410 to the AuthService server 1406. In various embodiments, the AuthService server 1406 may require a mobile library on a mobile device 1410 to create a new authentication token (e.g., asymmetric key pair) at a predetermined periodicity (e.g., after a predetermined number of authentications, after the expiration of a predetermined period of time, after the expiration of a predetermined amount of time from the last authentication). For example, the AuthService server 1406 may require the AuthService code of the remote service application 1402 to create a new authentication token (e.g., asymmetric key pair) at a predetermined periodicity as similarly described above for the single IDP and dID app (e.g. 850). In various embodiments, AuthService server 1406 may require a mobile library on a mobile device 1410 to cause a processor on the mobile device 1410 to store the private key portion of the newly generated authentication token in memory on the mobile device 1410 as similarly described above. In various embodiments, cryptographic code within the AuthService code of the remote service application 1402 may encrypt the private key portion of the newly generated authentication token, and store the encrypted private key in a memory on device 1410 as similarly described above. In various embodiments, the AuthService server 1406 may similarly require the AuthService code of the remote service application 1402 to create a new access token (e.g., asymmetric key pair) at a predetermined periodicity.

The mobile device 1410 may comprise a non-transitory machine readable (e.g., computer-readable) storage device encoded with program code that may be executed by a processor of the mobile device. The processor on the mobile device 1410 may execute one or more of the steps illustrated as performed on the mobile device 1410 in method 1500. In various embodiments, the mobile device 1410 may be any one of the following non-limiting examples: a personal digital assistant, a tablet, a booklet computer, a convertible notebook, a phablet, a smart phone, and a human-wearable computing device.

At step 1510, a respective action occurs which indicates the intent to initiate a respective one of a plurality of remote services by or for each respective mobile device user 1408. For example, in various embodiments, each respective mobile device user 1408 may act in a way that triggers a challenge origin to attempt to initiate a respective one of a plurality of remote services. In various embodiments, a third party may intentionally or unintentionally attempt to initiate a respective one of a plurality of remote services that requires permission from the mobile device user 1408. In various embodiments, for example, a thief may unintentionally trigger a fraud analytics engine challenge origin 1404 to generate a challenge 2102 by attempting to make a fraudulent $2,000 computer purchase using the mobile device user's credit card without permission from the mobile device user 1408. In various embodiments, a child or relative of the mobile device user 1408 may trigger a fraud analytics engine challenge origin 1404 to generate a challenge 2102 by attempting to make a significant purchase using the mobile device user's 1408 credit card with permission from the mobile device user 1408. In various embodiments, a mobile device user's 1408 unintentionally unpaid credit card bill may trigger the billing application challenge origin 1404 to generate a challenge 2102 to notify the mobile device user 1408 of the due date and enable the mobile device user 1408 make a payment. In various embodiments, the mobile device user 1408 may attempt to use their third-party voice appliance to make a purchase, which may trigger a voice clients challenge origin 1404 to generate a challenge 2102 to authenticate and authorize the purchase. In various embodiments, a hacker may attempt to use the mobile device user's third-party voice appliance to make a purchase without permission from the mobile device user 1408, which may trigger the voice clients challenge origin 1404 to generate a challenge 2102 to authenticate and authorize the purchase.

At step 1512, for each attempted remote service initiation, a remote service server 1412 may send a respective identifier (e.g., clientID, client secret, etc.) for the respective one remote service and respective challenge information to the AuthService server 1406 via a respective API call. The respective challenge information may include a first portion and a second portion. In various embodiments, the remote service server 1412 may comprise a plurality of challenge origins 1404. In various embodiments, each one of the plurality of challenge origins may provide a different one of the plurality of remote services.

Figure 19:
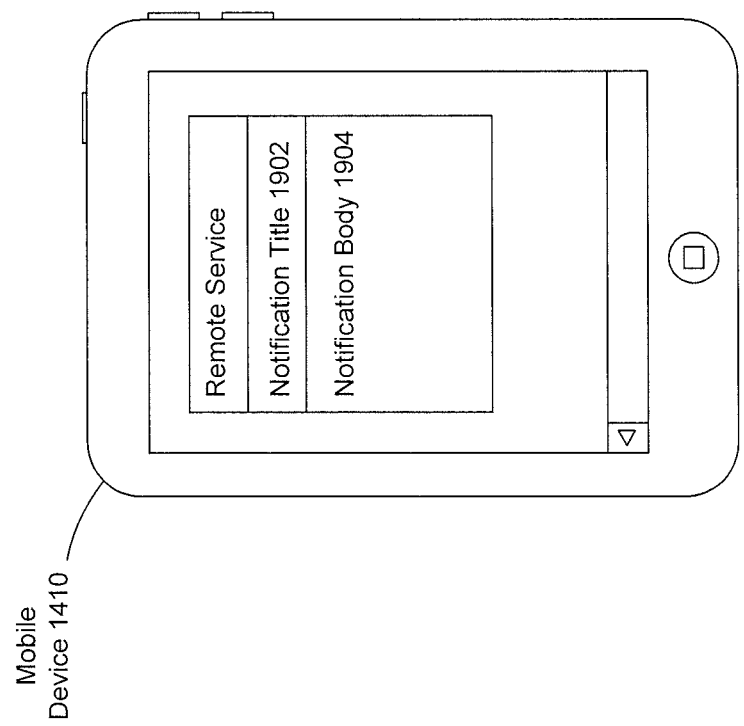
FIG. 19 is an illustrative screenshot of an example of a portion of challenge information.

At step 1514, in response to receiving each of the respective identifiers and respective challenge information, the AuthService server 1406 may transmit a first portion of challenge information to the respective mobile device 1410 of each of the mobile device users 1408, where a mobile device user is, for example, a person whose information or device (e.g., credit card information, billing information, third-party account information, third-party voice appliance) is being used in an attempt to initiate a remote service. In various embodiments, one or more of the mobile device users 1408 is a mobile device user who directly attempted to initiate the particular remote service. The first portion of challenge information may comprise notification information. In various embodiments, notification information may include a notification title 1902 and a notification body 1904 as illustrated in FIG. 19. The first portion of challenge information may include information indicative of an action to initiate one of the one or more remote services.

Figure 21:
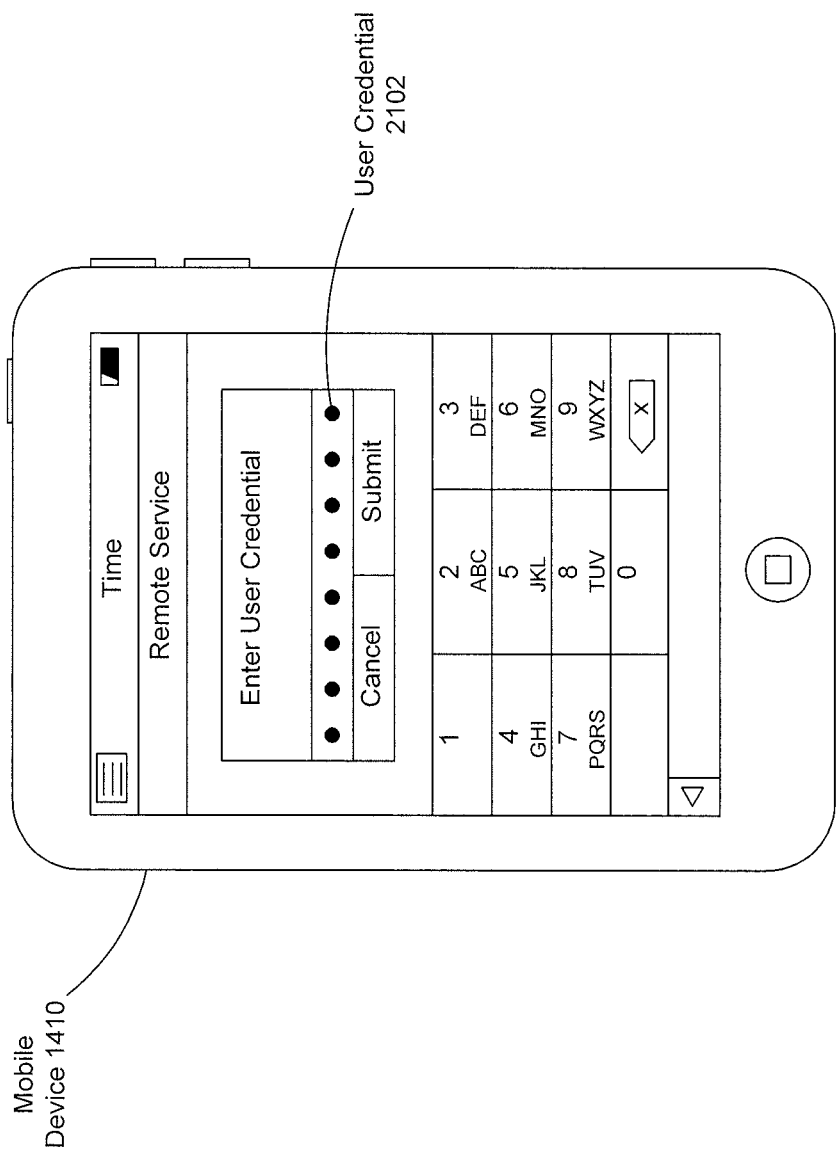
FIG. 21 is an illustrative screenshot of an example of an interface that enables the input of a user credential.

At step 1516, in response to receiving the first portion of the challenge information, the respective remote service application 1402 on the respective mobile device 1410 of each of the mobile device users 1408 may request a second portion of the challenge information from the AuthService server 1406 in a respective message signed with the private key portion of the access token stored on the respective mobile device 1410. In various embodiments, in response to receiving the first portion of the challenge information, the respective remote service application 1402 on the respective mobile device 1410 of each of the mobile device users 1408 may enable the input of a user credential 2102 from the mobile device user 1408, as described above. In various embodiments, the user credential 2102 may be one of a user PIN or a biometric factor, or combinations thereof. An example interface that enables the input of a user credential 2102 is illustrated in FIG. 21.

At step 1518, in response to receiving the respective request message from the respective mobile device 1410, the AuthService server 1406 may transmit a second portion of the challenge information to the respective mobile device 1410. The second portion of challenge information may comprise one or more of a challenge message body 2004, a time to live 2008, and one or more user responses 2006. The one or more user responses 2006 may comprise a plurality of options. An exemplary challenge 2002 with exemplary second portion of the respective challenge information displayed within the remote service application 1402 running on a mobile device 1410 is illustrated in FIG. 20. As illustrated at step 1518, in various embodiments, the AuthService server 1406 may validate the respective received request message using the respective stored public key portion of the respective access token. In various embodiments, the AuthService server 1406 may determine that the respective signature (created by the respective remote service application 1402 with the respective private key portion of the respective access token stored on the respective mobile device 1410) is valid using the using the respective stored public key portion of the respective access token. At step 1518, if the AuthService server 1406 validates the respective received request message, the AuthService server 1406 may transmit a second portion of the challenge information to the respective mobile device 1410. In various embodiments, if a respective remote service application 1402 enables the input of a respective user credential 2102 from a respective mobile device user 1408, the respective mobile device user 1408 may input his/her respective user credential 2102.

At step 1520, in response to receiving the second portion of the challenge information, the respective remote service application 1402 on the respective mobile device 1410 of each of a plurality of the mobile device users 1408 may enable each of the plurality of the mobile device users 1408 to select at least one of the one or more user responses 2006. At step 1522, the plurality of mobile device users 1408 may select at least one of the one or more user responses 2006. In various embodiments, as shown in FIG. 20, a mobile device user 1408 may allow or refuse access to a remote service, and the mobile device user 1408 may also allow modified or restricted access to the remote service by inputting, for example, a purchase or ratings limit. As described above, in various embodiments, a challenge may be triggered by a thief attempting to make a fraudulent purchase using the mobile device user's 1408 credit card, and thus, a mobile device user 1408 may select a response 2006 rejecting access to the remote credit card purchasing service. Similarly, as described above, in various embodiments, a hacker's attempt to use the mobile device user's 1408 third-party voice appliance to make a purchase may trigger the voice clients challenge origin 1404 to generate a challenge 2002, and the mobile device user 1408 may select a response 2006 rejecting access to the remote voice appliance purchasing service. As described above, in various embodiments, a challenge may be triggered by the mobile device user 1408 or a third party with permission from the mobile device user 1408 (e.g., a relative or child) attempting to make a purchase with the mobile device user's credit card or third-party voice appliance. In such a case, the mobile device user 1408 may select a response 2006 allowing access or limited access to the remote service (e.g., remote credit card purchasing service or remote third-party voice appliance purchasing service).

At step 1524, the respective remote service application 1402 on the respective mobile device 1410 of each of the plurality of mobile device users 1408 may enable the input of a user credential 2102 from the mobile device user 1408, as described above. In various embodiments, the user credential 2102 may be one of a user PIN or a biometric factor, or combinations thereof. An example interface that enables the input of a user credential 2102 is illustrated in FIG. 21. At step 1526, the respective mobile device users 1408 may input their respective user credential 2102.

In various embodiments, the mobile library on the respective mobile device 1410 may validate a received user credential 2102 by attempting to temporarily decrypt the stored encrypted private key portion of the created authentication token. In various embodiments, cryptographic code within the AuthService code of the remote service application 1402 may be used to validate the received user credential 2102 by temporarily decrypting the stored encrypted private key portion of the authentication token using the received user credential 2102 and the hardware controlled key store. In various embodiments, a mobile device user 1408 may input an incorrect PIN or other user credential 2102, and the AuthService code of the remote service application 1402 may reject the incorrect PIN or other user credential 2102. In such a case, the AuthService server 1406 may receive a message indicating user credential 2102 validation failure, or the AuthService server 1406 may receive no message at all. The inventors have identified that the systems and methods described herein achieve heightened convenience for mobile device users such that they need only interact with and receive challenges from a remote service application 1402 instead of also having to use an out-of-band communication to authenticate and authorize access to remote services. Additionally, the inventors have identified that the systems and methods described herein provide the benefit of allowing remote service providers to remain in-brand when interacting with customers to authenticate and authorize initiation of remote services. The inventors have identified that services that require users to go out-of-band (e.g., outside of communicating with the remote service provider), or switch brands (e.g., outside of the brand of the remote service provider), confuses users and hurts business of the remote service providers. In various embodiments, the AuthService server 1406 may require the respective mobile library on the respective mobile device 1410 of one or more of the plurality of mobile device users 1408 to validate a respective received user credential 2102 using the respective stored private key portion of the respective authentication token for the respective initiating mobile device user 1408.

At step 1528, if the respective received user credential 2102 is validated by the respective mobile library, and in response to receiving a selection of at least one of the one or more responses 2006, the respective mobile device 1410 of each of the plurality of initiating mobile device users 1408 may transmit a respective message comprising the received selected at least one response to the single identity provider server 1406 to enable initiation of the respective one remote service. In various embodiments, the respective response message may include information indicating successful validation of the respective received user credential 2102 to the AuthService server 1406 as described above. In various embodiments, the respective response message may be transmitted via an API call. In various embodiments, the response message may also include information indicating that the mobile device user 1408 rejected access to the remote service if, for example, a thief or a hacker attempted to initiate a remote credit card purchasing service or a remote third-party voice appliance purchasing service, as described above.

At step 1530, if able to validate the received response messages comprising the respective response information (e.g., using the public key of the respective authentication token), the AuthService server 1406 may initiate the respective one remote service.

Figure 16:
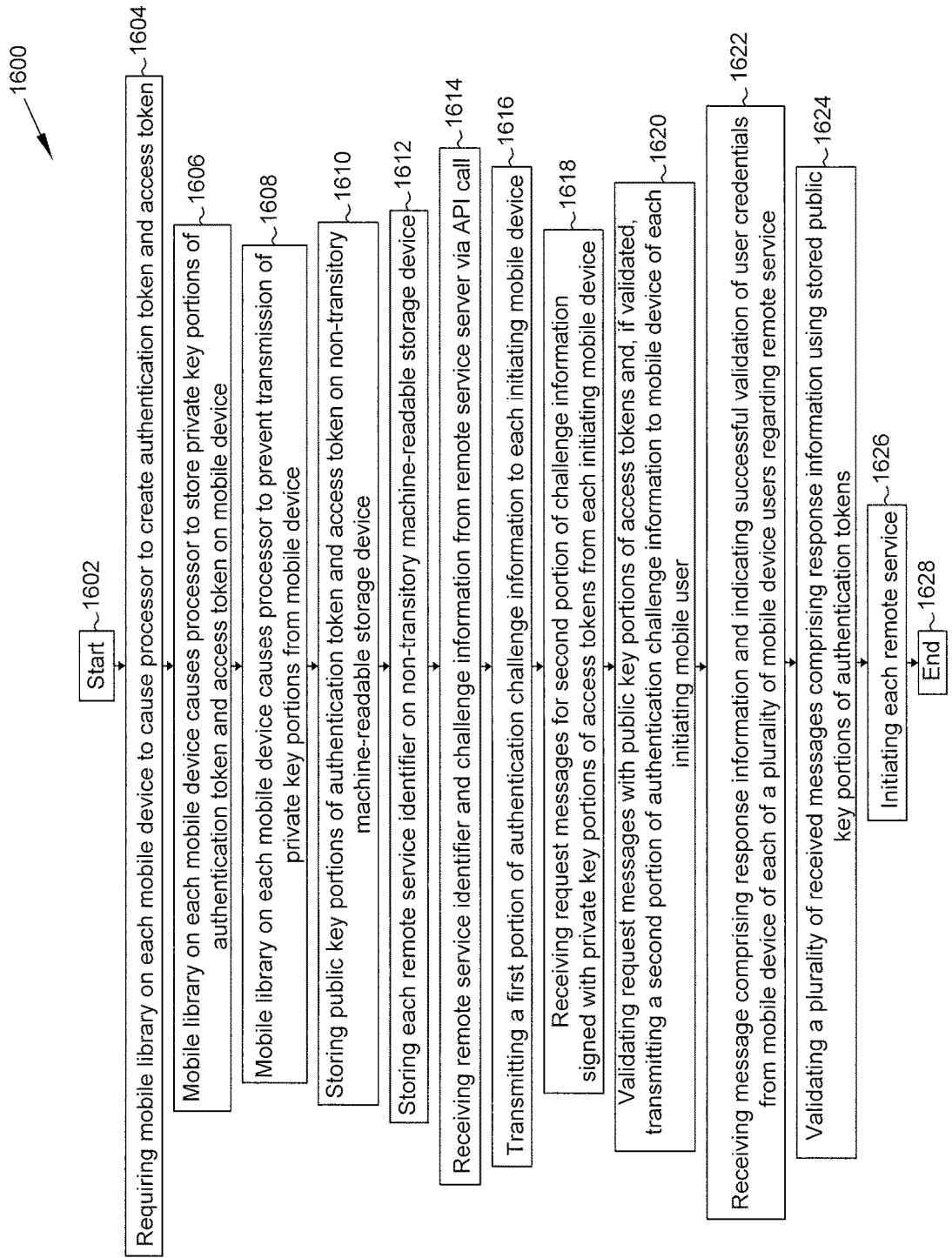
FIG. 16 is a flow chart from the perspective of an authorization service server illustrating a method of authorizing the respective initiation of a respective plurality of remote services provided by a remote service server by or for each of a plurality of mobile device users according to some embodiments.

FIG. 16 is a flow chart from the perspective of an AuthService server 1406 illustrating a method 1600 of authorizing the respective initiation of a respective plurality of remote services provided by a remote service server 1412 by or for each of a plurality of mobile device users 1408, according to some embodiments. The AuthService server 1406 may comprise a processor, a first non-transitory machine-readable (e.g., computer-readable) storage device, and a second non-transitory machine-readable (e.g., computer-readable) storage device. The first non-transitory machine-readable storage device may be configured to store data, enabling it to perform steps 1610 and 1612 of method 1600. The second non-transitory machine-readable storage device may be encoded with program code executable by the processor for performing steps 1604 through 1608 and 1614 through 1628 of method 1600. Method 1600 begins at step 1602.

At step 1604, the respective mobile library residing on the mobile device 1410 of each of the mobile device users 1408 may cause a processor on the mobile device 1410 to create a respective authentication token (e.g., asymmetric key pair with public key portion and private key portion) and a respective access token (e.g., asymmetric key pair with public key portion and private key portion). In various embodiments, transmissions between the AuthService server 1406 and each of the plurality of mobile devices 1410, and/or transmissions between the AuthService server 1406 and the remote service server 1412, may utilize a Secure Sockets Layer (SSL) or Transport Layer Security (TLS) protocol (e.g., using symmetrically generated encryption keys for a SSL or TLS session) as described above.

At step 1606, the respective mobile library residing on the mobile device 1410 of each of the mobile device users 1408 may cause a processor on the mobile device 1410 to store respective private key portions of the respective authentication token and of the respective access token on the mobile device 1410, as described above.

At step 1608, the respective mobile library residing on the mobile device 1410 of each of the mobile device users 1408 may cause a processor on the mobile device 1410 to prevent transmission of the respective private key portions of the respective authentication token and the respective access token from the respective mobile device 1410, as described above, and only transmit the respective public key portions of the respective authentication token and the respective access token from the respective mobile device 1410 to the AuthService server 1406. In various embodiments, the AuthService server 1406 may require the respective mobile library residing on the mobile device 1410 of one or more of the mobile device users 1408 to prevent transmission of such private key portions and/or to only transmit such public key portions.

At step 1610, the AuthService server 1406 may, for each of the plurality of mobile device users 1408, store the respective public key portion of each respective authentication token, and the respective public key portion of each respective access token, on the first non-transitory machine-readable storage device, as described above.

At step 1612, the AuthService server 1406 may store a respective remote service identifier for each one of the respective plurality of remote services on the first non-transitory machine-readable storage device, as described above. In various embodiments, the AuthService server 1406 may require the challenge origins 1404 or remote services to register with the AuthService in order for the AuthService server 1406 to broker mobile device users' access to remote services provided by the challenge origins 1404. This allows the AuthService server 1406 to use a stored remote service identifier to validate and identify which remote service or challenge origin 1404 is sending the challenge information when the AuthService server 1406 receives a remote service identifier with challenge information.

Steps 1614 through 1630 may be executable for each of a plurality of actions to initiate a respective one remote service of the respective plurality of remote services by or for a respective mobile device user 1408.

At step 1614, the AuthService server 1406 may receive, via a respective API call from a remote service server 1412, a respective identifier for the respective one remote service and respective challenge information.

At step 1616, the AuthService server 1406 may, in response to receiving each of the respective identifiers and respective challenge information, transmit a first portion of the respective challenge information to the respective mobile device 1410 of each of the mobile device users 1408, as described above.

At step 1618, the AuthService server 1406 may receive a respective request message requesting a second portion of the respective challenge information from the respective mobile device 1410, as described above. In various embodiments, one or more of the respective request messages may be signed with the respective private key portion of the respective access token that is stored on the respective mobile device 1410, as described above. In various embodiments, in response to receiving each of the respective identifiers and respective challenge information, the AuthService may require the respective mobile library residing on the respective mobile device 1410 of one or more of the mobile device users 1408 to validate a respective received user credential 2102 using the respective stored private key portion of the respective authentication token for the respective mobile device user, as described above.

At step 1620, the AuthService server 1406 may validate the respective received request message with the respective public key portion of the respective access token that is stored on the first non-transitory machine-readable storage device, as described above. At step 1620, if validated, the AuthService server 1406 transmit a second portion of the respective challenge information to the respective mobile device 1410 of each of the plurality of mobile device users 1408.

At step 1622, the AuthService server 1406 may receive, from the respective mobile device of each of the plurality of the mobile device users 1408, a respective response message including respective response information regarding the respective one remote service. The respective response information may indicate a selection of one or more of a plurality of options. Exemplary options are illustrated in FIG. 20. In various embodiments, the respective response message may also include information indicating that the respective mobile library residing on the respective mobile device 1410 successfully validated the respective received user credential 2102, as described above.

At step 1624, the AuthService server 1406 may validate a plurality of the received response messages including respective response information regarding the respective one remote service using the respective stored public key portion of the respective authentication token for each of the plurality of the mobile device users 1408, as described above.

At step 1626, the AuthService server 1406 may, in response to validating the respective received response messages, initiate the respective one remote service. In various embodiments, the second non-transitory machine-readable storage device may be further encoded with program code executable by the processor for initiating at least one of the respective one remote services by transmitting the respective response information to the respective remote service server 1412. In various embodiments, the AuthService server 1406 may provide the respective response information to the respective remote service server 1412 via a pre-configured callback URL. In various embodiments, the AuthService server 1406 may provide the respective response information to the respective remote service server 1412 via an API call. In various embodiments, the second non-transitory machine-readable storage device may be further encoded with program code executable by the processor for initiating at least one of the respective one remote services by redirecting a web browser on the respective mobile device 1410 of the respective initiating mobile device user 1408 to a respective callback URL.

The method 1600 ends at step 1628.

Figure 22:
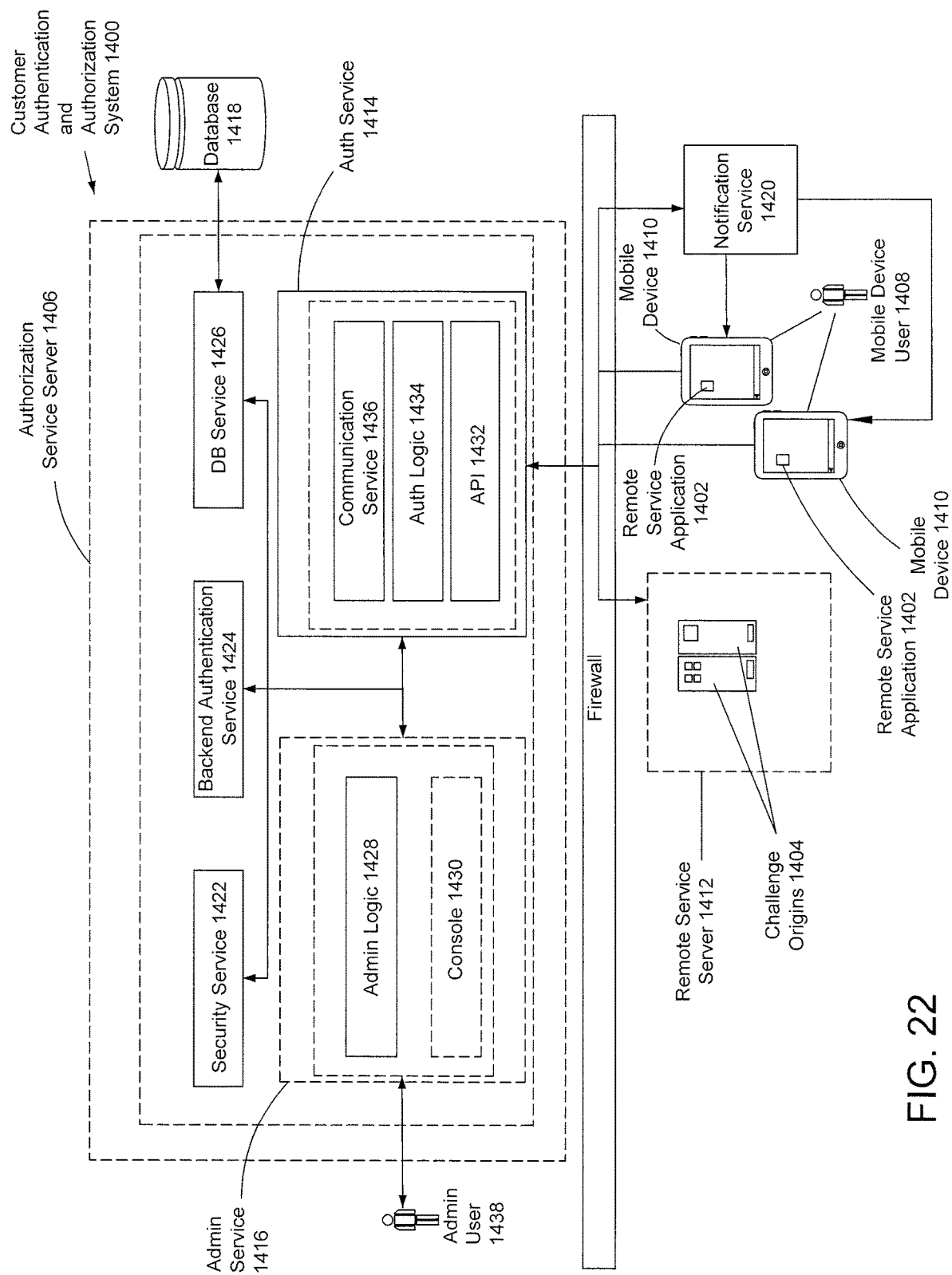
FIG. 22 is a diagram of a customer authentication and authorization system according to some embodiments of the present disclosure.

Various embodiments of the present disclosure provide a customer authentication and authorization system 1400 as shown in FIG. 22. FIG. 22 illustrates one mobile device user 1408 who has a plurality of mobile devices 1410. The elements of customer authentication and authorization system 1400 shown in FIG. 22 are described above with regard to FIG. 14. In various embodiments, the AuthService server 1406 may communicate with multiple mobile devices 1410 of a single mobile device user 1408 and a plurality of challenge origins 1404 in order to authorize by a mobile device user 1408 to actions on a plurality of remote services. The AuthService server 1406 may comprise a processor, a first non-transitory machine-readable storage device, and a second non-transitory machine-readable storage device. The first non-transitory machine-readable storage device may be configured to store data. The stored data may comprise, for a mobile device user 1408, a public key portion of an authentication token. The authentication token may be specific to a user credential 2102 of the mobile device user 1408 and to AuthService computer readable program code residing on a plurality of mobile devices 1410 of the mobile device user 1408. The authentication token may be configured to be used by the mobile device user 1408 to authorize each of a plurality of remote services. The stored data may further comprise, for each one of the plurality of remote services, a respective identifier received from a respective challenge origin 1404 of a plurality of challenge origins 1404.

The second non-transitory machine-readable storage device may be encoded with program code executable by the processor for requiring the respective AuthService code residing on each of the plurality of mobile devices 1410 of the mobile device user 1408 to cause a respective processor on each of the plurality of mobile devices to: create the authentication token, store a private key portion of the authentication token on the respective mobile device 1410, and prevent transmission of the private key portion of the authentication token from the respective mobile device 1410. The program code may be further executable by the processor for, for each of a plurality of actions to initiate a respective one remote service of the plurality of remote services by the mobile device user 1408, receiving, via an API call from a respective one of the plurality of challenge origins 1404, the respective identifier for the respective one remote service and at least a portion of the respective challenge information.

The program code may be further executable by the processor for, in response to receiving the respective identifier and the at least a portion of the respective challenge information, transmitting the at least a portion of the respective challenge information to each of the plurality of mobile devices 1410 of the mobile device user 1408. The program code may be further executable by the processor for receiving, from at least one mobile device 1410 of the mobile device user 1408, a respective one or more messages. The program code may be further executable by the processor for validating at least one of the received respective one or more messages from the at least one mobile device 1410 using the stored public key portion of the authentication token for the mobile device user 1408. The program code may be further executable by the processor for, in response to validating the at least one of the received respective one or more messages from the at least one mobile device 1410, initiating the respective one remote service.

Figure 17:
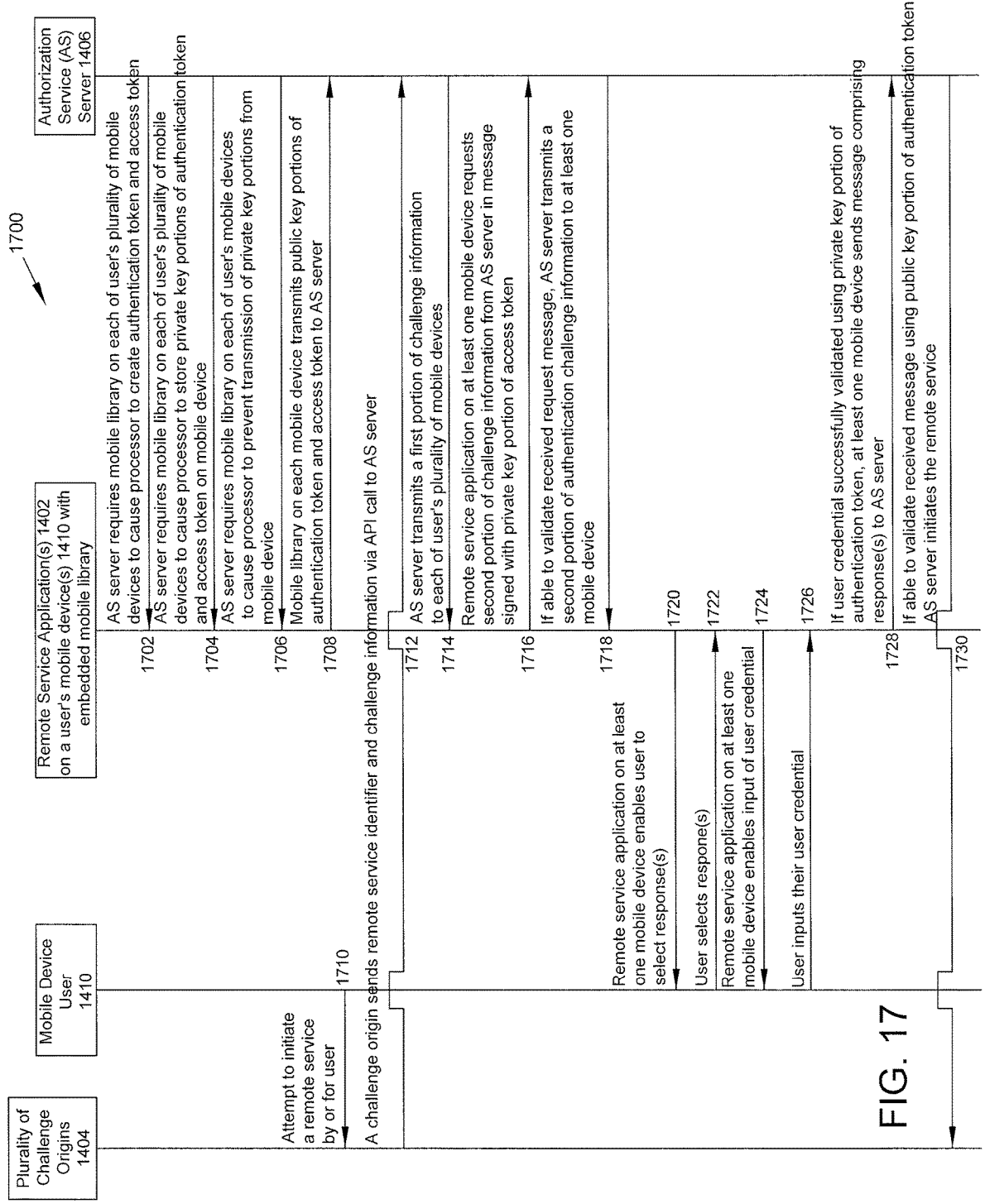
FIG. 17 is a flow chart illustrating a method of authorizing the respective initiation of a respective plurality of remote services provided by a plurality of challenge origins by or for a mobile device user according to some embodiments.

FIG. 17 is a flow chart illustrating a method 1700 of authorizing the respective initiation of a respective plurality of remote services provided by a plurality of challenge origins 1404 by or for a mobile device user 1408 according to some embodiments. The method 1700 begins at step 1702 where an AuthService server 1406 may require a mobile library residing on each of a plurality of mobile devices 1410 of a mobile device user 1408 to cause a respective processor on each of the plurality of mobile devices 1410 to create a respective authentication token and a respective access token.

At step 1704, the respective mobile library residing on each of a plurality of mobile devices 1410 of a mobile device user 1408 may cause a respective processor on each of the plurality of mobile devices 1410 to store a respective private key portion of the respective authentication token, and a respective private key portion of the respective access token, on the respective mobile device 1410.

At step 1706, a respective mobile library residing on each of a plurality of mobile devices 1410 of a mobile device user 1408 may cause a respective processor on each of the plurality of mobile devices 1410 to prevent transmission of the respective private key portions of the respective authentication token and respective access token from the respective mobile device 1410, as described above, and only transmit the respective public key portions of the respective authentication token and respective access token from the respective mobile device 1410 to the AuthService server 1406.

At step 1708, the mobile library on each respective mobile device 1410 may transmit only the respective public key portions of the respective authentication token and respective access token to the AuthService server 1406. The mobile device 1410 may comprise a non-transitory machine-readable (e.g., computer-readable) storage device encoded with program code that may be executed by a processor of the mobile device. The processor on the mobile device 1410 may execute one or more of the steps illustrated as being performed on the mobile device 1410 in method 1700.

At step 1710, an action occurs which indicates the intent to initiate one remote service of a plurality of remote services by or for the user, as described above.

At step 1712, a respective one of a plurality of challenge origins 1404 may send, via an API call to the AuthService server 1406, the respective identifier for the respective one remote service and respective challenge information. The plurality of challenge origins 1404 may include any of the non-limiting examples described above.

At step 1714, in response to receiving the respective identifier and respective challenge information, the AuthService server 1406 may transmit a first portion of the respective challenge information to each of the plurality of mobile devices 1410 of the mobile device user 1408.

At step 1716, in response to receiving the first portion of the challenge information, the remote service application 1402 on at least one mobile device 1410 may request a second portion of the challenge information from the Auth- Service server 1406 in a request message signed with the private key portion of the access token that is stored on the at least one mobile device.

At step 1718, if the AuthService server 1406 is able to validate the received request message from the at least one mobile device 1410 using the public key portion of the access token that is stored on the non-transitory computer-readable storage device at the AuthService, the AuthService server 1406 may transmit a second portion of the respective challenge information to the at least one mobile device 1410. The second portion of the challenge information may include one or more of a challenge message body 2004, a time to live 2008, and one or more user responses 2006. The one or more user responses 2006 may comprise a plurality of options.

At step 1720, the remote service application 1402 on the at least one mobile device 1410 may enable the user to select at least one of the one or more user responses 2006.

At step 1722, the user may select one or more responses 2006.

At step 1724, the remote service application 1402 on the at least one mobile device 1410 may enable the input of a user credential 2102 from the mobile device user 1408. The user credential 2102 may, for example, be one of a user PIN or biometric.

At step 1726, the user may input their user credential 2102.

At step 1728, if the user credential 2102 is validated using the stored private key portion of the authentication token, the at least one mobile device 1410 may transmit a response message comprising response information regarding the respective one remote service to the AuthService server 1406. In various embodiments, the response message may include information indicating that the mobile library residing on the at least one mobile device 1410 successfully validated a received user credential 2102 using the stored private key portion of the authentication token for the mobile device user 1408.

At step 1730, if the AuthService server 1406 is able to validate the received message comprising the respective response information, the AuthService server 1406 may initiate the remote service.

Figure 18:
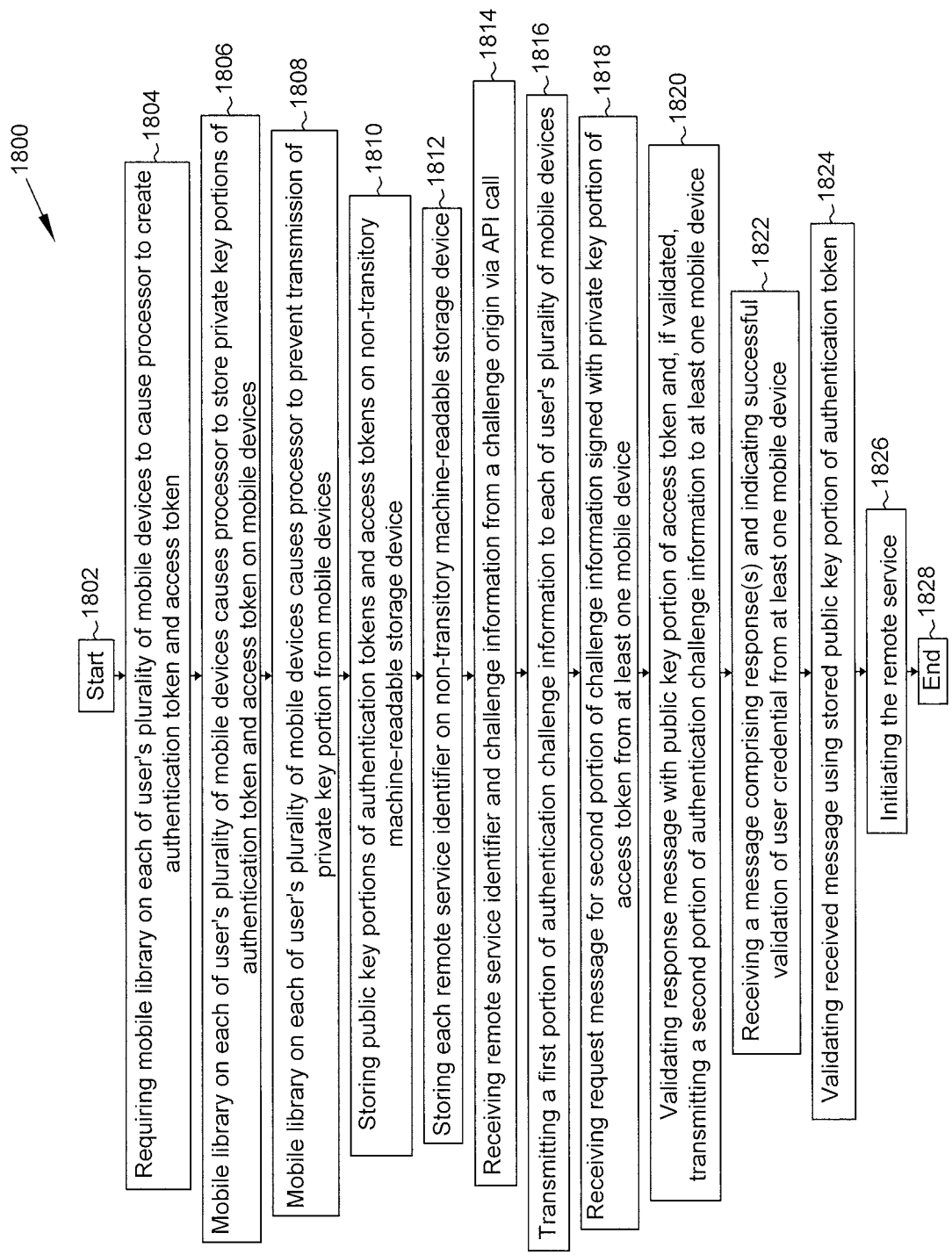
FIG. 18 is a flow chart from the perspective of an authorization service server illustrating a method of authorizing the respective initiation of a respective plurality of remote services provided by a plurality of challenge origins by or for a mobile device user according to some embodiments.

FIG. 18 is a flow chart from the perspective of an AuthService server 1406 illustrating a method 1800 of authorizing the respective initiation of a respective plurality of remote services provided by a plurality of challenge origins 1404 by or for a mobile device user 1408, according to some embodiments. The AuthService server 1406 may comprise a processor, a first non-transitory machine-readable (e.g., computer-readable) storage device, and a second non-transitory machine-readable (e.g., computer-readable) storage device. The first non-transitory machine-readable storage device may be configured to store data. The stored data may include a public key portion of an authentication token for a mobile device user 1408. The authentication token may be specific to a user credential 2102 of the mobile device user 1408 and to the mobile libraries residing on a plurality of mobile devices 1410 of the mobile device user 1408. The authentication token may be configured to be used by the mobile device user 1408 to authorize the initiation of each of a plurality of remote services. The stored data may further include a public key portion of an access token for a mobile device user 1408. The access token may be specific to a mobile device 1410 of the mobile device user 1408 and to the mobile library residing on the mobile device 1410. The stored data may further include, for each one of the plurality of remote services, a respective identifier received from a respective challenge origin 1404 of a plurality of challenge origins 1404 during registration as described above. The second non-transitory machine-readable storage device may be encoded with program code executable by the processor for performing method 1800.

In various embodiments, the stored data on the first non-transitory machine-readable storage device may further comprise, for the mobile device user 1408, a plurality of public key portions of a plurality of authentication tokens. Each of the plurality of authentication tokens may be specific to a respective user credential 2102 of the mobile device user 1408 and to a respective mobile library residing on a respective one of the plurality of mobile devices of the mobile device user 1408. Each of the plurality of authentication tokens may be configured to be used by the mobile device user 1408 to authorize each of the plurality of remote services. The stored public key portion of the authentication token for the mobile device user 1408 (stored on the first non-transitory machine-readable storage device) may include the respective public key portion of the respective authentication token specific to the mobile library residing on the at least one mobile device 1410. The stored private key portion of the authentication token for the mobile device user 1408 may include the respective private key portion of the authentication token specific to the mobile library residing on the at least one mobile device 1410.

Method 1800 begins at step 1802. At step 1804, the AuthService server 1406 may require the respective mobile library residing on each of a plurality of mobile devices 1410 of a mobile device user 1408 to cause a respective processor on each of the plurality of mobile devices 1410 to create a respective authentication token and a respective access token.

At step 1806, the respective mobile library residing on each of the plurality of mobile devices 1410 of the mobile device user 1408 may cause a respective processor on each of the plurality of mobile devices 1410 to store a respective private key portion of the created authentication token, and a respective private key portion of the created access token, on the respective mobile device 1410.

At step 1808, the respective mobile library residing on each of the plurality of mobile devices 1410 of the mobile device user 1408 may cause a respective processor on each of the plurality of mobile devices 1410 to prevent transmission of the respective private key portion of the respective authentication token, and the respective private key portion of the respective access token, from the respective mobile device 1410, as described above, and only transmit the respective public key portion of the respective authentication token, and the respective public key portion of the respective access token, from the respective mobile device 1410 to the AuthService server 1406.

At step 1810, the AuthService server 1406 may, for a mobile device user 1408, store a respective public key portion of each created authentication token, and a respective public key portion of each created access token, on the first non-transitory machine-readable storage device, as described above.

At step 1812, the AuthService server 1406 may, for each one of the plurality of remote services, store a respective remote service identifier received from a respective challenge origin 1404 of a plurality of challenge origins 1404 on the first non-transitory machine-readable storage device. In various embodiments, the AuthService server 1406 may require the challenge origins 1404 or remote services to register with the AuthService in order for the AuthService server 1406 to broker initiation and usage of remote services provided by the challenge origins 1404 by or for mobile device users, as described above.

Steps 1814 through 1828 may be executable for each of a plurality of actions to initiate a respective one remote service of the plurality of remote services by the mobile device user 1408. At step 1814, the AuthService server 1406 may receive, via an API call from a respective one of the plurality of challenge origins 1404, the respective identifier for the respective one remote service and respective challenge information.

At step 1816, the AuthService server 1406 may, in response to receiving the respective identifier and respective challenge information, transmit a first portion of the respective challenge information to each of the plurality of mobile devices 1410 of the mobile device user 1408.

At step 1818, the AuthService server 1406 may receive, from at least one mobile device 1410 of the mobile device user 1408, a request message requesting a second portion of the respective challenge information that is signed with the respective private key portion of the respective access token of the at least one mobile device 1410.

At step 1820, the AuthService server 1406 may, in response to validating the received request message from the at least one mobile device 1410 using the respective public key portion of the respective access token, transmit a second portion of the respective challenge information to the at least one mobile device 1410.

At step 1822, the AuthService server 1406 may receive a response message including response information regarding the respective one remote service, and indicating that the mobile library residing on the at least one mobile device 1410 successfully validated a received user credential 2102 using the stored respective private key portion of the respective authentication token for the mobile device user 1408, from the at least one mobile device 1410.

At step 1824, the AuthService server 1406 may validate the received response message using the stored respective public key portion of the respective authentication token for the mobile device user 1408.

At step 1826, the AuthService server 1406 may, in response to validating the received response message, initiate the respective one remote service. In various embodiments, the AuthService server 1406 may initiate the respective one remote service by making the response information regarding the respective one remote service available to the corresponding challenge origin.

Method 1800 ends at step 1828.

Figure 23:
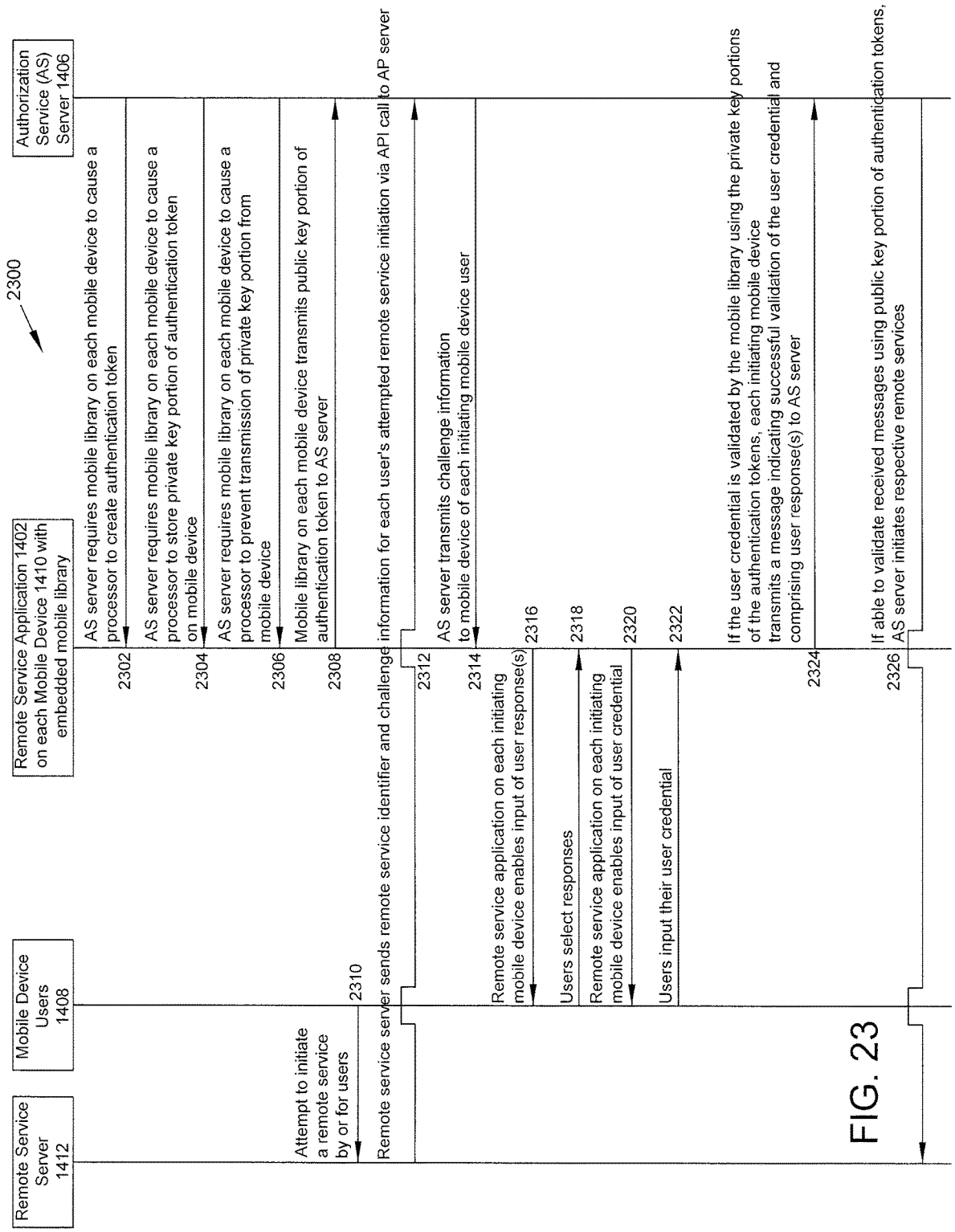
FIG. 23 is a flow chart illustrating a method of authorizing the respective initiation of a respective plurality of remote services provided by a remote service server by or for each of a plurality of mobile device users according to some embodiments.

FIG. 23 is a flow chart illustrating a method 2300 of authorizing the respective initiation of a respective plurality of remote services provided by a remote service server 1412 by or for each of a plurality of mobile device users 1408, according to some embodiments. The method 2300 begins at step 2302 where an AuthService server 1406 may require a respective mobile library on a respective mobile device 1410 of each of the mobile device users 1408 to create a respective authentication token. The mobile library includes AuthService code, and the AuthService code may be embedded within the remote service application 1402 on each mobile device 1410. The respective authentication token may be an asymmetric key pair, comprising a public key portion and a private key portion, as described above. The respective authentication token may be specific to a user credential of the mobile device user 1408 and to a mobile library residing on a mobile device 1410 of one or more devices of the mobile device user 1408.

In various embodiments, at step 2302, the AuthService server 1406 may require a mobile library on a mobile device 1410 to create an authentication token. In various embodiments, the AuthService server 1406 may require a mobile library on a mobile device 1410 to create a respective authentication token for each of a mobile device user's 1408 different user credentials (e.g., a first asymmetric key pair for a user-selected PIN and a second asymmetric key pair for the user's fingerprint). Each created authentication token may be configured to be used by the mobile device user 1408 to authorize each of a plurality of remote services.

At step 2304, the mobile library on the mobile device 1410 may cause a processor on the mobile device 1410 to store the respective private key portion of each created authentication token on the mobile device 1410. The respective private key portions may be stored in a memory of the mobile device 1410, as described above.

At step 2306, the mobile library on each respective mobile device 1410 may cause a processor on the mobile device 1410 to prevent transmission of the respective private key portion of the respective authentication token from the respective mobile device 1410, as described above, and only transmit the respective public key portion of the respective authentication token from the respective mobile device 1410 to the AuthService server 1406.

At step 2308, the mobile library on each respective mobile device 1410 may transmit only the respective public key portion of the respective authentication to the AuthService server 1406, as described above.

The mobile device 1410 may comprise a non-transitory machine readable (e.g., computer-readable) storage device encoded with program code that may be executed by a processor of the mobile device. The processor on the mobile device 1410 may execute one or more of the steps illustrated as performed on the mobile device 1410 in method 2300.

At step 2310, a respective action occurs which indicates the intent to initiate a respective one of a plurality of remote services by or for each respective mobile device user 1408.

At step 2312, a remote service server 1412 may send a respective identifier for the respective one remote service and respective challenge information to the AuthService server 1406 via a respective API call. The remote service server 1412 may comprise a plurality of challenge origins 1404. In various embodiments, each one of the plurality of challenge origins may provide a different one of the plurality of remote services.

At step 2314, in response to receiving each of the respective identifiers and respective challenge information, the AuthService server 1406 may transmit at least a portion of the respective challenge information to the respective mobile device 1410 of each of the initiating mobile device users 1408, where an initiating mobile device user is, for example, a person whose information or device (e.g., credit card information, billing information, third-party account information, third-party voice appliance) is being used in an attempt to initiate a remote service. The challenge information may include one or more user responses 2006. The one or more user responses 2006 may comprise a plurality of options.

At step 2316, the respective remote service application 1402 on the respective mobile device 1410 of each of the plurality of the initiating mobile device users 1408 may enable each of the plurality of the initiating mobile device users 1408 to select at least one of the one or more user responses 2006.

At step 2318, the plurality of initiating mobile device users 1408 may select at least one of the one or more user responses 2006.

At step 2320, the respective remote service application 1402 on the respective mobile device 1410 of each of the plurality of the initiating mobile device users may enable the input of a user credential 2102 from the mobile device user 1408, as described above.

At step 2322, the initiating mobile device users may input their respective user credential 2102. The respective mobile library may validate a received user credential 2102 using the respective stored private key portion of the respective authentication token for the respective initiating mobile device user 1408. In various embodiments, the respective mobile library may validate a received user credential 2102 by attempting to temporarily decrypt the respective encrypted private key portion of the respective authentication token stored on the respective mobile device 1410.

At step 2324, if the respective received user credential 2102 is validated by the respective mobile library using the respective private key portion of the respective authentication token, the respective mobile device 1410 of each of a plurality of the initiating mobile device users 1408 may transmit a respective response message including the received selected at least one response to the AuthService server 1406 as described above to enable initiation of the respective one remote service. At step 2324, the respective response message may also include information indicating successful validation of the respective received user credential 2102 such as, for example, the message being digitally signed with the respective private key portion of the respective authentication token. The message indicating successful validation of the user credential may also include information indicating that the mobile device user 1408 rejected access to the remote service if, for example, a thief or a hacker attempted to initiate a remote credit card purchasing service or a remote third-party voice appliance purchasing service, as described above.

At step 2326, if able to validate the plurality of received messages indicating successful validation of the respective received user credential 2102 and comprising the respective response information (e.g., using the respective public key portion of the respective authentication token), the AuthService 1406 may initiate the respective one remote service.

Figure 24:
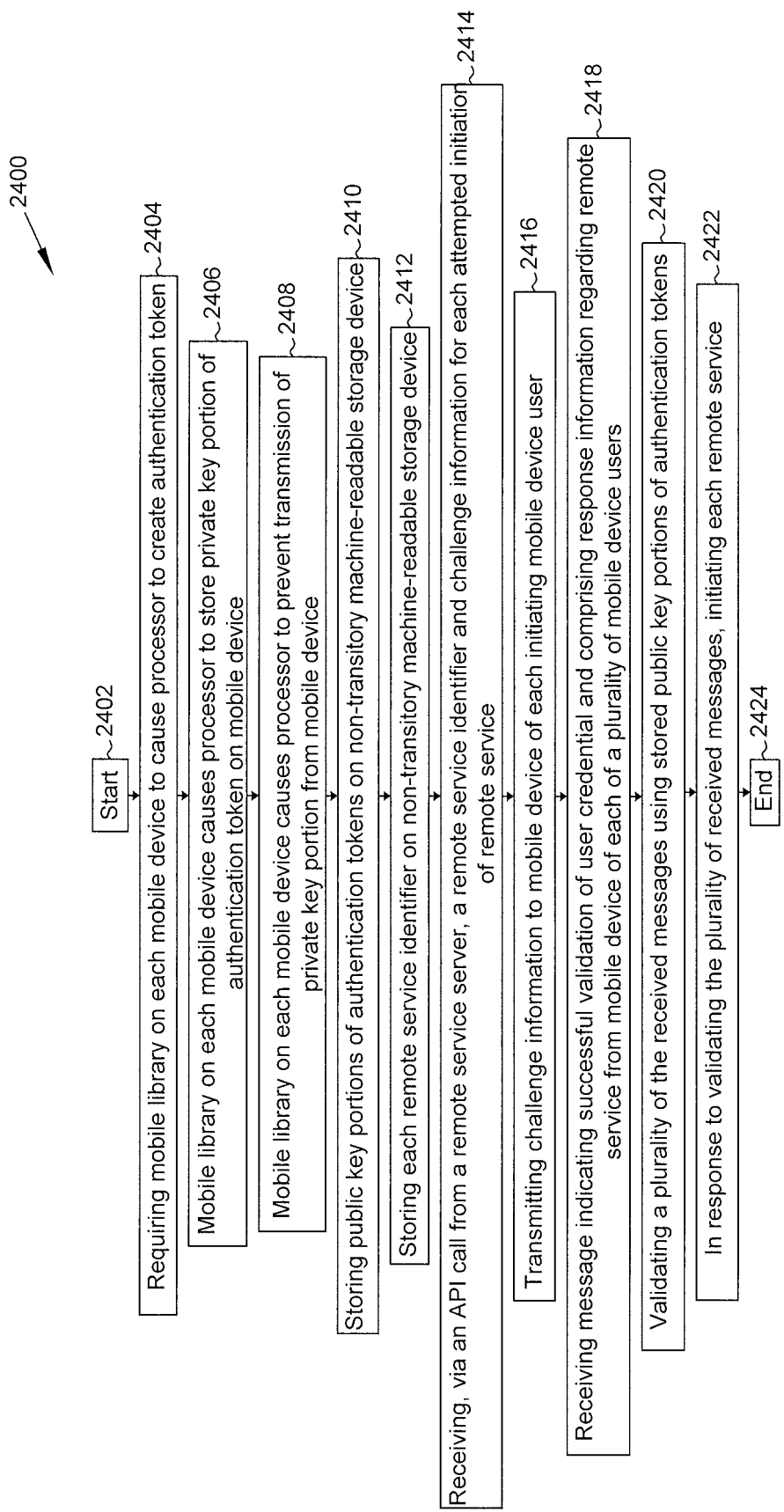
FIG. 24 is a flow chart from the perspective of an authorization service server illustrating a method of authorizing the respective initiation of a respective plurality of remote services provided by a remote service server by or for each of a plurality of mobile device users according to some embodiments.

FIG. 24 is a flow chart from the perspective of an authorization service server 1406 illustrating a method 2400 of authorizing the respective initiation of a respective plurality of remote services provided by a remote service server 1412 by or for each of a plurality of mobile device users 1408, according to some embodiments. The AuthService server 1406 may comprise a processor, a first non-transitory machine-readable (e.g., computer-readable) storage device, and a second non-transitory machine-readable (e.g., computer-readable) storage device. The first non-transitory machine-readable storage device may be configured to store data, enabling it to perform steps 2410 and 2412 of method 2400. The second non-transitory machine-readable storage device may be encoded with program code executable by the processor for performing steps 2404 through 2408 and 2414 through 2422 of method 2400. Method 2400 begins at step 2402.

At step 2404, the AuthService server 1406 may require the respective mobile library residing on the mobile device 1410 of each of the mobile device users 1408 to create a respective authentication token (e.g., asymmetric key pair with public key portion and private key portion).

At step 2406, the mobile library residing on the mobile device 1410 of each of the mobile device users 1408 may cause a processor on the mobile device 1410 to store a respective private key portion of the respective authentication token on the mobile device 1410, as described above.

At step 2408, the mobile library residing on the mobile device 1410 of each of the mobile device users 1408 may cause a processor on the mobile device 1410 to prevent transmission of the respective private key portion of the respective authentication token from the respective mobile device 1410, as described above, and only transmit the respective public key portion of the respective authentication token from the respective mobile device 1410 to the AuthService server 1406.

At step 2410, the AuthService server 1406 may, for each of the plurality of mobile device users 1408, store the respective public key portion of each respective authentication token on the first non-transitory machine-readable storage device, as described above.

At step 2412, the AuthService server 1406 may store a respective remote service identifier for each one of the respective plurality of remote services on the first non-transitory machine-readable storage device, as described above.

Steps 2414 through 2424 may be executable for each of a plurality of actions to initiate a respective one remote service of the respective plurality of remote services by or for a respective mobile device user 1408.

At step 2414, the AuthService server 1406 may receive, via a respective API call from a remote service server 1412, a respective identifier for the respective one remote service and respective challenge information.

At step 2416, the AuthService server 1406 may, in response to receiving each of the respective identifiers and respective challenge information, transmit the respective challenge information to the respective mobile device of each of the initiating mobile device users 1408, as described above.

At step 2418, the AuthService server 1406 may receive, from the respective mobile device 1410 of each of a plurality of the initiating mobile device users 1408, a respective response message including respective response information regarding the respective one remote service and information (e.g., a digital signature using the respective private key portion of the respective authentication token) indicating that the respective mobile library residing on the respective mobile device 1410 validated the respective received user credential 2102, as described above. The respective response information may indicate a selection of one or more of a plurality of options. Exemplary options are illustrated in FIG. 20.

At step 2420, the AuthService server 1406 may validate a plurality of the received response messages using the respective stored public key portion of the respective authentication token for each of the plurality of the initiating mobile device users 1408, as described above.

At step 2422, in response to validating the plurality of received response messages, the AuthService server 1406 may initiate the respective one remote service. The second non-transitory machine-readable storage device may be further encoded with program code executable by the processor for initiating at least one of the respective one remote services by various methods described above.

The method 2400 ends at step 2424.

Figure 25:
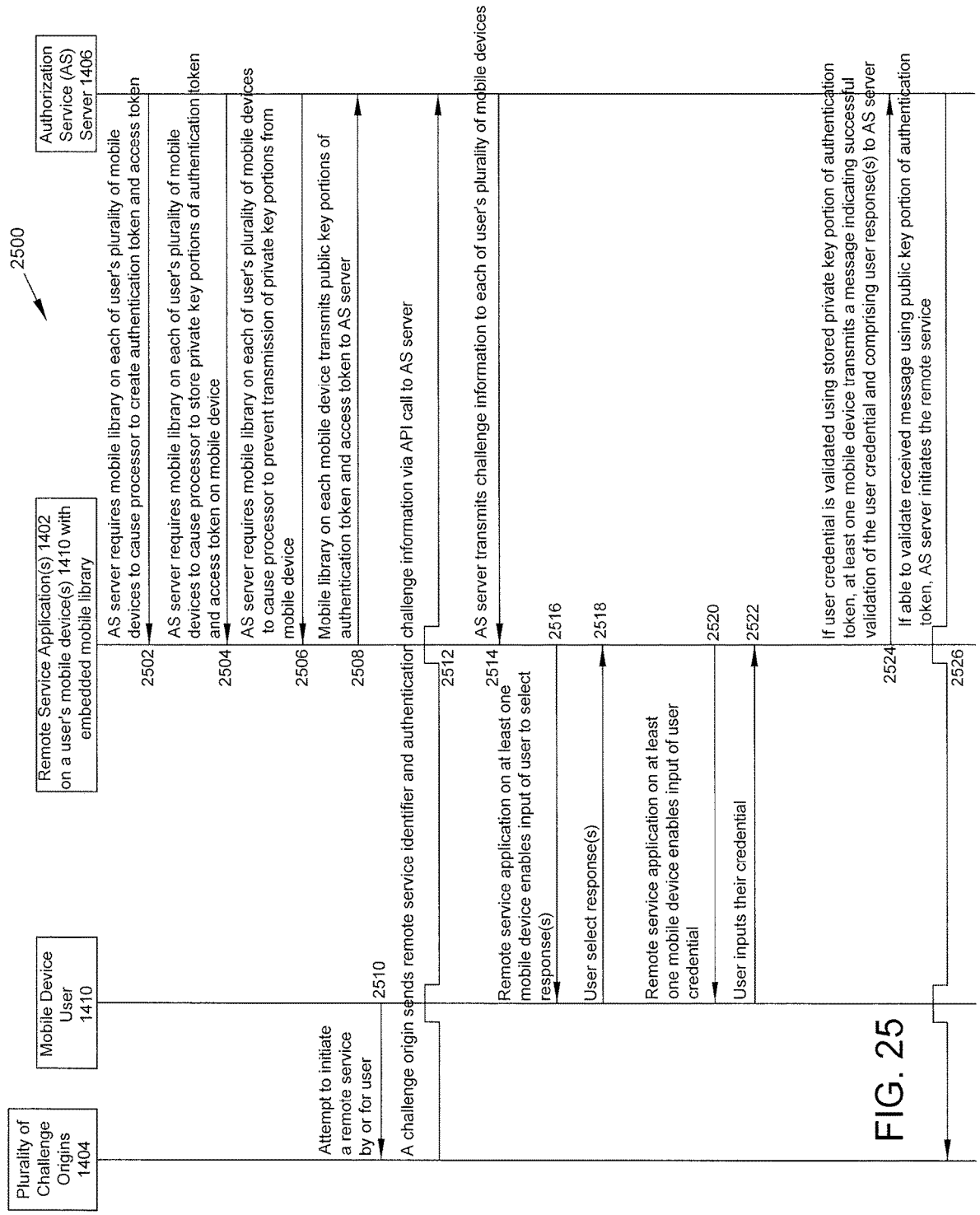
FIG. 25 is a flow chart illustrating a method of authorizing the respective initiation of a respective plurality of remote services provided by a plurality of challenge origins by or for a mobile device user according to some embodiments.

FIG. 25 is a flow chart illustrating a method 2500 of authorizing the respective initiation of a respective plurality of remote services provided by a plurality of challenge origins 1404 by or for a mobile device user 1408, according to some embodiments. The method 2500 begins at step 2502 where an AuthService server 1406 may require a mobile library residing on each of a plurality of mobile devices 1410 of a mobile device user 1408 to cause a respective processor on each of the plurality of mobile devices 1410 to create a respective authentication token and a respective access token.

At step 2504, the mobile library residing on each of a plurality of mobile devices 1410 of a mobile device user 1408 may cause a respective processor on each of the plurality of mobile devices 1410 to store a private key portion of the authentication token and a private key portion of the access token on the respective mobile device 1410.

At step 2506, the mobile library residing on each of a plurality of mobile devices 1410 of a mobile device user 1408 may cause a respective processor on each of the plurality of mobile devices 1410 to prevent transmission of the private key portion of the authentication token (and the private key portion of the access token) from the respective mobile device 1410, as described above, and only transmit the public key portion of the respective authentication token (and only the public key portion of the access token) from the respective mobile device 1410 to the AuthService server 1406.

At step 2508, the mobile library on each respective mobile device 1410 may transmit only the respective public key portion of the authentication token (and only the respective public key portion of the access token) to the AuthService server 1406 via an API call. The mobile device 1410 may comprise a non-transitory machine-readable (e.g., computer-readable) storage device encoded with program code that may be executed by a processor of the mobile device. The processor on the mobile device 1410 may execute one or more of the steps illustrated as being performed on the mobile device 1410 in method 2500.

At step 2510, a respective action occurs which indicates the intent to initiate one remote service of a plurality of remote services by or for the user, as described above.

At step 2512, a respective one of a plurality of challenge origins 1404 may send, via an API call to the AuthService server 1406, the respective identifier for the respective one remote service and respective challenge information. The plurality of challenge origins 1404 may include the non-limiting examples described above.

At step 2514, in response to receiving the respective identifier and respective authentication challenge information, the AuthService server 1406 may transmit at least a portion of the respective challenge information to each of the plurality of mobile devices 1410 of the mobile device user 1408. A first portion of the challenge information may comprise notification information. The notification information may include a notification title 1902 and a notification body 1904 as illustrated in FIG. 19. The first portion of the challenge information may include information indicative of an action to initiate the one remote service. The first portion of the challenge information may include a reference to a challenge message body that the remote service application 1402 (on at least one mobile device 1410 of the user) may use in creating a request message requesting a second portion of the challenge information (including the challenge message body 2004) that the at least one mobile device 1410 transmits to the AuthService server 1406. In various embodiments, the mobile library (e.g., AuthService code embedded in the remote service application 1402) on the at least one mobile device 1410 may sign the request message using the private key portion of the access token stored on the at least one mobile device 1410. The second portion of the challenge information may comprise one or more of a challenge message body 2004, a time to live 2008, and one or more user responses 2006. The one or more user responses 2006 may comprise a plurality of options. An exemplary challenge 2002 with exemplary challenge information displayed within the remote service application 1402 running on at least one mobile device 1410 is illustrated in FIG. 20.

At step 2516, the remote service application 1402 on the at least one mobile device 1410 may enable the user to select at least one of the one or more user responses 2006.

At step 2518, the user may select one or more responses 2006.

At step 2520, the remote service application 1402 on at least one mobile device 1410 may enable the input of a user credential 2102 from the mobile device user 1408. The user credential 2102 may, for example, be one of a user PIN or biometric.

At step 2522, the user may input their user credential 2102.

At step 2524, if the user credential 2102 is validated using the private key portion of the authentication token (stored on the at least one mobile device 1410), the at least one mobile device 1410 of the mobile device user 1408 may transmit a response message including the response information regarding the one remote service (e.g., information indicating the user selection of one or more responses 2006 (2518) to the AuthService server 1406). In various embodiments, the response message may be digitally signed using the private key portion of the authentication token (stored on the at least one mobile device 1410).

At step 2526, if the AuthService server 1406 is able to validate the received response message from the at least one mobile device 1410 using the stored public portion of the authentication token, the AuthService server 1406 may initiate the one remote service.

Figure 26:
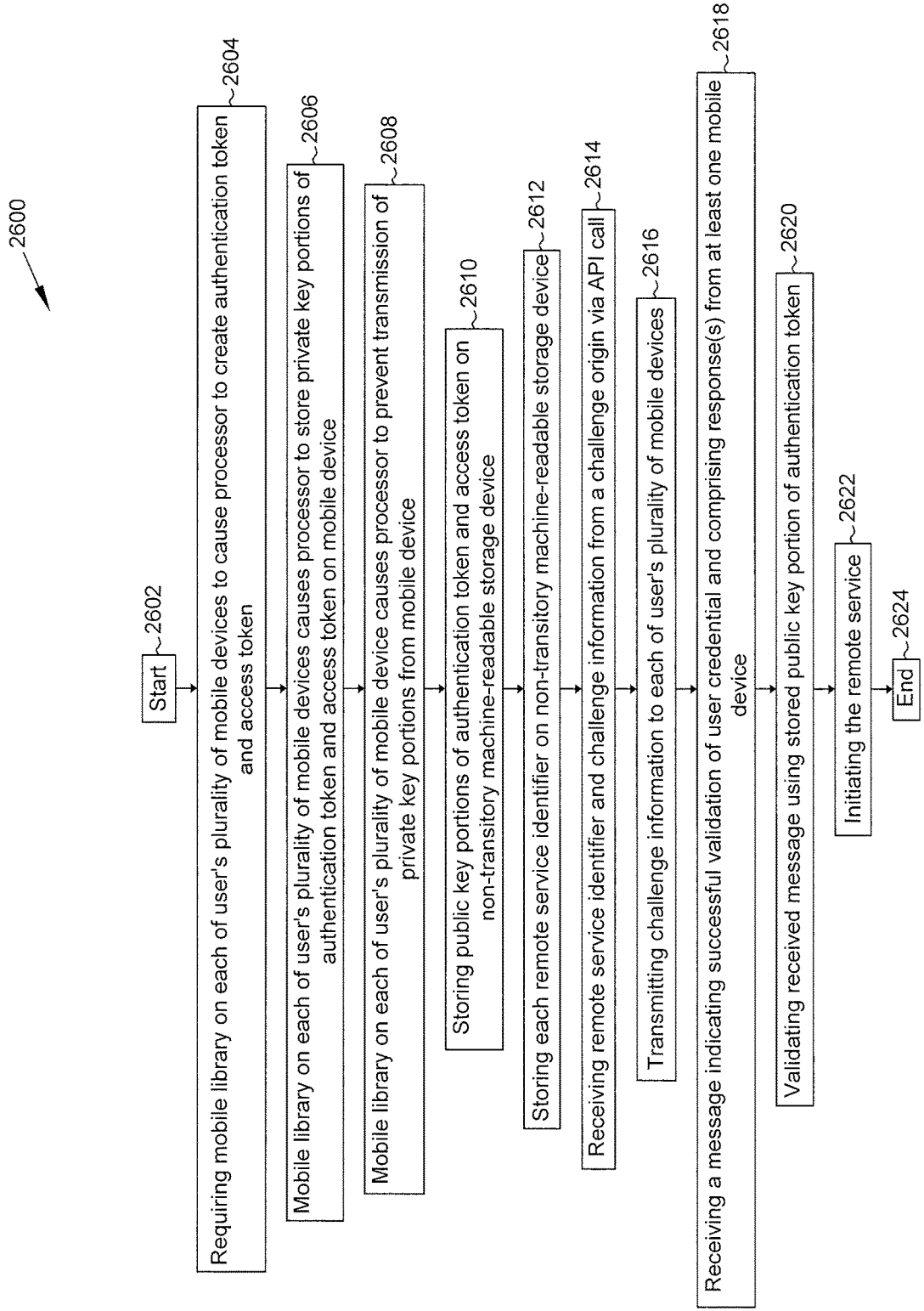
FIG. 26 is a flow chart from the perspective of an authorization service server illustrating a method of authorizing the respective initiation of a respective plurality of remote services provided by a plurality of challenge origins by or for a mobile device user according to some embodiments.

FIG. 26 is a flow chart from the perspective of an AuthService server 1406 illustrating a method 2600 of authorizing the respective initiation of a respective plurality of remote services provided by a plurality of challenge origins 1404 by or for a mobile device user 1408, according to some embodiments. The AuthService server 1406 may comprise a processor, a first non-transitory machine-readable (e.g., computer-readable) storage device, and a second non-transitory machine-readable (e.g., computer-readable) storage device. The first non-transitory machine-readable storage device may be configured to store data. The stored data may include a public key portion of an authentication token for a mobile device user 1408, and a public key portion of an access token for a mobile device 1410 for the mobile device user 1408, as described above. The stored data may further include, for each one of the plurality of remote services, a respective identifier received from a respective challenge origin 1404 of a plurality of challenge origins 1404 during registration, as described above. The second non-transitory machine-readable storage device may be encoded with program code executable by the processor for performing method 2600.

In various embodiments, the stored data on the first non-transitory machine-readable storage device may further comprise, for the mobile device user 1408, a plurality of public key portions of a plurality of authentication tokens and a plurality of public key portions of a plurality of access tokens. Each of the plurality of authentication tokens may be specific to a user credential 2102 of the mobile device user 1408 and to a mobile library residing on a respective one of the plurality of mobile devices of the mobile device user 1408. Each of the plurality of access tokens may be specific to a respective one of the plurality of mobile devices of the mobile device user 1408. Each of the plurality of authentication tokens may be configured to be used by the mobile device user 1408 to authorize each of the plurality of remote services.

Method 2600 begins at step 2602. At step 2604, the AuthService server 1406 may require the mobile library residing on each of a plurality of mobile devices 1410 of a mobile device user 1408 to cause a respective processor on each of the plurality of mobile devices 1410 to create a respective authentication token and a respective access token.

At step 2606, the mobile library residing on each of the plurality of mobile devices 1410 of the mobile device user 1408 may cause a respective processor on each of the plurality of mobile devices 1410 to store a private key portion of the authentication token and a private key portion of the access token on the respective mobile device 1410.

At step 2608, the mobile library residing on each of the plurality of mobile devices 1410 of the mobile device user 1408 may cause a respective processor on each of the plurality of mobile devices 1410 to prevent transmission of the respective private key portion of the authentication token and the respective private key portion of the access token from the respective mobile device 1410, as described above, and only transmit the respective public key portions of the respective authentication token and respective access token from the respective mobile device 1410 to the AuthService server 1406.

At step 2610, the AuthService server 1406 may, for a mobile device user 1408, store the respective public key portion of the authentication token, and the respective public key portion of the access token, received from each of the plurality of mobile devices 1410 of the mobile device user 1408, on the first non-transitory machine-readable storage device, as described above.

At step 2612, the AuthService server 1406 may, for each one of the plurality of remote services, store a respective remote service identifier received from a respective challenge origin 1404 of a plurality of challenge origins 1404 on the first non-transitory machine-readable storage device. In various embodiments, the AuthService server 1406 may require the challenge origins 1404 or remote services to register with the AuthService in order for the AuthService server 1406 to broker initiation and usage of remote services provided by the challenge origins 1404 by or for the mobile device user 1408, as described above.

Steps 2614 through 2622 may be executable for each of a plurality of actions to initiate a respective one remote service of the plurality of remote services by the mobile device user 1408. At step 2614, the AuthService server 1406 may receive, via an API call from a respective one of the plurality of challenge origins 1404, the respective identifier for the respective one remote service and respective challenge information.

At step 2616, the AuthService server 1406 may, in response to receiving the respective identifier and respective challenge information, transmit a first portion of the respective challenge information to each of the plurality of mobile devices 1410 of the mobile device user 1408.

At step 2618, the AuthService server 1406 may receive, from at least one mobile device 1410, a response message including user response(s) related to the respective one remote service. In various embodiments, the response message includes information indicating that the mobile library residing on the at least one mobile device 1410 successfully validated a received user credential 2102 using the stored private key portion of the authentication token for the mobile device user 1408. Prior to performance of this step, the AuthService server 1406 may receive, from at least one mobile device 1410 of the mobile device user 1408, a request message requesting a second portion of the challenge information that is signed by the private key portion of the access token for the at least one mobile device 1410 as described above. If the AuthService server 1406 is able to validate the request message using the stored public key portion of the access token for the at least one mobile device 1410, the AuthService server 1406 may transmit the second portion of the challenge information to the at least one mobile device 1410 as described above.

At step 2620, the AuthService server 1406 may validate the received response message from the at least one mobile device 1410 using the stored public key portion of the authentication token for the mobile device user 1408.

At step 2622, the AuthService server 1406 may, in response to validating the received response message from the at least one mobile device, initiate the respective one remote service.

Method 2600 ends at step 2624.

In various embodiments, once the mobile device user 1408 has responded to a challenge 2002, the user's particular response information is digitally signed using the private key of the authentication token and, once the digital signature is validated by the AuthService server 1406 using the public key of the authentication token, the user's particular response information may be provided to the remote service server 1412. To ensure a frictionless but secure user experience, challenges 2102 may be configured to require a user to assert a user credential 2102, which may be a user's biometric or a PIN, as a second factor of assurance. An exemplary embodiment is illustrated in FIG. 21.

As illustrated in FIG. 14, in some embodiments, the AuthService server 1406 in system 1400 is comprised of a NodeJS application stack, which comprises an AuthService 1414 and an ephemeral admin service 1416. In various embodiments, the AuthService server 1406 is a cloud service as described above. The AuthService server 1406 may comprise a database 1418 (e.g. mySQL database) and a configurable notification service 1420 (e.g., service using Firebase notifications). The AuthService server 1406 may further comprise a security service 1422, a back-end authentication service 1424, and a database service 1426. The back-end authentication service 1424 may handle the registration and authorization of challenge origin information from challenge origins 1404 and remote service servers 1412 via AuthService 1414. In various embodiments, the back-end authentication service 1424, via AuthService 1414, may require the remote service servers 1412 and/or challenge origins 1404 to provide respective registration information such as, for example, one or more respective remote service identifiers, one or more challenge origin identifiers, one or more respective callback URLs for a respective remote service, etc., as similarly described above for Relying Party (RP) and Internet service registration information. In various embodiments, via AuthService 1414, a POST may be performed with an appropriate string of data, e.g., JSON data. In various embodiments, the back-end authentication service 1424 may generate a respective unique identifier for each challenge origin, remote service, and/or remote service server as similarly described above for RP and Internet service identifiers, transmit such identifiers to remote service servers 1412 and/or challenge origins 1404 via AuthService 1414, and utilize such identifiers to identify and validate respective identifiers received via AuthService 1414.

In response to actions to initiate a respective remote service by a mobile device user, the corresponding challenge origin of challenge origins 1404 may interact with the AuthService server 1406 by accessing the AuthService 1414. The AuthService server 1406 may interact with iOS and Android mobile libraries embedded within remote service applications 1402 (further detailed in FIGS. 15 and 17) or mobile libraries embedded within AuthService provided white-labeled applications. Mobile libraries may be embedded within remote service applications 1402 on mobile devices 1410 and may comprise AuthService computer-readable program code.

AuthService Examples

In various embodiments, the AuthService 1414 of the AuthService server 1406 is a server-deployed, secure API that acts as the broker between challenge origins 1404 and mobile libraries (e.g., AuthService code embedded within remote service applications 1402) installed on one or more mobile devices 1410 of mobile device users 1408. The primary functions of the AuthService 1414 include: (1) governing the binding of mobile device user 1408 accounts to AuthService server 1406; (2) receiving "generate request POST" requests from challenge origins 1404; (3) sending challenge information to AuthService code embedded within remote service applications 1402 installed on registered mobile devices 1410; (4) responding to GET queries for mobile device user 1408 via AuthService code embedded within remote service applications 1402 installed on mobile devices 1410 registered for mobile device user 1408; (5) processing "process request POST" requests from mobile libraries on mobile devices 1410; (6) responding to challenge origins 1404 configured callbacks following initiation of respective remote services.

The AuthService 1414 of the AuthService server 1406 may support multiple app spaces. An app space may be defined by a deployed remote service app and AuthService code embedded within such app. In some embodiments, for example, if a remote service provider wanted to support distinct remote service apps for their customer facing solutions and their employees' self-service applications, they may configure two different app spaces with AuthService code. Each app space may include a minimal user model, and each user may have multiple mobile devices 1410 registered with the AuthService 1414. One or more challenge origins 1404 are configured within each app space. The registration information (e.g. identifiers) issued by, or sent to, the back-end authentication service 1424 for these challenge origins 1404 limit them to interacting with, via the AuthService, mobile device users and mobile devices of such users that have been bound to an account within the app space during, for example, a registration process.

In various embodiments, with regard to access control of the AuthService 1414, all AuthService endpoints (e.g., AuthService code instances embedded within remote service app instances) are authenticated by one or more of the following protocols: basic header authentication, HMAC authentication, session token authentication, and JSON web token authentication.

In various embodiments, the admin service 1416 is comprised of admin logic 1428 and an admin console 1430 and monitored by an admin user 1438. The AuthService 1414 may be extended with the admin console 1430, whose access may be restricted to local access or pre-defined ports. In various embodiments, the admin console's 1430 primary functions include: (1) managing access credentials (e.g. administrator credentials, registration information) for challenge origins 1404; (2) managing allowable callback URIs; and (3) managing credentials for the communication service 1436. In various embodiments, the admin console 1430 may be a separate Express.js server, designed to be accessed from a restricted, non-standard port. To further protect access, the admin console 1430 may automatically terminate. Admin console 1430 credentials may be generated via a command line interface.

Input Validation Example

In various embodiments, all AuthService server 1406 API calls require authentication. The AuthService 1414 APIs are defined to expect structured content. The AuthService API layer 1432 validates that API calls conform to this expected structure prior to calling AuthService logic 1434. If a call does not conform, the AuthService server 1406 responds with a 400 error (e.g., to the AuthService code embedded within a remote service application 1402 running on a mobile device 1410, to a challenge origin 1404, etc.).

Although some API fields could legitimately include hazardous characters (for example, request content), in various embodiments, the AuthService server 1406 may protect against SQL injection and other potentially hazardous characters by ensuring this content is a properly escaped and typed string that is never processed.

AuthService Example Cryptographic Practices

As a function of security service 1422, the customer authentication and authorization system 1400 may provide a set of tools used to ensure the non-repudiation and integrity of a mobile device user's 1408 responses, via API calls between the AuthService code embedded within a remote service application 1402 running on a mobile device 1410 and the AuthService 1414, to challenges 2102. For example, security service 1422 may include symmetric cryptography capabilities to secure sessions and asymmetric cryptography to authorize responses and authenticate activities.

In various embodiments, as discussed above, only the public key portion of an authentication token (e.g. asymmetric key pair), and only the public key portion of an access (e.g. asymmetric key pair), generated on a mobile device 1410 is transported to the AuthService 1414 over a secure channel (e.g., TLS). In various embodiments, public key portions of authentication tokens and access tokens may be signed, at AuthService server 1406, with a separate server-based key-pair (configured during AuthService server 1406 deployment) to ensure the integrity of the public key portions at rest.

In some embodiments, HMAC authentication tokens are generated securely on the security service 1422 of AuthService server 1406 and encrypted at rest using a cryptographically secure algorithm (e.g., AES-256). Basic header authentication passwords may be hashed using SHA-512 and a salt. The master secret for encryption at rest may be defined for a AuthService server 1406—remote service application 1402 (with embedded AuthService code) session and set as an environment variable.

Error Handling and Logging Examples

In some embodiments, API endpoints (e.g., remote service applications 1402 (with embedded AuthService code), challenge origins 1404) may conform to standard HTTP error handling. In various embodiments, the AuthService 1414 will respond with a 404-error code for invalid endpoints and a 400-error code for improperly formed requests. In various embodiments, AuthService 1414 (and/or AuthService code embedded within remote service application 1402) may respond to unauthorized requests (e.g., requests respond with a 401-error code).

In some embodiments, the AuthService 1414 logging level may be configured by an environment variable. In various embodiments, log format may conform to standard syslog structures and may include timestamps, involved function, and error event information. In various embodiments, logs do not include specific or sensitive event-level detail. In various embodiments, admin service 1416 of the AuthService server 1406 may be configured to log a selected portion of events received or all events.

Data Protection Example

In some embodiments, AuthService API 1432 endpoints (e.g., remote service applications 1402 (with embedded AuthService code), challenge origins 1404) are restricted to the proper type of requestor (e.g., challenge origins 1404 can only access relevant endpoints and are restricted from accessing endpoints leveraged by the mobile libraries). In various embodiments, the AuthService code may be protected using industry-standard code obfuscation and tamper-resistance tools.

Configuration Example

In some embodiments, the AuthService server 1406 configuration variables are defined in environment variables (e.g., for sensitive values) or in a configuration file.

Challenge Origins Example

In various embodiments, challenge origins 1404 may provide the connected remote service applications 1402 that will interact with the AuthService server 1406 to send authorization and authentication requests as challenge information to mobile devices 1410 of users 1408 as described above. In various embodiments, app spaces may be configured to have multiple challenge origins 1404. In various embodiments, challenge origins 1404 may use Basic Header Authentication or HMAC (hash-based message authentication code) authentication.

Mobile Libraries Examples

In various embodiments, mobile libraries may be designed to extend the functionality of existing remote service applications 1402 with advanced authorization and authentication capabilities. In some embodiments, these mobile libraries may be iOS® (Swift) or Android® (Java) libraries. In various embodiments, securing the remote service application 1402, and by extension the use of the mobile libraries, may be a shared responsibility between the developers of the AuthService code and the developers leveraging the mobile libraries.

In various embodiments, the functions of the mobile libraries may include: (1) generation and maintenance of the authentication tokens (e.g., asymmetric key pairs) and of the access tokens (e.g., asymmetric key pairs), and (2) interaction with the AuthService 1414 of the AuthService server 1406. In various embodiments, these interactions with the AuthService 1414 may include: (1) processing challenge information responses, (2) getting requests and request details, and (3) managing mobile device details. In some embodiments, remote service application developers may implement handlers for AuthService originated notifications.

Account Binding Examples

Account Binding is the process that governs the AuthService 1406 enablement of a mobile device 1410 of a mobile device user 1408. This binding is protected by a series of controls.

Assuming the remote service app 1402 has an authenticated TLS session, the remote service server 1412 may initiate the bind process with the AuthService server 1406. In various embodiments, this bind process initiation precludes rogue implementation of the mobile library from attempting to bind to a deployed AuthService 1414. In various embodiments, a remote service server 1412 makes an authenticated bind account call to the AuthService 1414 on the AuthService server 1406, providing a unique remote service user account ID for each remote service provided by a challenge origin 1404. In various embodiments, remote service server 1412 may provide a unique challenge origin account ID for each challenge origin 1404. The AuthService server 1406 returns a response containing a single-use session token and an AuthService ID to the remote service server 1412. The AuthService 1414 may generate a new account and AuthService ID if the external ID received from the remote service server 1412 is new. If the external ID received from the remote service server 1412 already exists, the AuthService server 1406 may return an existing AuthService ID. The remote service server 1412 may send response parameters to the remote service application 1402. In various embodiments, the remote service server 1412 send response parameters to the remote service application 1402 via an API call. The remote service application 1402 may implement an interface to add the mobile device 1410 (and store a mobile device identifier in a database at the AuthService), where the interface on the remote service application 1402 prompts the input of a passphrase. The passphrase prompt may require the input of a user credential 2102 (e.g., a PIN or biometric) by a mobile device user 1408 via the remote service application 1402 residing on the mobile device 1410, as described above.

The remote service application 1402 may call a function that enables mobile libraries on the mobile device 1410, where the call includes the passphrase (e.g., user credential 2102), AuthService ID, notification framework name, notification ID, mobile device 1410 name (which may be derived or user-articulated), and single-use session token. The single-use session token may be used to validate that the bind call from the mobile device 1410 to the AuthService 1414 is authorized. Without the single-use session token or equivalent security feature, the AuthService 1414 would not know if it should trust the call from the remote service application 1402.

The mobile library generates key material including an access token (e.g., asymmetric key pair) and an authentication token (e.g., asymmetric key pair). The mobile library calls the AuthService API 1432 to add the mobile device 1410 with, for example, the passphrase (e.g., user credential 2102), AuthService ID, notification framework name, notification ID, device name, single-use session token, access token, and authentication token. As described above, the mobile device 1410 does not transmit the entirety of a mobile library-generated access token nor does it transmit the entirety of a mobile library-generated authentication token. Rather, as described above, the mobile device 1410 only transmits the public key portion of the mobile library-generated access token, and only transmits the public key portion of the mobile library-generated authentication token, to the AuthService server 1406. And, as described above, the mobile device 1410 is prevented from transmitting the private key portion of the mobile library-generated access token, and from transmitting the private key portion of the mobile library-generated authentication token. The AuthService 1414 registers the new mobile device 1410. The AuthService server 1406 responds with a 201 response code. If there is no response or an error, the device 1410 is not added.

The public key portion (stored at AuthService (e.g., database 1418)) and private key portion (stored on mobile device 1410) of the access token generated during account binding may be respectively used by the AuthService and the mobile device 1410 to authenticate all calls between the remote service app 1402 on the registered mobile device 1410 and the AuthService 1414. For example, as described above, messages including challenge information, and related requests and responses, exchanged between the remote service app 1402 and the AuthService 1414 may be digitally signed by the respective public key portion or private key portion of the access token with the other key portion being subsequently used to validate the digital signature of a received, signed message. Unlike the authentication token, the access token is not specific to a user credential (e.g., PIN, biometric) of the mobile device user 1408. As described above, the respective key portions of the access token are accessed and used by the mobile library and remote service application 1402 (private key portion) and by the AuthService 1414 (public key portion) when the mobile device user 1408 is responding to challenges from challenge origins 1404.

Mobile Library Example Cryptographic Practices

A key function of the mobile library is the generation of authentication tokens (e.g., asymmetric key-pairs) and access tokens (e.g., asymmetric key-pairs), and maintenance and use of private key portions of such tokens. During account binding, the mobile library generates an authentication token and access token that each may be leveraged in subsequent interactions between the mobile library (e.g., AuthService code embedded with the remote service application 1402) and the AuthService 1414. In some embodiments, in iOS®, the authentication token and/or the access token may be a RSA-2048 key pair generated by the framework's keychain in a remote service app-specific context and accessed using standard iOS protocols. In some embodiments, in Android, the authentication token and/or the access token may be generated by the Android framework in the mobile device's (e.g., 1410) secure element. These authentication tokens and/or access tokens may each be rotated at a predetermined periodicity (e.g., after a predetermined number of authentications, after the expiration of a predetermined period of time, after the expiration of a predetermined amount of time from the last authentication, every use, etc.) based on a configuration value in the AuthService 1414 and/or a configuration value in the AuthService code.

In various embodiments, a remote service application 1402 may have a different authentication token for different user credentials such as, for example, one leveraged for biometric-based activities and the other used for PIN-based activities. In iOS®, this authentication token may be generated by the framework's keychain in a remote service app-specific context and accessed using standard iOS protocols. In Android®, this authentication token may be generated by the Android framework in the device's secure element. These authentication tokens may be rotated at a predetermined periodicity (e.g., after a predetermined number of authentications, after the expiration of a predetermined period of time, after the expiration of a predetermined amount of time from the last authentication, every use, etc.) based on a configuration value in the AuthService 1414 and/or a configuration value in the AuthService code.

Mobile Library Error Handling and Logging Example

In various embodiments, function calls return both success and error responses. In various embodiments, mobile libraries may not be designed to output logs independent of the remote service application's 1402 logging capabilities. In some embodiments, remote service app developers may log AuthService 1414 responses to mobile library function calls as needed.

Mobile Library Data Protection Example

In various embodiments, data requirements for the mobile libraries may be limited to key material discussed above with regard to cryptographic practices and device-specific metadata, including, for example, a hash of the user credential (e.g., PIN, biometric), account identifying information (e.g., AuthService ID, mobile device GUID, notification ID), key references, and mobile device status. In various embodiments, access to this material may be limited.

Mobile Library Communication Security Example

In some embodiments, the AuthService 1414 of the AuthService server 1406 may use SSL or TLS for protecting connections to challenge origins 1404 and/or the mobile libraries.

Mobile Library Configuration Example

In some embodiments, mobile library configuration values may be limited to: (1) the URL of the AuthService 1414 and (2) network related timeouts. In various embodiments, these values may be configured in the frameworks respective codebase and may be compiled prior to deployment.

Remote Service Mobile Application Example

In some embodiments, and as described above, the AuthService may provide a white-labeled auth application as the remote service application 1402 (with embedded AuthService code) for remote service providers interested in deploying the authorization services but that do not have an existing mobile application framework. In some embodiments, the white-labeled auth application may leverage similar design principals of the mobile libraries. In some embodiments, the white-labeled auth application may be a fully formed application with interfaces for viewing and acting on challenges, managing devices, and may be customized, per deployment, to manage account linking and binding.

In some embodiments, one or more steps of the methods described herein can be implemented by a computer processor programmed in accordance with the principals discussed herein. Digital computer systems programmed to perform particular functions pursuant to instructions from program code that implements features of the methods described herein are special-purpose computers particular to the methods described herein. When the programs are to be run, they will be loaded either from their distribution medium or their intermediate storage medium into the execution memory of the computer, configuring the computer to act in accordance with the method of this invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that certain of the described program components and systems can generally be integrated together in a single software product being executed in one or more networks or packaged into multiple software products for execution in the one or more networks.

It is understood by those familiar with the art that the methods described herein may be implemented in hardware, firmware, or software encoded on a non-transitory computer-readable storage medium.

The systems and processes are not limited to the specific embodiments described herein. In addition, components of each system and each process can be practiced independent and separate from other components and processes described herein.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

What we claim is:

1. A system for authorizing the respective initiation of a respective plurality of remote services by or for each of a plurality of mobile device users, comprising:
   a processor at an authorization service;
   a first non-transitory machine-readable storage device of the authorization service, wherein the first non-transitory machine-readable storage device is configured to store data, and wherein the stored data comprises:
      for each of the plurality of mobile device users, a respective public key portion of a respective authentication token created by a mobile device of one or more devices of the mobile device user, wherein the respective authentication token is specific to a user credential of the mobile device user and to authorization service computer readable program code residing on the mobile device of the mobile device user, and wherein the respective authentication token is configured to be used by the mobile device user to authorize each of a plurality of remote services;
      for each one of the respective plurality of remote services, a respective identifier;
   a second non-transitory machine-readable storage device of the authorization service, wherein the second non-transitory machine-readable storage device is encoded with program code executable by the processor for:
      receiving, from the respective authorization service code residing on the respective mobile device of each of the mobile device users, only the respective public key portion of the respective authentication token created by the respective mobile device;
      for each action to initiate a respective one remote service of the respective plurality of remote services by or for a respective mobile device user:
         receiving, via a respective application programming interface (API) call from a remote service server, a respective identifier for the respective one remote service and respective challenge information;
         in response to receiving each of the respective identifiers and respective challenge information, transmitting at least a portion of the respective challenge information to the respective mobile device of each of the mobile device users;
         receiving, from the respective mobile device of each of a plurality of the mobile device users, a respective one or more messages, at least one of each of the respective one or more messages indicating successful validation of a respective received user credential by a respective stored private key portion of the respective authentication token for the respective mobile device user;
         validating a plurality of the received respective at least one messages using the respective stored public key portion of the respective authentication token for each of the plurality of the mobile device users; and
         in response to validating the plurality of the received respective at least one message, initiating the respective one remote service.

2. The system of claim 1, wherein the user credential is at least one of a user PIN or biometric.

3. The system of claim 1, wherein the remote service server comprises a plurality of challenge origins and wherein each one of the plurality of challenge origins provides a different one of the plurality of remote services.

4. The system of claim 1,
   wherein the second non-transitory machine-readable storage device is further encoded with program code executable by the processor for receiving, from the respective authorization service code residing on the respective mobile device of each of the mobile device users, only a respective public key portion of a respective access token created by the respective mobile device, wherein the respective access token is specific to the mobile device and to the authorization service computer readable program code residing on the mobile device; and
   wherein the stored data of the first non-transitory machine-readable storage device of the authorization service further comprises, for each of the plurality of mobile device users, the respective received public key portion of the respective access token.

5. The system of claim 4, wherein at least another one of each of the respective one or more messages is a respective request message requesting another portion of the respective challenge information, wherein each respective request message is signed by a respective private key portion of the respective access token created by the respective mobile device of each of the plurality of the mobile device users; and wherein the second non-transitory machine-readable storage device is further encoded with program code executable by the processor for:
   validating a plurality of the received respective request messages using the respective stored public key portion of the respective access token for the respective mobile devices of each of the plurality of the mobile device users; and
   in response to validating the plurality of the received respective request messages, transmitting the requested another portion of the respective challenge information to the respective mobile device of each of the plurality of the mobile device users.

6. The system of claim 1, wherein each of the received respective at least one messages comprises respective response information regarding the respective one remote service, and wherein the respective response information in each of a plurality of the received respective at least one messages indicates a selection of one or more of a plurality of options.

7. The system of claim 1 wherein the second non-transitory machine-readable storage device is further encoded with program code executable by the processor for, requiring the respective authorization service to cause a processor on the mobile device to:
create the respective authentication token;
store a respective private key portion of the respective authentication token on the mobile device; and
prevent transmission of the respective private key portion of the respective authentication token from the respective mobile device.

8. The system of claim 1 wherein the second non-transitory machine-readable storage device is further encoded with program code executable by the processor for initiating at least one of the respective one remote services by transmitting the respective response information to the respective remote service server.

9. The system of claim 1 wherein the second non-transitory machine-readable storage device is further encoded with program code executable by the processor for initiating at least one of the respective one remote services by redirecting a web browser on the respective mobile device of the respective initiating mobile device user to a respective callback URL.

10. A non-transitory machine-readable storage device encoded with program code, wherein, when the program code is executed by a processor of a mobile device, the processor performs a method comprising:
authorization service computer readable program code residing on the mobile device and embedded within a remote service application:
creating an authentication token comprising a public key portion and a private key portion, wherein the created authentication token is specific to a user credential of a mobile device user and the authorization service computer readable program code, and wherein the created authentication token is configured to be used by the mobile device user to authorize one or more remote services;
storing the private key portion of the created authentication token in a memory of the mobile device; and
transmitting to a computer server of the authorization service, only the public key portion of the created authentication token;
receiving challenge information from the computer server of the authorization service, wherein the challenge information comprises information indicative of an action to initiate one of the one or more remote services;
enabling the input of a user credential from the mobile device user;
in response to receiving at least a portion of the challenge information, the authorization service code:
validating a received user credential using the stored private key portion of the created authentication token;
if the received user credential is validated, transmitting a message to the computer server of the authorization service, wherein the message is configured to enable initiation of the one remote service.

11. The non-transitory computer readable storage device of claim 10, wherein the user credential is one of a user PIN or biometric.

12. The non-transitory computer readable storage device of claim 10, wherein the created authentication token is configured to be used by the mobile device user to authorize a plurality of remote services, and wherein each of a plurality of challenge origins provides a different one of the plurality of remote services.

13. The non-transitory computer readable storage device of claim 10,
wherein the at least the portion of the challenge information comprises one or more user responses comprising a plurality of options;
wherein the non-transitory machine-readable storage device is further encoded with program code executable by the processor for enabling the mobile device user to select at least one of the plurality of options; and
wherein the message comprises information indicating a selection of at least one of the plurality of options by the mobile device user.

14. The non-transitory computer readable storage device of claim 10, wherein, when the authorization service code is further executed by the processor of the computing device, the processor performs the method further comprising:
creating an access token comprising a public key portion and a private key portion, wherein the created access token is specific to the mobile device and to the authorization service code;
storing the private key portion of the created access token in a memory of the mobile device; and
transmitting to the computer server of the authorization service, only the public key portion of the created access token.

15. The non-transitory computer readable storage device of claim 14, wherein the at least the portion of the challenge information comprises one or more user responses comprising a plurality of options; wherein another portion of the challenge information comprises the information indicative of the action to initiate the one remote service; and wherein the non-transitory machine-readable storage device is further encoded with program code executable by the processor for:
receiving the another portion of the challenge information from the computer server of the authorization service;
in response to receiving the another portion of the challenge information, transmitting a request message signed by the private key portion of the respective access token;
receiving the at least the portion of the challenge information from the computer server of the authorization service;
in response to receiving the at least the portion of the challenge information, enabling the mobile device user to select at least one of the one or more user responses;
in response to receiving a selection of at least one of the one or more user responses, and if the received user credential is validated, transmitting the message to the computer server of the authorization service to enable initiation of the one remote service, wherein the message comprises the received selected at least one response.

16. A system for authorizing the initiation of a plurality of remote services by or for a mobile device user, comprising:
a processor at an authorization service;
a first non-transitory machine-readable storage device of the authorization service, wherein the first non-transitory machine-readable storage device is configured to store data, and wherein the stored data comprises:

for a mobile device user, a public key portion of an authentication token, wherein the authentication token is specific to a user credential of the mobile device user and to authorization service computer readable program code residing on at least one mobile device of the mobile device user, and wherein the authentication token is configured to be used by the mobile device user to authorize each of a plurality of remote services;

for each one of the plurality of remote services, a respective identifier received from a respective challenge origin of a plurality of challenge origins;

a second non-transitory machine-readable storage device of the authorization service, wherein the second non-transitory machine-readable storage device is encoded with program code executable by the processor for:

requiring the authorization service code residing on the at least one mobile device to cause a processor on the at least one mobile device to:
create the authentication token;
store a private key portion of the authentication token on the at least one mobile device; and
prevent transmission of the private key portion of the authentication token from the at least one mobile device;

for each of a plurality of actions to initiate a respective one remote service of the plurality of remote services by or for the mobile device user,
receiving, via an application programming interface (API) call from a respective one of the plurality of challenge origins, the respective identifier for the respective one remote service and respective challenge information;
in response to receiving the respective identifier and the respective challenge information, transmitting a respective first portion of the respective challenge information to the at least one mobile device of the mobile device user;
receiving, from the at least one mobile device, a respective request message;
in response to receiving the respective request message, transmitting a respective second portion of the respective challenge information to the at least one mobile device;
receiving, from the at least one mobile device, a respective response message comprising response information regarding the respective one remote service;
validating the received respective response message using the stored public key portion of the authentication token for the mobile device user;
in response to validating the received respective response message from the at least one mobile device, initiating the respective one remote service.

17. The system of claim 16, wherein one of the plurality of challenge origins is a customer service system or a transactional service system.

18. The system of claim 16, wherein one of the plurality of challenge origins is a voice clients system in communication with a server, wherein the server is configured to receive audio from a voice appliance configured to receive a voice appliance user's spoken commands.

19. The system of claim 16, wherein the second non-transitory machine-readable storage device is further encoded with program code executable by the processor for receiving, from the authorization service code residing on the at least one mobile device of the mobile device user, only a public key portion of an access token created by the at least one mobile device; wherein the access token is specific to the at least one mobile device and to the authorization service code residing on the at least one mobile device; and wherein the stored data on the first non-transitory machine-readable storage device further comprises, for the mobile device user, the received public key portion of the access token.

20. The system of claim 19, wherein the respective request message is signed by a private key portion of the access token created by the at least one mobile device; wherein the second non-transitory machine-readable storage device is further encoded with program code executable by the processor for validating the respective request message using the stored public key portion of the access token; and wherein the transmitting the second portion of the respective challenge information is further in response to the validating the respective request message.

* * * * *